US010200761B1

(12) United States Patent
Christie et al.

(10) Patent No.: US 10,200,761 B1
(45) Date of Patent: Feb. 5, 2019

(54) TV SIDE BAR USER INTERFACE

(71) Applicant: Apple Inc., Cupertino, CA (US)

(72) Inventors: Gregory N. Christie, San Jose, CA (US); Alessandro Sabatelli, San Francisco, CA (US); William M. Bachman, San Jose, CA (US); Imran Chaudhri, San Francisco, CA (US); Jeffrey Robbin, Los Altos, CA (US); Jim Young, Livermore, CA (US); Joe Howard, San Jose, CA (US); Marcel Van Os, San Francisco, CA (US); Patrick L. Coffman, San Francisco, CA (US); Stephen O. Lemay, Palo Alto, CA (US); Jeffrey Ma, Redwood City, CA (US); Lynne Kress, San Jose, CA (US)

(73) Assignee: Apple Inc., Cupertino, CA (US)

( * ) Notice: Subject to any disclaimer, the term of this patent is extended or adjusted under 35 U.S.C. 154(b) by 87 days.

(21) Appl. No.: 14/267,671

(22) Filed: May 1, 2014

Related U.S. Application Data

(63) Continuation of application No. 14/104,854, filed on Dec. 12, 2013.

(Continued)

(51) Int. Cl.
    *H04N 21/27* (2011.01)
    *H04N 21/47* (2011.01)
    *H04N 21/482* (2011.01)

(52) U.S. Cl.
    CPC ................ *H04N 21/482* (2013.01)

(58) Field of Classification Search
    CPC ............... H04N 21/27; H04N 21/47

(Continued)

(56) References Cited

U.S. PATENT DOCUMENTS 5,483,261 A  1/1996  Yasutake
5,488,204 A  1/1996  Mead et al.
(Continued)

FOREIGN PATENT DOCUMENTS

JP  2000-163031 A  6/2000
JP  2002-342033 A  11/2002
(Continued)

OTHER PUBLICATIONS

Bohn, D. (Jan. 6, 2014). "Rebooting webOS: how LG rethought the smart TV," located at: <http://www.theverge.com/2014/1/6/5279220/rebooting-webos-how-lg-rethought-the-smart-tv>, last visited: Feb. 24, 2014, seven pages.

(Continued)

*Primary Examiner* — Dominic D Saltarelli
(74) *Attorney, Agent, or Firm* — Morrison & Foerster LLP

(57) ABSTRACT

Systems and methods for a media content user interface. A media content provider includes storage for storing and serving video content to subscribers. The media content provider records and or otherwise stores video content from around the world. Subscribers are provided a user interface to the system that includes a side bar. The side bar includes multiple elements representing different categories of video content. By selecting a given category, available content is filtered according to the selected category and presented. Content which is presented may include live broadcast video for multiple channels on multiple television networks or other content providers. The side bar may further include a collection category specific to a given viewer. Selection of such a category may display video content within the collection. Subcategories in the side bar may be selected for further filtering of available content.

65 Claims, 59 Drawing Sheets

Related U.S. Application Data

(60) Provisional application No. 61/800,715, filed on Mar. 15, 2013, provisional application No. 61/737,080, filed on Dec. 13, 2012.

(58) Field of Classification Search
USPC .................................................. 725/37–61
See application file for complete search history.

(56) References Cited

U.S. PATENT DOCUMENTS

| | | | |
|---|---|---|---|
| 5,596,373 A * | 1/1997 | White | H03J 1/0016 |
| | | | 348/569 |
| 5,825,352 A | 10/1998 | Bisset et al. | |
| 5,835,079 A | 11/1998 | Shieh | |
| 5,880,411 A | 3/1999 | Gillespie et al. | |
| 5,886,690 A * | 3/1999 | Pond | H04N 5/44543 |
| | | | 348/E5.105 |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,405,371 B1 * | 6/2002 | Oosterhout | H04N 5/44543 |
| | | | 348/564 |
| 6,487,722 B1 | 11/2002 | Okura et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 2002/0060750 A1 * | 5/2002 | Istvan | G06F 3/0481 |
| | | | 348/569 |
| 2002/0112239 A1 * | 8/2002 | Goldman | H04H 60/39 |
| | | | 725/46 |
| 2002/0144269 A1 * | 10/2002 | Connelly | H04N 5/44543 |
| | | | 725/49 |
| 2003/0005445 A1 * | 1/2003 | Schein | H04N 5/44543 |
| | | | 725/51 |
| 2003/0011641 A1 | 1/2003 | Totman et al. | |
| 2003/0088872 A1 * | 5/2003 | Maissel | G11B 27/002 |
| | | | 725/46 |
| 2003/0093790 A1 * | 5/2003 | Logan | G06F 17/30265 |
| | | | 725/38 |
| 2003/0167471 A1 * | 9/2003 | Roth | G06F 3/0481 |
| | | | 725/87 |
| 2006/0020904 A1 | 1/2006 | Aaltonen et al. | |
| 2006/0197753 A1 | 9/2006 | Hotelling | |
| 2006/0224987 A1 | 10/2006 | Caffarelli | |
| 2007/0028267 A1 | 2/2007 | Ostojic et al. | |
| 2007/0038957 A1 | 2/2007 | White | |
| 2008/0046928 A1 | 2/2008 | Poling et al. | |
| 2008/0270886 A1 | 10/2008 | Gossweiler et al. | |
| 2008/0307343 A1 | 12/2008 | Robert et al. | |
| 2009/0178083 A1 | 7/2009 | White et al. | |
| 2009/0322962 A1 * | 12/2009 | Weeks | H04N 7/17318 |
| | | | 348/726 |
| 2009/0327952 A1 | 12/2009 | Karas et al. | |
| 2010/0100899 A1 | 4/2010 | Bradbury et al. | |
| 2010/0153999 A1 | 6/2010 | Yates | |
| 2011/0289421 A1 | 11/2011 | Jordan et al. | |
| 2011/0296351 A1 | 12/2011 | Ewing, Jr. et al. | |
| 2012/0110621 A1 | 5/2012 | Gossweiler, III | |
| 2012/0216117 A1 | 8/2012 | Arriola et al. | |
| 2012/0266069 A1 | 10/2012 | Moshiri et al. | |
| 2015/0370920 A1 | 12/2015 | Van Os et al. | |
| 2016/0078526 A1 | 3/2016 | Nations et al. | |

FOREIGN PATENT DOCUMENTS

| | | |
|---|---|---|
| JP | 2011-512701 A | 4/2011 |
| JP | 2012-095123 A | 5/2012 |
| TW | 200622893 A | 7/2006 |
| TW | 200719204 A | 5/2007 |
| WO | WO-2007/078623 A2 | 7/2007 |
| WO | WO-2015/200227 A1 | 12/2015 |

OTHER PUBLICATIONS

Grey, M. (Jun. 11, 2013). "Comcast's new X2 platform moves your DVR recordings from the box to the cloud," located at: <http://www.engadget.com/2013106/11/comcast-x2-platform/> last visited: Feb. 24, 2014, fifteen pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report dated Sep. 28, 2015 for PCT Application No. PCT/US2015/037027, filed Jun. 22, 2015, three pages.

TW Search Report dated Nov. 25, 2016, for TW Application No. 104120385, with English translation, two pages.

episodecalendar.com, (May 17, 2014). "Keep track of your favorite TV shows!—TV Episode Calendar", retrieved from internet on Oct. 12, 2017, URL: https://web.archive.org/web/20140517060612/https://episodecalendar.com/ > published on May 17, 2014 as per Wayback Machine, six pages.

Non-Final Office Action dated Dec. 1, 2017, for U.S. Appl. No. 14/746,095, filed Jun. 22, 2015, 33 pages.

Final Office Action dated Jul. 16, 2018, for U.S. Appl. No. 14/746,095, filed Jun. 22, 2015, 32 pages.

* cited by examiner

| Game | 30 | 1 | 2 | 3 | 4 | 5 | 6 |
|---|---|---|---|---|---|---|---|
| | | vs. Rangers W 0-2 | vs. Rangers L 0-2 | vs. Rangers L 0-3 | | | |
| | 7 | 8 | 9 | 10 | 11 | 12 | 13 |

October 2012 — 5102

Players | Schedule | Highlights | Standings | More Games

| Game | Players | Schedule | Highlights | Standings | More Games |

Around the League — 5402

| pic/video 5421 | pic/video 5422 | pic/video 5423 | pic/video 5424 |
|---|---|---|---|
| Red Sox vs. Yankees<br>Today, 12:30 PM<br>Pitching: Phelps (NYY)<br>Batting: Ellsbury (BOS) | Texas vs. Orioles<br>Today, 8:00 PM<br>Pitching: Nathan (TEX)<br>Batting: Mahoney (BAL) | White Sox vs. Indians<br>Tomorrow, 12:30 PM<br>Pitching: Axelrod (CHI)<br>Batting: Perez (CLE) | Braves vs. Pirates<br>Tomorrow, 8:00 PM<br>Pitching: Hale (ATL)<br>Batting: Alvarez (PIT) |
| 5411 | 5412 | 5413 | 5414 |

TV SIDE BAR USER INTERFACE

BACKGROUND OF THE INVENTION

Field of the Invention

This invention relates to multimedia systems, and more particularly, to delivery of media content.

Description of the Relevant Art

For many years, broadcast television was the sole provider of video content to viewer's homes across the globe. As time has passed, and particularly with the advent of the Internet, numerous other sources of video content have arisen. In addition to broadcast television, cable television and satellite based television providers have begun providing access to video on demand and other audio and video content. In addition, special purpose set-top boxes, such as that provided by Roku®, provided a gateway for viewer's to access other sources of video content not provided by their television service provider. With such boxes, viewers were able to connect to these other content providers in order to obtain desired video content. At present, there are countless video providers in the marketplace. In addition, music and other audio content is available through various communication channels. Many are subscription based services, and some provide free content. While the explosion of video content providers in the marketplace may seem a boon for viewer's, the large number of choices and providers complicates the viewing experience.

In view of the above, improved media content delivery systems, methods and mechanisms are desired.

SUMMARY OF EMBODIMENTS

Systems and methods for a media content delivery service are contemplated.

A media content delivery service is contemplated that includes a data store for storing and serving video content to subscribers. Such a data store may comprise one or more data stores, distributed storage, peer-to-peer based storage, cloud based storage or otherwise. In various embodiments, the media content provider is configured to continually record and or otherwise acquire media content from around the world for storage. Video and audio content stored in the data store will generally correspond to a large number of other content providers, such as cable television operators, Internet based content providers, television networks, and so on. The media content provider also maintains metadata regarding the video content in the data store. In addition to including information concerning the media content content itself—such as format, duration, compression particulars, and so on, the metadata also includes information that associates the video content with the other video content providers. For example, a stored episode of a series shown on the HBO network will be identifiable as corresponding to the HBO network.

In various embodiments, detecting selection of a given element of displayed content in a user interface causes the display of a landing page dedicated to content associated with the given element. In various embodiments, the additional content includes access to multiple seasons and episodes of a television series. In other embodiments, the additional content includes access to multiple games for a sports team. The landing page further provide access to additional content representing selected portions of larger video content, where the selected portions have been identified through crowdsourcing The side bar may further include a collection category specific to a given viewer. Selection of such a category may display video content within the collection. Subcategories in the side bar may be selected for further filtering of available content.

These and other embodiments are contemplated and will be appreciated upon reference to the following description and drawings.

BRIEF DESCRIPTION OF THE DRAWINGS

FIG. 24 depicts one embodiment of a video display and user interface.

FIG. 50 depicts one embodiment of a video display and user interface.

FIG. 51 depicts one embodiment of a video display and user interface.

FIG. 53 depicts one embodiment of a video display and user interface.

FIG. 54 depicts one embodiment of a video display and user interface.

Figure 1:
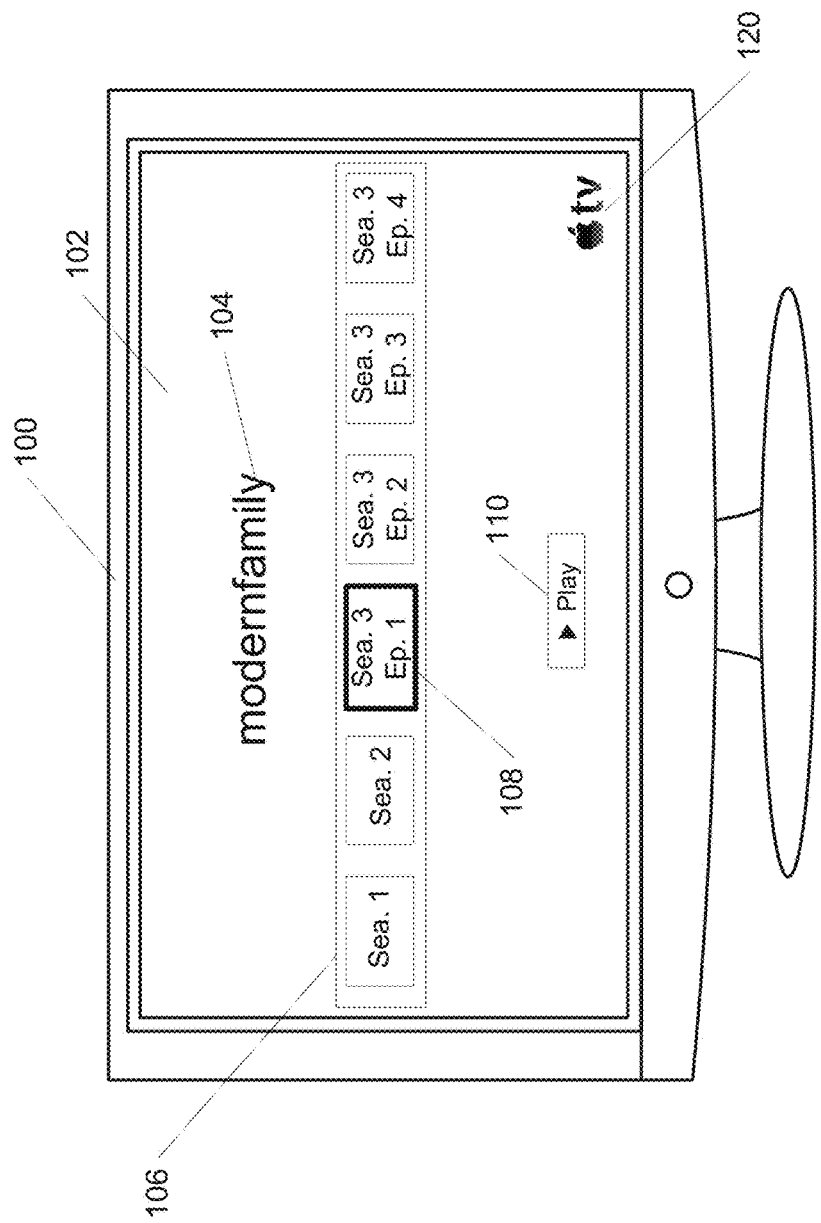
FIG. 1 depicts one embodiment of a video display.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, one embodiment of a television 100 and television display 102 is shown. In the example shown, the television display 102 is displaying video content related to a television show. In particular, the title 104 of a television show is depicted along with an episode bar 106 and play icon 110. In the embodiment shown, the content depicted by the display 102 is provided according to a subscription a viewer has with a television subscription service. In one embodiment, this television subscription service is an Apple TV® service indicated by the icon 120. In various embodiments, the title 104, bar 106, and icon 110 may be generated as an overlay on top of another image, such as a still picture, video content, animation, or otherwise. Such overlays may be produced by a set-top box, a program executing on, or logic incorporated into circuitry incorporated into the television 100 itself, or by a provider of video content (e.g., the Apple TV service). In other embodiments, rather than an overlay, the title 104, bar 106, and/or 110 may be integrally generated as part of an image or video displayed on the display portion 102 of the television. As used herein, "overlay" is intended to include not only the generation of overlays on top of other content, by the content that is integrally generated as part of the video content as well.

As shown in the example, bar 106 includes six images which correspond to subject matter related to the show titled 104 above. As shown, subject matter corresponding to three seasons of the show ("modernfamily") are depicted. In particular, images corresponding to season 1 (Sea. 1), season 2 (Sea. 2), and season 3 (Sea. 3) are shown. For season 3, separate images are shown to correspond to particular episodes of season 3; namely, episodes 1-4 (Ep. 1-Ep. 4). In various embodiments, the images depicted within the bar 106 may be still images or video corresponding to the related season or episode, movie, or other media content.

Also shown in FIG. 1, one of the particular images 108 is indicated to have "focus". As is understood by those skilled in the art, "focus" generally refers to the selection of a graphical element on a display in order to display information related to the selected item, prepare the item for further selection in order to further traverse a graphical user interface, and so on. In this example, focus is illustrated by the use of a broader outline on image 108 than is used for the other images within bar 106. Numerous other alternative ways for indicating focus are known in the art, such as the use of different lighting, colors, animations, etc. All such alternatives are contemplated. Focus in this case may be used to identify a particular image within bar 106 which is intended as a target when the play icon 110 is selected by a user. In this manner, selecting play 110 while image 108 is selected (i.e., has focus) may result in episode 1 of season 3 of the modernfamily television series being played on the display 102.

While FIG. 1 depicts seasons and episodes of a television series available for viewing, what is not shown to the television viewer in this example is that the content corresponding to the images in bar 106 has been aggregated from multiple sources corresponding to multiple subscriptions. As used herein, subscriptions to these multiple services may be referred to as secondary subscriptions, while a subscription to the service corresponding to the display 102 (e.g., the Apple TV service) may be referred to as the primary subscription. In various embodiments, the primary subscription may be to Apple TV (or iTunes or a similar service) in which case Apple TV may be referred to as the "primary provider", and the other multiple service providers may be referred to as "secondary providers". It is noted that in some cases, a secondary provider may not provide all of the content to which it provides access. In some embodiments, a subscription with a secondary provider simply gives a viewer the right to access the data from a different provider. Various such alternatives are possible and are contemplated. In contrast to the scenario depicted in FIG. 1, in a typical scenario a viewer may have a subscription to a service such as the NETFLIX® service which provides television, movie, and other video content. When displaying available content for viewing, the NETFLIX service displays content available from NETFLIX. Alternatively, a service such as the TIVO® service may depict content available from multiple sources corresponding to multiple subscriptions. However, when accessing such content, the viewer accesses a particular service provider in order to obtain the desired content assuming the viewer has a subscription. In such a case, the TIVO service simply points the viewer to a service which provides content. The viewer then connects to that service to obtain content. In contrast to the above, not only does bar 106 in FIG. 1 identify content corresponding to multiple providers which may require multiple secondary subscriptions, all of the corresponding content has been aggregated by the provider of the service that corresponds to the primary subscription (e.g., Apple TV).

Figure 2:
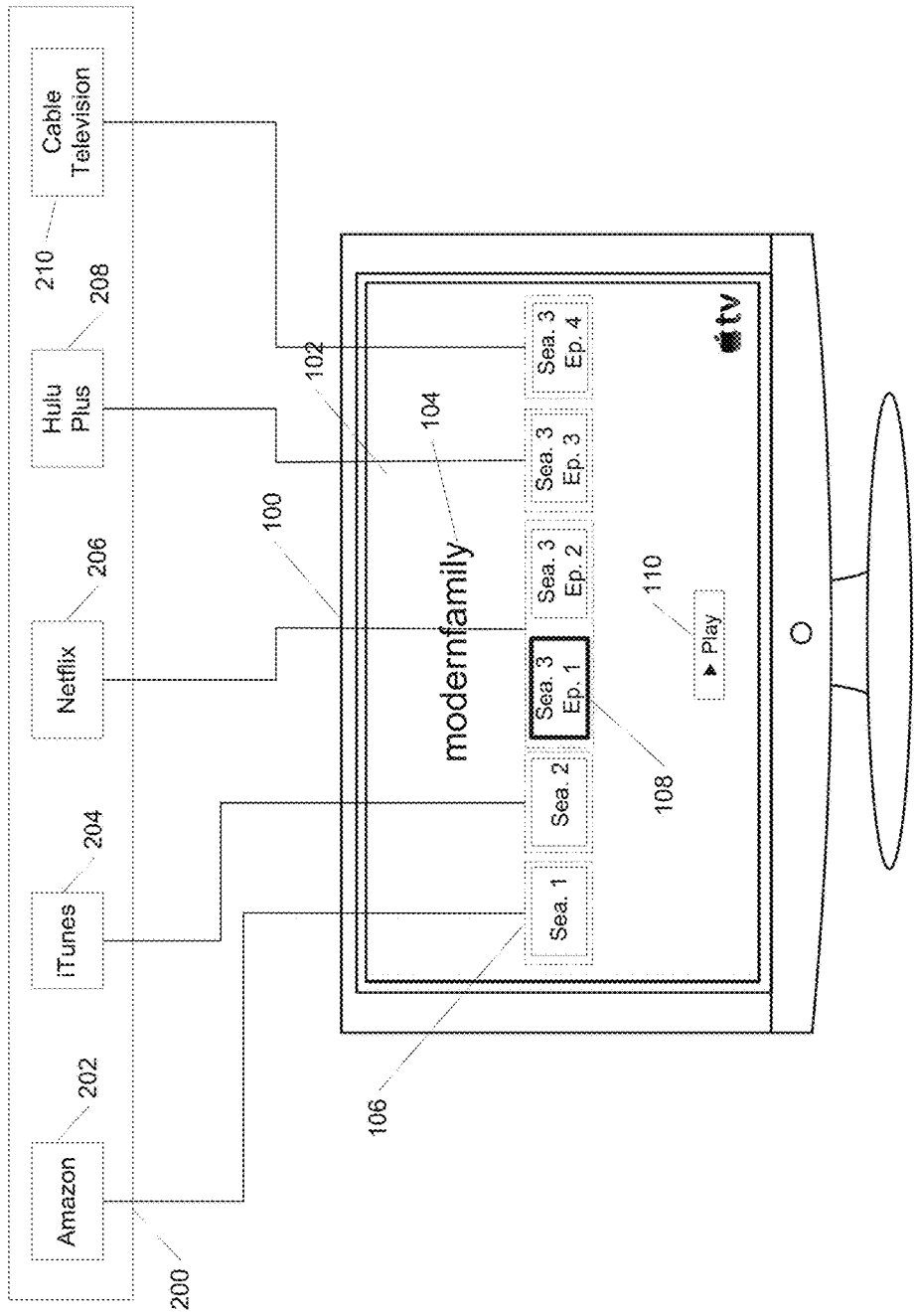
FIG. 2 depicts one embodiment of a video display and secondary sources.

For example, FIG. 2 illustrates the television 100 and display 102 of FIG. 1 with like items having identical reference numerals. FIG. 2 illustrates that the content identified within bar 106 corresponds to different subscription based services 200. For example, season 1 (Sea. 1) is available from the Amazon® service 202, season 2 (Sea. 2) is available from the Apple iTunes® service 204, episodes 1 and 2 of season 3 are available from the Netflix® service 206, episode 3 of season 3 is available from the Hulu Plus® service 208, and episode 4 of season 4 is available from a cable television service 210. In the example shown, a viewer of the display 102 has a subscription to a service provided by the source of the display 102. For example, the viewer may have a subscription to an Apple TV® service (the primary subscription). In various embodiments, the Apple TV service has recorded or otherwise obtained and aggregated content corresponding to all of the sources/providers shown in block 200. Such content may have been obtained directly from the providers themselves, or otherwise. In such an embodiment, whether the viewer selects to view episode 3 or episode 4 of season 3 (each of which corresponds to a different provider and subscription), or any of the other content shown in block 106, the content will be provided by the Apple TV service.

Figure 3:
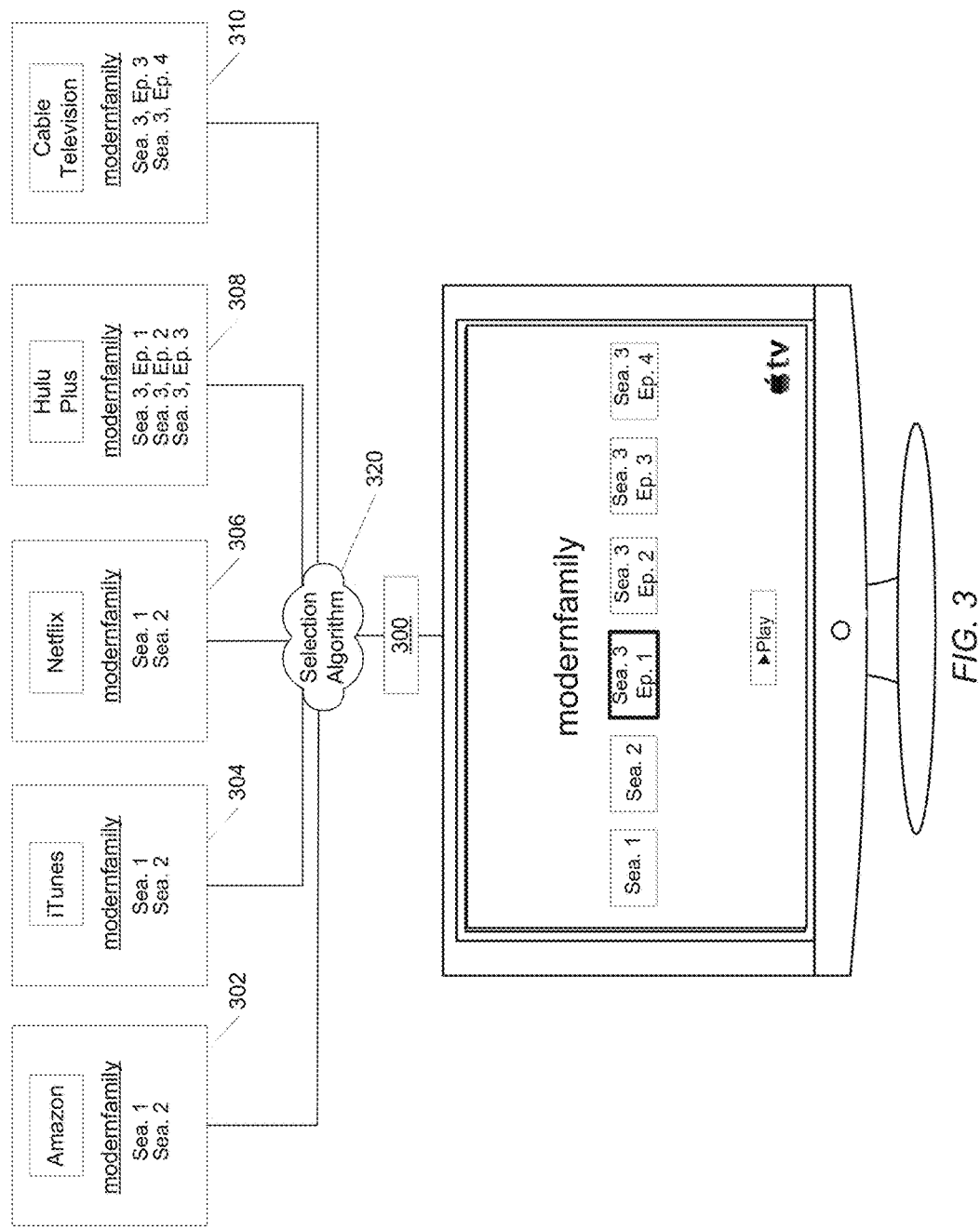
FIG. 3 depicts one embodiment of a video display and secondary sources.

FIG. 3 illustrates one embodiment in which a selection algorithm is used for determining what content is shown as available. Such an algorithm(s) may also be used to select particular content for display when multiple options are available. For example, as shown in FIG. 3, each of the services/providers (302, 304, 306, 308, 310) depict relevant content available corresponding to the modernfamily television series. As can be seen, there is significant duplication among the services in available content. As such, a selection algorithm 320 may be used to select from among the available content. Also, shown in this example is a set-top box 300 coupled to the television. In various embodiments, selection algorithm may include hardware and/or software based processes performed at a server(s) (not shown in FIG. 3), in the set-top box or television itself, at a content provider, or any combination thereof. For example, there may be multiple options available for the episode 1, season 3, e.g., episode 1 of season 3 may be available from multiple sources. This particular episode is available from both provider 308 and provider 310. In addition, each of these providers may have this particular episode available in high definition (HD), or standard definition (SD) or both. Other options may be available as well. Given the various options, duplicate versions of content are possible. In some embodiments, all versions may be displayed to a viewer as being available. In other embodiments, it may not be desirable to always show all versions currently available. In such embodiments, determining which version(s) of particular content to display as being available for selection may need to be made. Alternatively, if selecting "play" by the viewer causes the episode to immediately begin playing automatically, then a selection algorithm may be needed to determine which source is used to provide the content. Whichever option is selected, it will have been stored by the primary subscription service and provided by this primary subscription service (e.g., Apple TV) rather than one of the services/providers (302, 204, 306, 308, 310). Further details regarding the above mentioned selection algorithms will be discussed in greater detail below.

Figure 4:
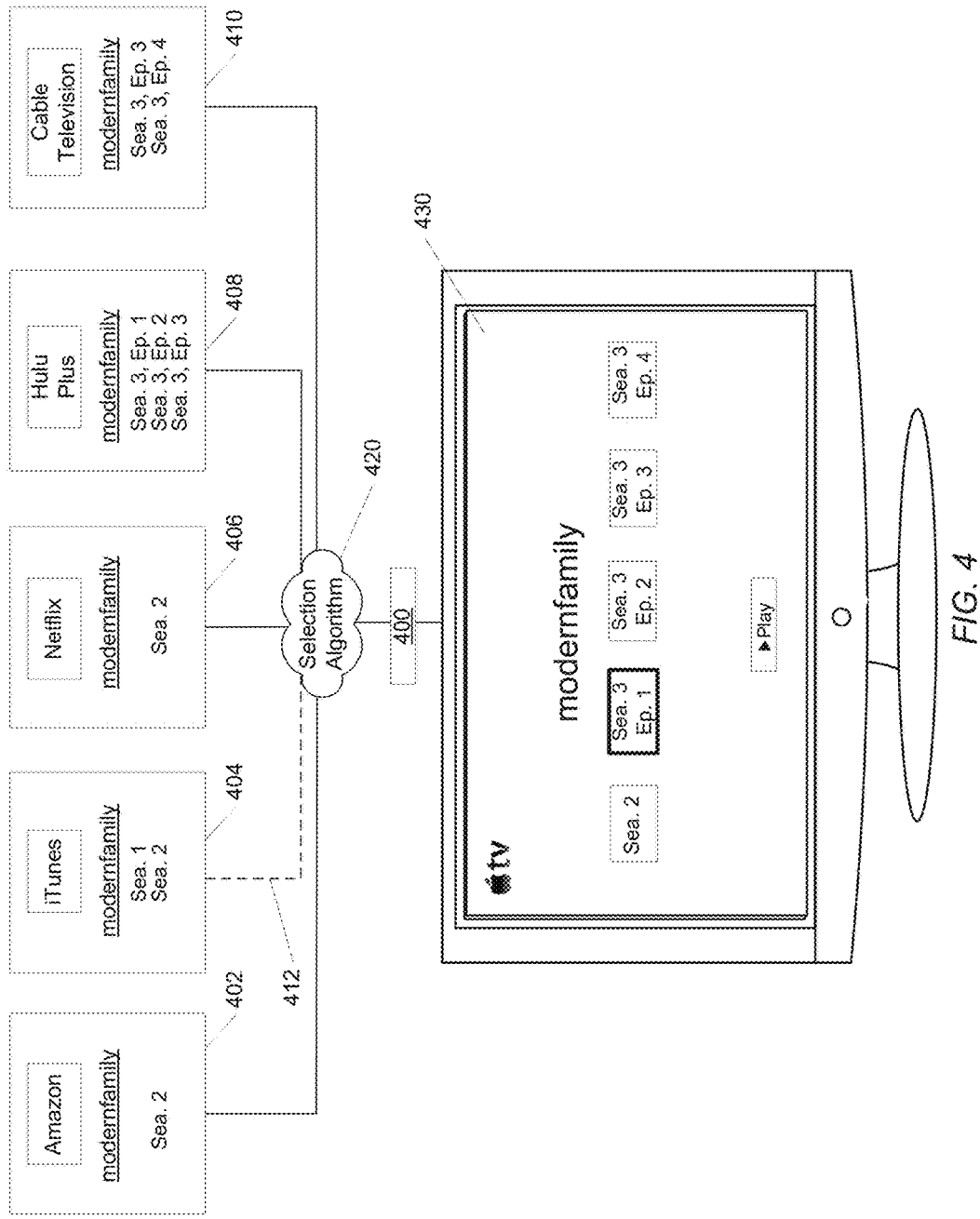
FIG. 4 depicts one embodiment of a video display and secondary sources.

In various embodiments, the content shown as being available in block 106 may also be based upon content that is available for viewing (irrespective of whether the viewer has a current subscription for the content), or content that is available based on the viewer's current subscription(s). The approach used to choose what is shown as being available may be programmable (e.g., based on user settings in a set-top box, based on a service provider's preferences, or otherwise) and may be a combination of the above approaches. FIG. 4 depicts an embodiment in which the content shown as being available is based on whether or not the viewer has a secondary subscription to an available service. In various embodiments, a viewer may be able to view and manage their various primary and secondary subscriptions using interfaces provided by the primary provider on the display. In the example shown in FIG. 4, providers 402-410, selection algorithm 420, set-top box 400 and display 430 are shown. Each of the providers 402-410 are shown coupled to the algorithm 420 by a line. In the embodiment shown, a line coupled from a provider 402-410 to the selection algorithm indicates that the primary subscription based service (Apple TV) provides content corresponding to the given provider (e.g., based on an agreement between the primary subscription service provider and the secondary subscription service provider). A solid line in this case is used to indicate that the viewer has a subscription to the corresponding provider/service and a dashed line indicates the viewer does not have a subscription to the provider/service.

Figure 5:
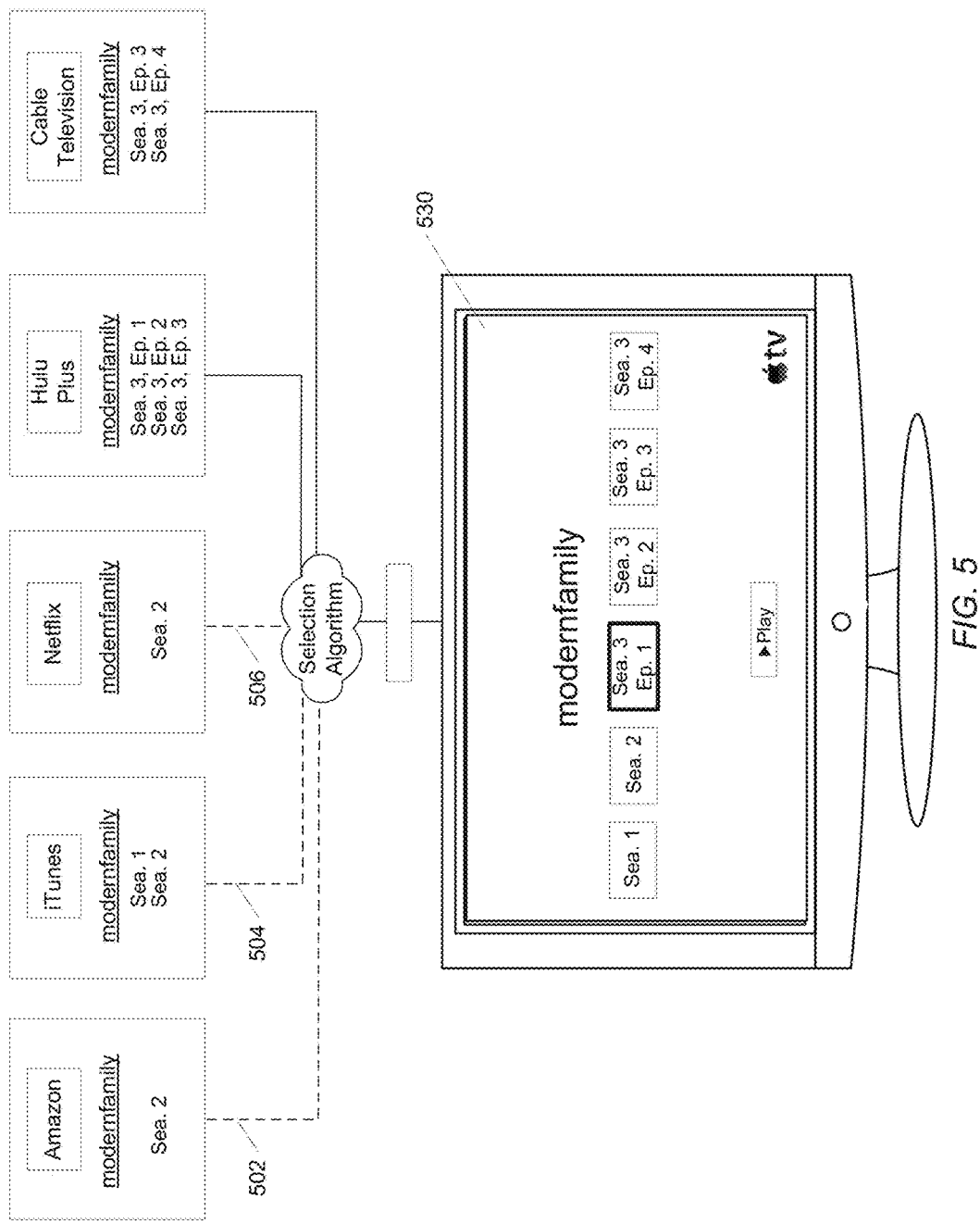
FIG. 5 depicts one embodiment of a video display and secondary sources.

As seen in FIG. 4, the iTunes service is the only provider of season 1 (Sea. 1) of the modernfamily television series. As shown by the dashed line 412, the viewer, which corresponds to the subscription displayed on the display, 430 does not have a currently valid subscription to this service. Consequently, season 1 (Sea. 1) does not show up as being available on the display 430. As an example, a viewer may not want content displayed when a subscription is not available in order to reduce the amount of content displayed. FIG. 5 illustrates the approach wherein content is shown to the viewer as being available irrespective of whether or not the viewer has a (secondary) subscription for the content. In the example of FIG. 5, lines 502, 504, and 506 show the viewer does not have a subscription to the Amazon, iTunes, or Netflix services. Nevertheless, all content is shown as being available to the viewer on the display 530. Having briefly described a television service with primary and secondary subscriptions, and the aggregation of all content by the primary subscription service, we now turn to a discussion of the system in general.

Figure 6:
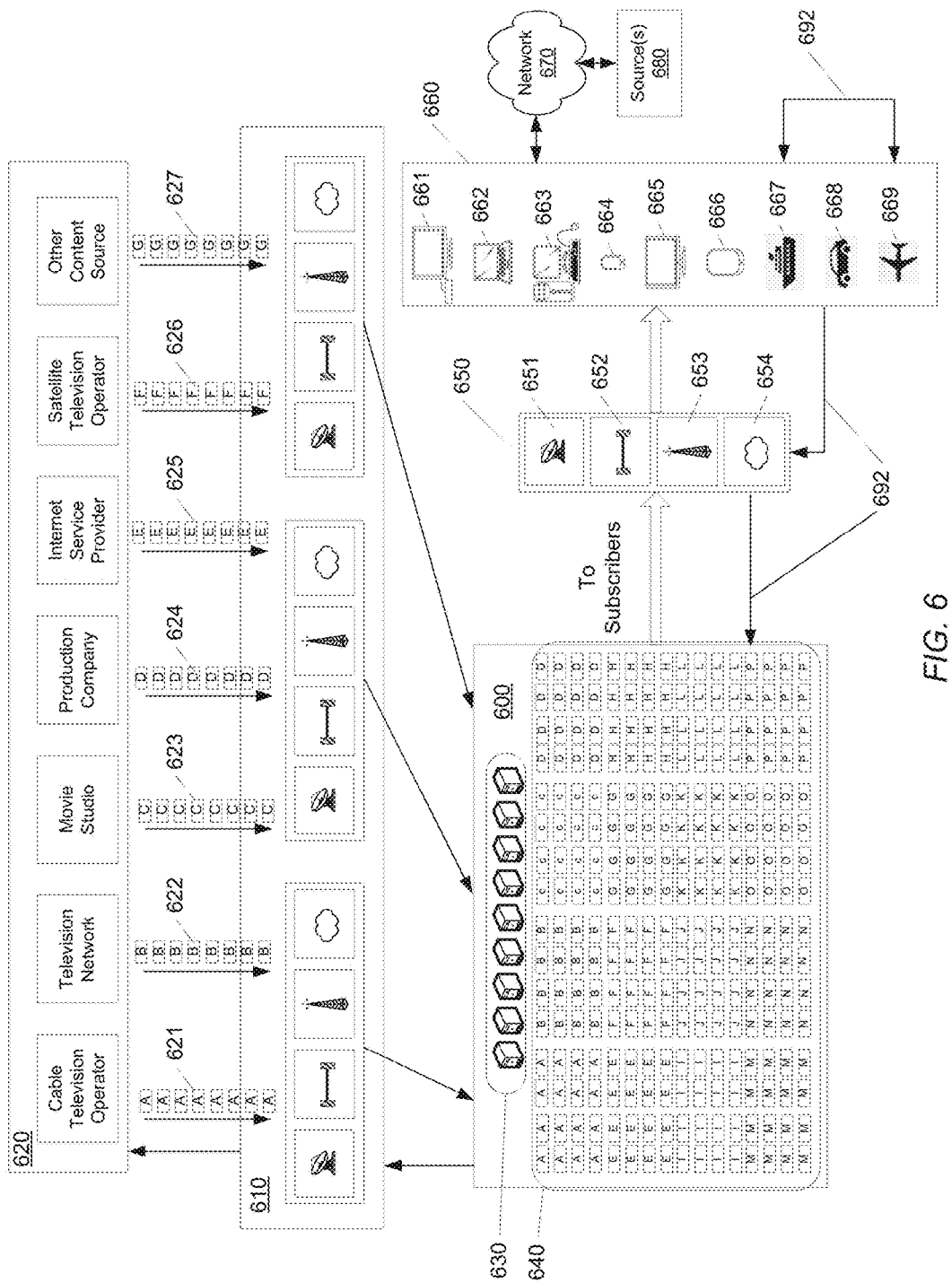
FIG. 6 depicts one embodiment of a portion of a television system.

FIG. 6 illustrates one embodiment of a system corresponding to the above description. In the embodiment shown, a "data store" 600 is shown that includes a large number of servers 630 and a data store 640. In various embodiments, the data store 600 corresponds to a cloud based service whereby content and services are delivered over a network such as the Internet. Also shown are multiple content providers 620 coupled to the data store 600 via multiple communication pathways 610. In various embodiments, providers 620 may include subscription-based providers, which provide paid and/or free content. In various embodiments, the purchase of an application (app) may provide access to particular content. For example, the purchase of a major league baseball app may provide access to content related to major league baseball. In a sense, the purchase of the app effectively serves as a subscription. The application may then be executable (e.g., by the set-top box) to provide an enhanced viewing experience for baseball related viewing. Data store 600 is also shown coupled to convey content to subscribers 660 via multiple pathways 650. Transmission pathways 650 may include satellite-based transmission 651, cable-based systems 652, terrestrial or broadband radio service (BRS) based systems 653, the Internet and/or other networks 654, a combination of these systems, or some other appropriate system of transmission. In the embodiment shown, providers 620 includes cable television operators, television networks, movie studios, production companies, Internet service providers, satellite television operators, and other providers/sources of content. In various embodiments, one or more of the providers 620 corresponds to a subscription-based service whereby subscribers are entitled to gain access to video content.

Also shown in FIG. 6 is the conveyance of content 621-627 by each of the providers 620 via one or more pathways 610 to data store 600. It is noted that while the term data store—singular—is used, in various embodiments the data store 600 is in fact multiple farms that are distributed, as will be discussed shortly. Similar to pathways 650, pathways 610 may include any of a variety of transmission media and may include a variety of transmission protocols. Content 621-627 may generally include video content and related metadata, which describes the content and/or other particular regarding the content. Such metadata can be delivered using protocols or formats such as XML, JSON and the like. Such other particulars may include information regarding licensing related information, subscriber information, pricing information, or otherwise. Appropriate secure or encrypted forms of data transmission can be used to protect commercial and proprietary information related to a provider or personally identifying information related to a user. For ease of illustration, the content 621-627 is shown with a corresponding designation A-G that serves to indicate the content corresponds to a given provider. For example, content 621, which is conveyed by a Cable Television Operator, includes the designation "A". Corresponding data within the data store 600 data store 640 includes the designation "A" as well. In various embodiments, designation "A" for data within data store 640 may serve to indicate that a subscription to the Cable Television Operator includes access to this data. It is noted that such designations for use in relation to data within the data store 640 will form part of the metadata maintained by the data store 600. While content within the data store 640 is shown with a given designation for ease of illustration, in various embodiments particular data in the data farm 600 may be associated with multiple providers 620 and multiple subscriptions. Accordingly, particular content such as an episode of a television show would be associated with multiple providers 620 and metadata maintained by the data store 600 would indicate as much. Therefore, while the illustration of FIG. 6 may depict content as being segregated by provider or subscription (A-P), in various embodiments such segregation or identification is merely logical based on metadata. In various embodiments, data storage reduction techniques such as deduplication and single instance storage will be used for the data store 640.

The previous figures have discussed the television system in terms of conveying content for display on a television. As shown in FIG. 6, the target 660 of video content conveyed by data store 600 may be any of various different types of targets. Exemplary targets 660 shown in FIG. 6 included a set-top box coupled to a television 661, a laptop computer 662, a desktop computer 663, a smart phone, cellular phone, wearable portable device (e.g., a wristwatch type display), other handheld mobile device 664, a television, a tablet computer, a cruise ship for distribution as part of an on-board video system, an automobile (e.g., for display on an integrated video screen), or aircraft for individual distribution to passengers or broader distribution as part of an on-board video system. Other targets capable of displaying video content are possible and are contemplated. Moreover, the content may be movie content that is provided by multiple secondary providers and to which aspects of the description relating to seasons, episodes, channels, that are more relevant to typical television programming may not apply. In addition, in some embodiments, the system and its interface may be used to allow a user to browse and select non-video content such as music or audio content including podcasts that may be presented or played back using the audio output capabilities of the system, or applications that may execute with content displayed on a television such as interactive games.

FIG. 6 also illustrates that targets 660 may communicate with data store 600 via paths 692. Such communication may include requests for video content, receiving device performance related information, viewer profile related information, or otherwise. Also shown is a communication path 692 that illustrates target devices may communicate with other target devices. Such communication may be peer-to-peer based type communication or otherwise. FIG. 6 also shows targets 660 coupled via a network 670 coupled to other sources 680. These other sources 680 may provide access to other sources of video content, Internet based content, or content directly provided by one or more of providers 620.

As discussed above, in various embodiments a viewer may have a primary subscription and one or more second subscriptions. For example, in FIG. 6 a viewer corresponding to one of the targets 660 may have a primary subscription to Apple TV, which in the example shown corresponds to server 600 and related operations. In such an embodiment, the primary subscription may be based on monthly fee, annual fee, or other periodic fee. Alternatively, the primary subscription may be based on the purchase of a set-top box or television with integrated components to support the primary subscription service. Still further, the primary subscription may be based on a combination of a periodic fee, the purchase of equipment, per item purchases, and/or otherwise. Whichever approach is used in a given case for the subscription, the primary subscription generally provides access by the viewer to content maintained within the data store of the primary subscription service provider (e.g., Apple TV). While content available to the viewer is maintained and provided by the primary subscription service provider, which content is available to the viewer according to the primary subscription is based upon one or more secondary subscriptions of the viewer.

As an example, a viewer may have a cable television subscription (secondary subscription). In addition, the viewer may have a subscription to the service provider associated with the data store (e.g., an iTunes account or similar subscription). The cable television operator (e.g., as shown as a provider 620) broadcasts video content, such as live television and video-on-demand content, 24 hours a day. Data store 600 is configured to record and/or otherwise capture all content broadcast/provided by the cable television operator and store the content as part of the data store 640. For example, data designated "A" in data store 640 may represent video content broadcast and/or otherwise provided or available from the cable television operator. Given the viewer's secondary subscription to the cable television operator service, the viewer's primary subscription to Apple TV (data store 600) entitles the viewer to access all of the content in the data store 640 that corresponds to the cable operator. Consequently, the viewer may view live television broadcasts of the cable television operator, which are provided by the data store 600 rather than the cable television operator. Additionally, as the data store 600 is constantly recording/gathering all of the cable operator content, the viewer may have access to content which was broadcast by the cable television operator a week ago, a month ago, or even a year ago, depending on how long the data store maintains the data and/or has rights to convey the data. It is noted, that as used herein, the term broadcast is not limited to a television broadcast in the traditional sense. Rather, broadcast may refer to conveyance of media content from any content provider or delivery system including Internet based providers, satellite based providers, conveyance of content in a viewer's own media store, or otherwise. Additionally, broadcast may be used to encompass multicast and point-to-point communication as well.

In various embodiments, the data store 600 is in principle generally configured to record all video data everywhere all of the time. In other words, the data store 600 operator may seek to store all video content available for viewing globally. Of course as a practical matter, it may not be possible to capture video content in such an all-encompassing manner. As such, the data store operator may generally seek to capture as much media content (audio and/or video, applications, images, etc.) as possible based on subscriber interests and other factors. Such an approach may seek to include storing all previously available video content anywhere in the world and continuously recording newly available video content that is deemed worthy of capture for business or other purposes. Acquisition of video content may generally necessitate license agreements with various copyright holders and providers. As noted earlier, particular content that has been acquired and resides in the data store 600 may be associated with multiple providers. However, while multiple providers may provide subscribers access to particular video content, it generally will not be the case that the data store 600 operator will need agreements with all such providers in order to acquire the content. Rather, in most cases, video content will have been acquired and stored as part of the content 640. The data store 600 operator will then form agreements with providers 620 which will entitle subscribers with primary subscriptions to the data store service 600 and a given secondary subscription to another service 620 to access secondary subscription available content from the data store 600. Depending on a viewer's secondary subscriptions, content within the data store 600 that is accessible to the viewer will vary. In various embodiments, rather than subscribing to all of a secondary provider's content, viewer's may be able to subscribe to a subset of the content offered by a secondary provider, or to combinations of subsets of content offered by multiple secondary providers. For example, a viewer may subscribe to only a particular network, a particular television series, a particular night of the week (e.g., the Thursday night lineup), subscribe according to varying durations (e.g., just the next two weeks), all shows of a particular genre across multiple secondary content providers (e.g. medical dramas; reality shows; etc.) or all content featuring a particular actor (e.g. all Alec Baldwin content), and so on. Numerous such alternatives are possible and are contemplated.

Figure 7:
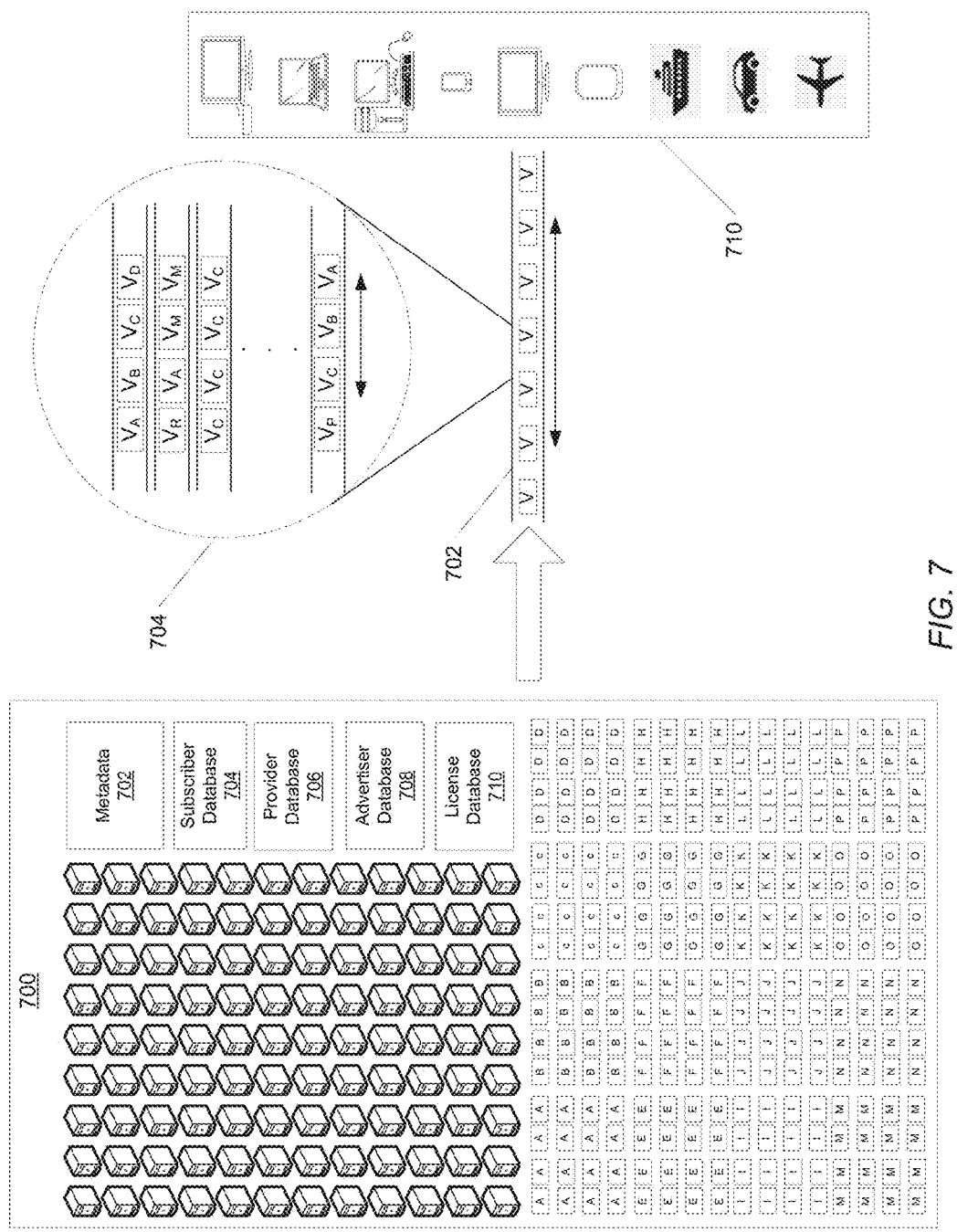
FIG. 7 depicts one embodiment of a portion of a television system.

While the embodiment of FIG. 6 contemplates a primary subscription provider and multiple secondary subscription providers 620, the viewing experience provided to the viewer is generally managed solely by the primary subscription provider. FIG. 7 illustrates a primary subscription based data store 700 coupled to provide video content to targets 710. As previously discussed, data store 700 stores data associated with multiple secondary subscription providers. By having a suitable secondary subscription, a viewer gains access to data in the data store 600 that represents data also provided by the secondary subscription provider. However, the secondary subscription provider does not provide the content to the viewer. Rather, the content is provided by the primary subscription provider. In some embodiments, the viewer may be able to receive content from a secondary provider. In some embodiments, responsive to a purchase by a viewer, the primary provider may obtain content from the secondary provider (assuming the primary provider does not already have the content) and convey/forward the content to the viewer. Conveying/forwarding the content in such a case may include reformatting and/or modifying associated metadata to conform to the primary provider's system requirements.

Additionally, the video environment within which the video content is provided (e.g., via a set-top box provided by the primary subscription provider, etc.) is controlled by the primary subscription provider. Such an approach eliminates or minimizes the viewer's need to navigate or otherwise deal with disparate secondary provider environments. To further enhance the viewer's experience, complications associated with managing secondary subscriptions may be managed through the primary subscription. For example, the primary subscription provider may identify content available to a viewer via a secondary subscription. Should the viewer wish to subscribe to the secondary provider, this may be done through the primary subscription service and may even be billed as part of the primary subscription service billing. This may be accomplished via the primary subscription service interface using a consistent visual/graphical approach. In such a manner, the system provides the viewer with a consistent interface and viewing experience.

As illustrated in FIG. 7, data store 700 includes multiple databases configured to store data associated with the stored video content. These databases include metadata 702, subscriber databases 704, provider databases 706, advertiser databases 708, and license databases 710. Metadata 702 may generally include data that identifies the nature of video content—type, size, title, duration, cast, secondary providers, etc. Subscriber databases 704 may include information regarding primary subscriptions and perhaps secondary subscriptions. Provider databases 706 may include information regarding secondary subscription providers. Advertiser databases 708 may include information regarding advertisers, advertisements, and corresponding agreements. License databases 708 may include license data related to stored content. It is noted that these databases are exemplary only. Numerous other and/or alternative databases may be maintained. Additionally, any suitable storage and/or transmission format for metadata and content may be utilized, such as XML, JSON, or otherwise. As shown, data store 700 conveys video data to targets 710 via a path 702. As depicted, the video content and associated metadata along path is conveyed in a manner to provide a consistent viewing experience—visually illustrated as "V"-which generally seeks to eliminate viewing experience differences generally associated with different video content providers. View 704 illustrates that differences associated with the video content regarding secondary subscriptions or otherwise are subjugated (e.g., identified via the metadata) to the larger viewing presentation. In this manner, viewers can access all content they are entitled to according to secondary subscriptions with one or more providers from a single provider via a single provider interface. Additionally, as all content is stored—the viewer may access content which was at one time provided by the secondary provider but is no longer provided by that provider. In various embodiments, the viewing experience is controlled by the primary provider by providing the hardware and/or software with which subscribers access the video content, or by controlling specifications of the hardware and/or software used by the subscribers.

Figure 8:
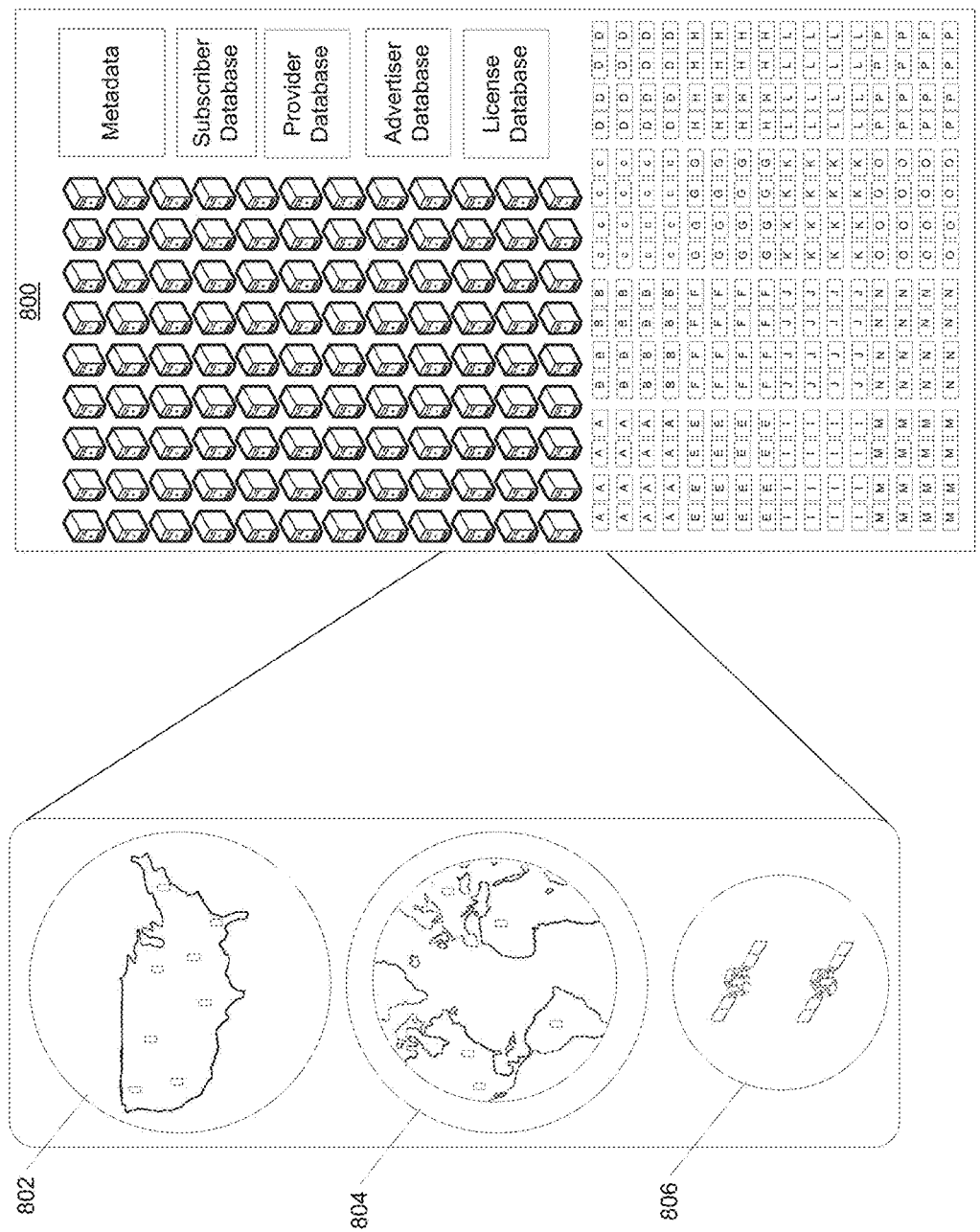
FIG. 8 depicts one embodiment of the distribution of video server farm.

Turning now to FIG. 8, one embodiment of a data store 800 as previously discussed is shown. Generally speaking, data store 800 is distributed throughout a particular geographic region 802, strategically distributed throughout the globe 804, and may also include distributed portions in satellite based systems. Additionally, embodiments are contemplated in which peer-to-peer storage techniques may be used. In some embodiments, subscriber devices themselves may serve (at least in part) as storage for a distributed storage system. In this manner, data may be served to particular regions throughout the globe in a relatively efficient manner compared to having one or only a small number of server sites.

Figure 9:
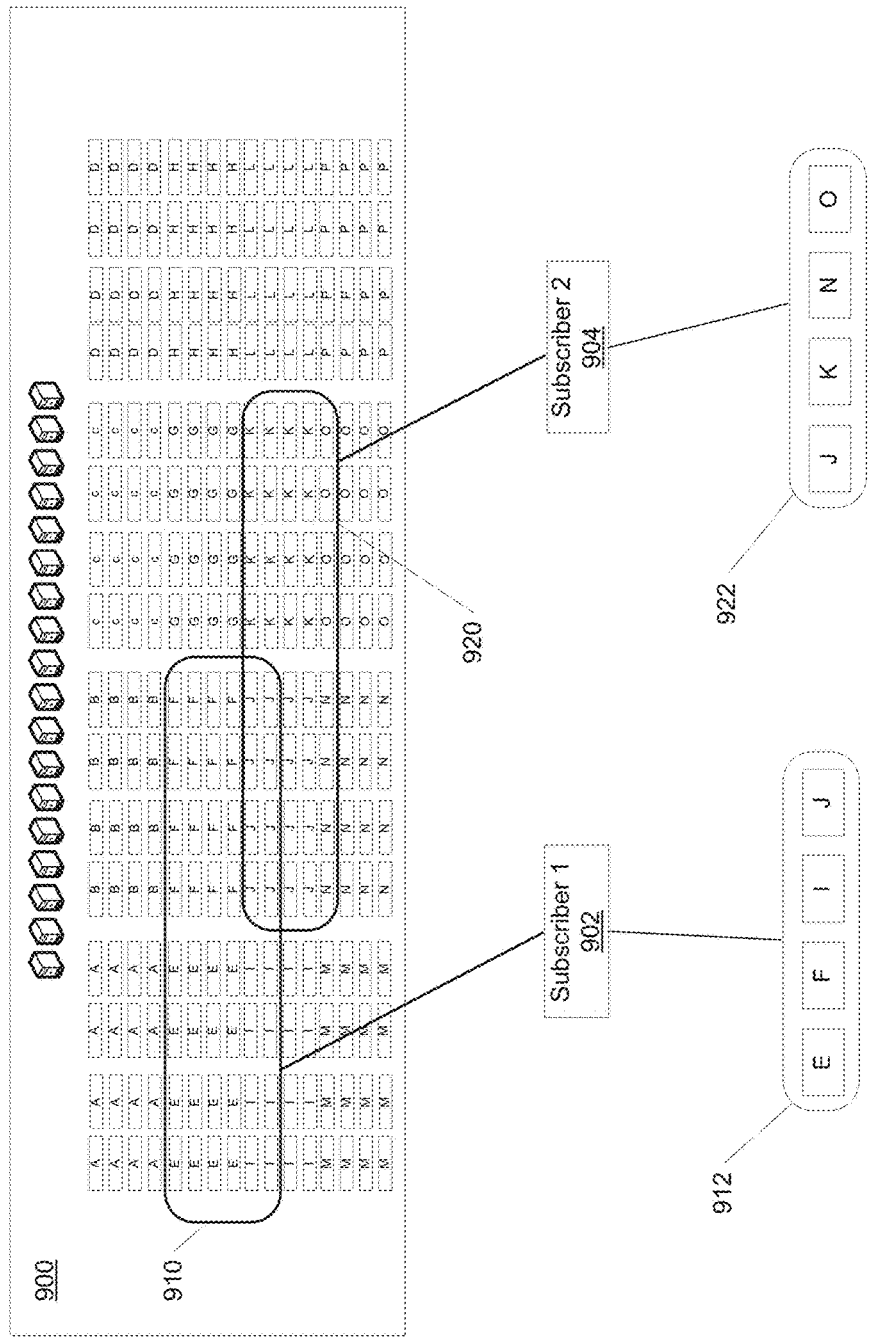
FIG. 9 depicts one embodiment of subscribers and video content.

Generally speaking in the prior art, a television subscription, such as a cable television subscription, is associated with one or more particular devices (set-top boxes). Such devices are uniquely identified by the cable television operator and communication is established with the device which enables the device to receive programming from the cable operator. In contrast, in various embodiments, primary subscriptions as described herein may be associated with particular subscribers rather than particular devices. Given such an approach, the subscriber's content may follow the subscriber wherever they or their devices may go. The following discussion illustrates these features. FIG. 9 depicts data store 900 including video content that corresponds to multiple secondary subscriptions/providers. A first subscriber 902 has four secondary subscriptions 912 E, F, I and J. This entitles subscriber 1 902 access (e.g., viewing privileges) to the E, F, I and J content 910 stored as part of the content associated with farm 900. A second subscriber, subscriber 2 904, has secondary subscriptions 922 J, K, N and O. This entitles subscriber 2 904 access to the J, K, N and O content 920 stored as part of the content associated with farm 900. In this example, both subscribers have secondary subscriptions providing access to the content J.

Figure 10:
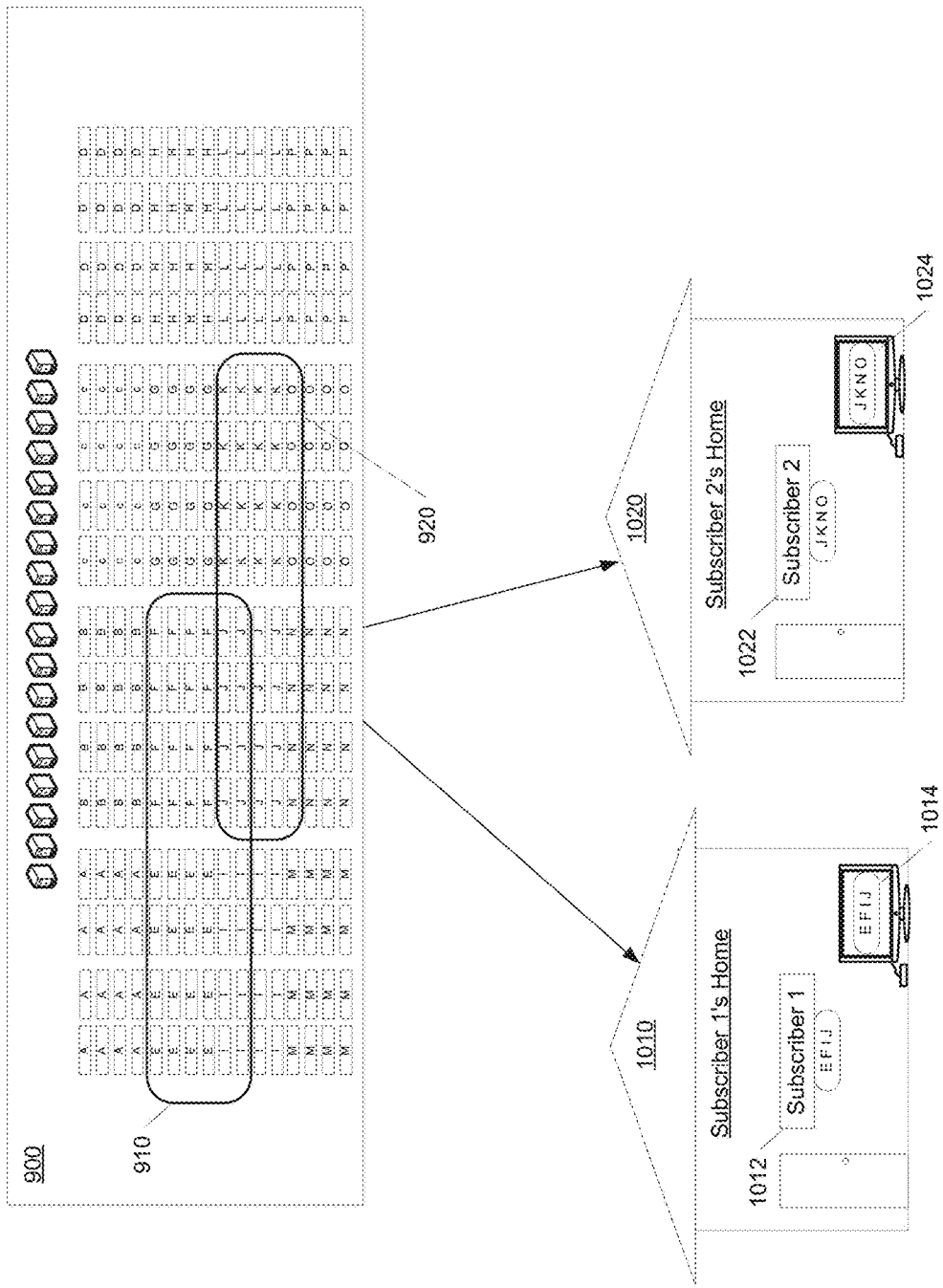
FIG. 10 depicts one embodiment of subscribers and video content.
Figure 11:
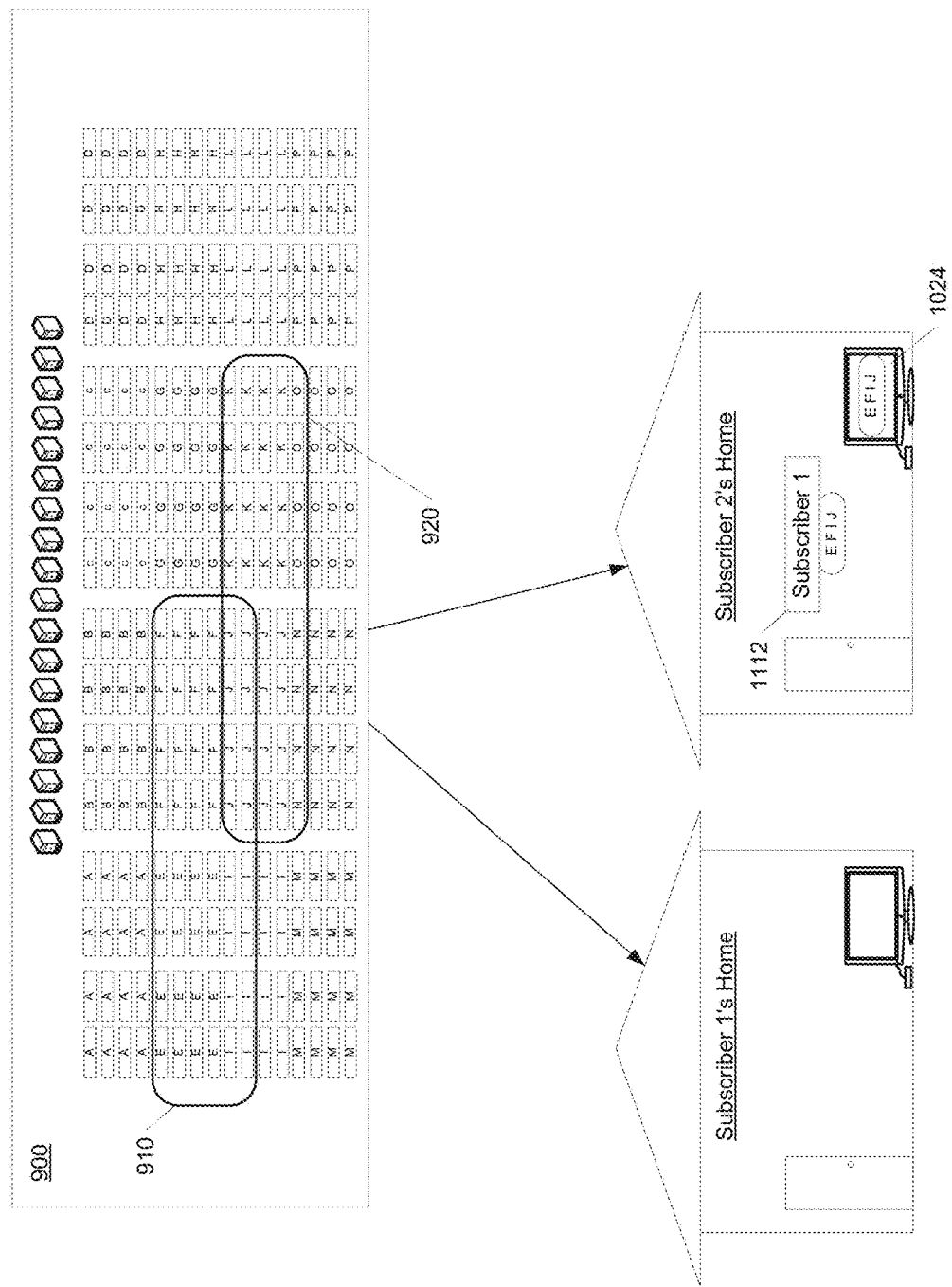
FIG. 11 depicts one embodiment of subscribers and video content.

Turning to FIG. 10, the homes of subscriber 1 1010 and the home of subscriber 2 102 are shown. Subscriber 1 1012 is shown to be present in the home 1010, and subscriber 2 1022 is shown to be present in home 1020. Subscriber 1 1012 is shown to have access to content E, F, I and J and the corresponding content is viewable on the television 1014. Subscriber 2 1022 is shown to have access to content J, K, N and O, and the corresponding content is viewable on the television 1024. FIG. 11 illustrates subscriber 1 1112 has now moved to subscriber 2's home. As subscriber 1's primary subscription is associated with subscriber 1 and is not viewable on a specific device, subscriber 1's content E, F, I and J is viewable in subscriber 2's home television 1024. Various embodiments for how subscriber 1's subscription follows the subscriber in this manner are contemplated. In one embodiment, subscriber 1's use of a remote control device in subscriber 2's home is recognized by the remote control and/or other video content display devices. For example, the remote control used with a set-top box may include biometric recognition capability to recognize a fingerprint, voice, or other characteristic of the person using the remote control. This biometric data could then be communicated to the set-top box and conveyed to the primary subscription provider for analysis. Identification of a particular subscriber may cause conveyance of particular codes or entitlement data to the set-top box, which then enables it to receive subscriber 1's content.

In other embodiments, password or other login type information may be entered via a remote control device. Authorization may result in codes or entitlement data being conveyed similar to that discussed above. Still further, in other embodiments, subscribers may have particular mobile devices associated with their subscription. For example, a subscriber's smart phone may be associated with the subscription. In some cases, the smart phone itself may itself be authorized to receive and display subscription based video content. Additionally, the smart phone may be useable as a remote control for a television system. In such an embodiment, the smart phone may be configured to communicate with a television, set-top box, or other video system component. Based on such communication, the set-top box or other device may convey the smart phone data to the primary subscription service provider. If the smart phone is identified as being associated with a valid subscription, then entitlement/authorization type data may be conveyed to the set-top, television, or otherwise, which enables it to receive subscriber 1's subscription based content. Such embodiments would enable the viewing of one's own subscription content at a friend's house. Alternatively, subscription content could follow a subscriber to a hotel room during travel. Numerous such scenarios are possible and are contemplated.

Figure 12:
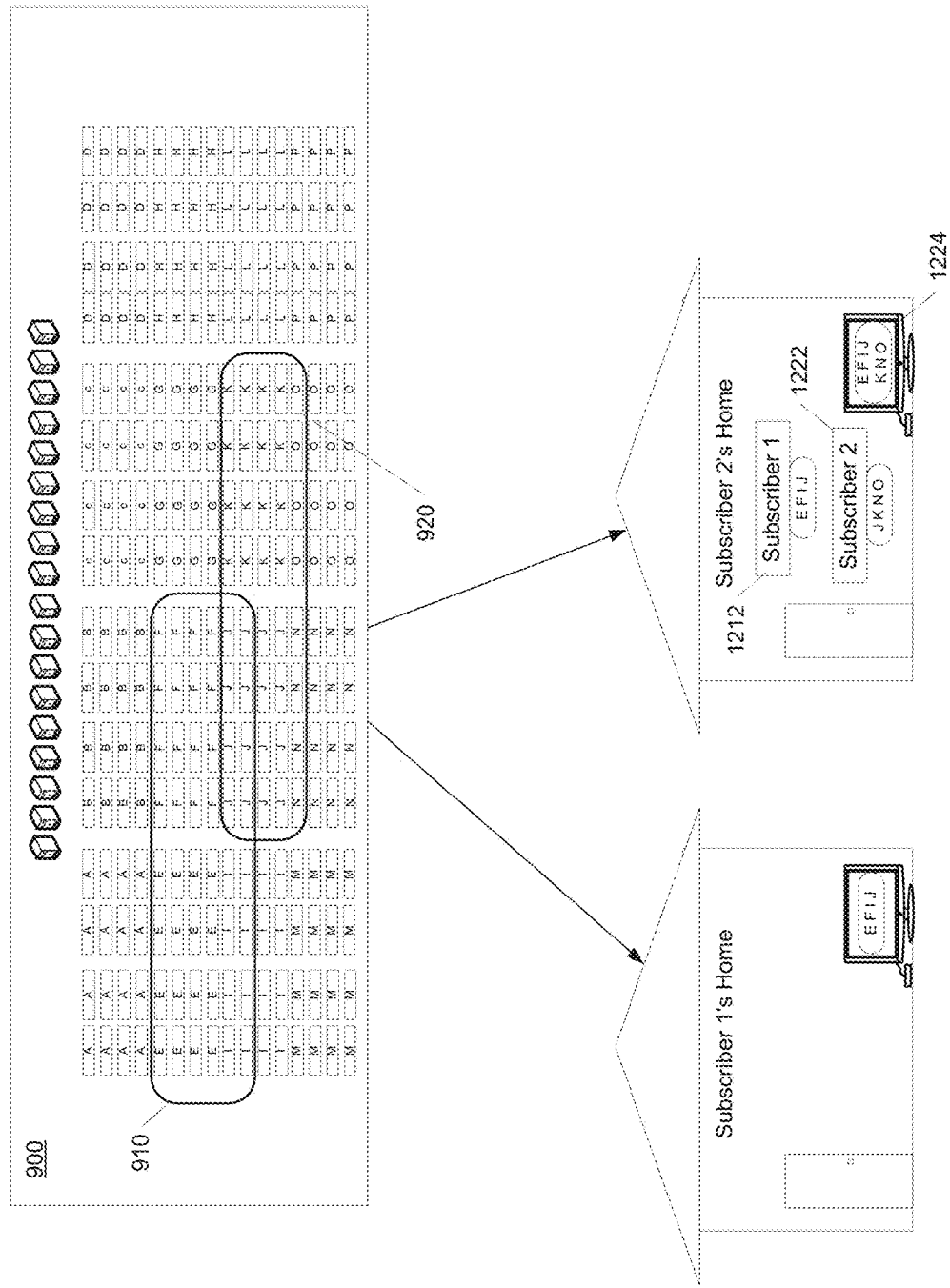
FIG. 12 depicts one embodiment of subscribers and video content.

FIG. 12 illustrates an embodiment in which subscription content for both subscriber 1 1212 and subscriber 2 1222 is concurrently available on the television 1224 in subscriber 2's home. In such an embodiment, a device such as a set-top box detects the presence of both subscribers and authorizes access to their combined content. In various embodiments, such as the smart phone embodiment described above, the detection and identification of the smart phone triggers the authorization mechanism for the subscriber content. In such an embodiment, the smart phone may have a setting that enables or disables the mechanism. For example, in one embodiment the mechanism may be enabled and have a broadcast mode in which the subscriber needn't take any action to cause the authorization to take place. The mere presence, such as walking in to the home, results in the set-top box being authorized to receive the subscription-based content. In such an embodiment, simply walking into a neighbor's home may result in the same authorization. If such authorization is not desired, then the smart phone (or other mobile device) may have a setting that disables the automatic authorization mechanism.

In some embodiments, the feature of having a subscriber's content follow the subscriber and be displayed on another device (e.g., a friend's television or a hotel room television) may be a feature that is provided at an additional cost (e.g., a small monthly fee). Additionally, such a feature (which may be referred to as a "follow me" mode) may be enabled or disabled. For example, in some embodiments, when subscription content follows a subscriber to another location where it is then viewed, that content is not simultaneously viewable in the subscriber's home. In various embodiments, such a mode may be controllable by both a set-top box in the subscriber's home as well as by the subscriber while not at home. If desired, primacy may be given to the set-top box at home. In this manner, content may follow the subscriber away from home, but when someone at the home wishes to access particular subscription based content it is permitted and the follow me mode is temporarily disabled. Numerous such alternatives are possible and are contemplated.

Figure 13:
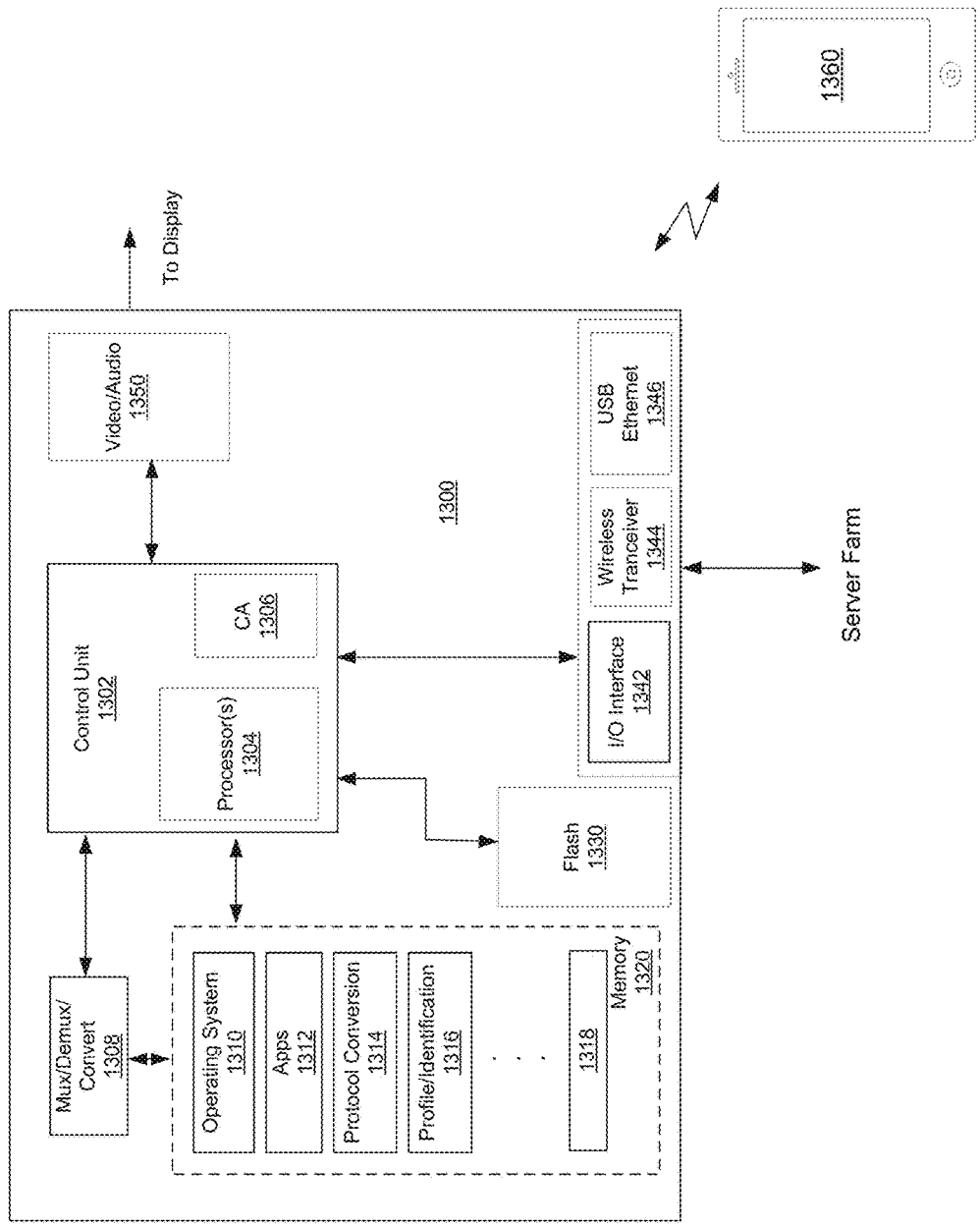
FIG. 13 depicts one embodiment of a receiver and mobile device.

Turning now to FIG. 13, a general block diagram illustrating one embodiment of a set-top box 1300 and mobile device 1360 is shown. Set-top box 1300 is shown to include a control unit 1302 including processor(s) 1304 and conditional access (CA) type unit 1306. Set-top box 1300 includes memory 1320, persistent memory (Flash) 1330, I/O interfaces 1342, wireless transceiver 1344 configured to support WiFi, Bluetooth, or any other wireless communication protocol, and USB, MoCA, and Ethernet, and other interfaces including, for example the Apple Thunderbolt interface 1346. A mux/demux/convert unit is included which may be configured to receive, demultiplex, and convert the formats of receive signals. A video/audio unit 1350 is included to convey audio and video data to a display device. Such audio and video data includes audio/video content received by the set-top box and also includes any overlays or other graphic elements generated by the set-top box 1300. Also included are operating system components 1310, applications (apps) 1312 executable by the processor(s) 1304, components 1314 for use in converting between communication protocols, viewer profile/identification 1316 related components, and any other 1318 suitable components. In various embodiments, the set-top box can optionally exclude tuners in the conventional sense. In other words, the set-top box can have no QAM or ATSC tuners. Rather, in various embodiments, the set-top box receives video content via a network interface such as an interface coupled to the Internet.

In various embodiments, the set-top box 1300 can optionally exclude mass storage (such as a disk drive or similar DVR type mass storage device) and is not configured to provide access to locally attached mass storage. Rather, sufficient storage for some video buffering, operating system and application memory resident operations, and so on, may be all that is provided. In such an embodiment, the set-top box 1300 is generally configured for video streaming and not video storage. Other embodiments could include or provide access to local mass storage. Mobile device 1360 may be a dedicated remote control device, smart phone, or other device that is configured to communicate with the set-top box 1300. As discussed above, in various embodiments the device 1360 may be identifiable as being associated with a subscriber. Responsive to such identification (e.g., using identification component 1316 and communication with a subscription service), the set-top box may be authorized to receive subscriber content. In other embodiments, biometric data may be entered to the device 1360 (e.g., a fingerprint or voice sample) which is then used for authentication/authorization. Various such embodiments are possible and are contemplated as per the discussion above.

Figure 14:
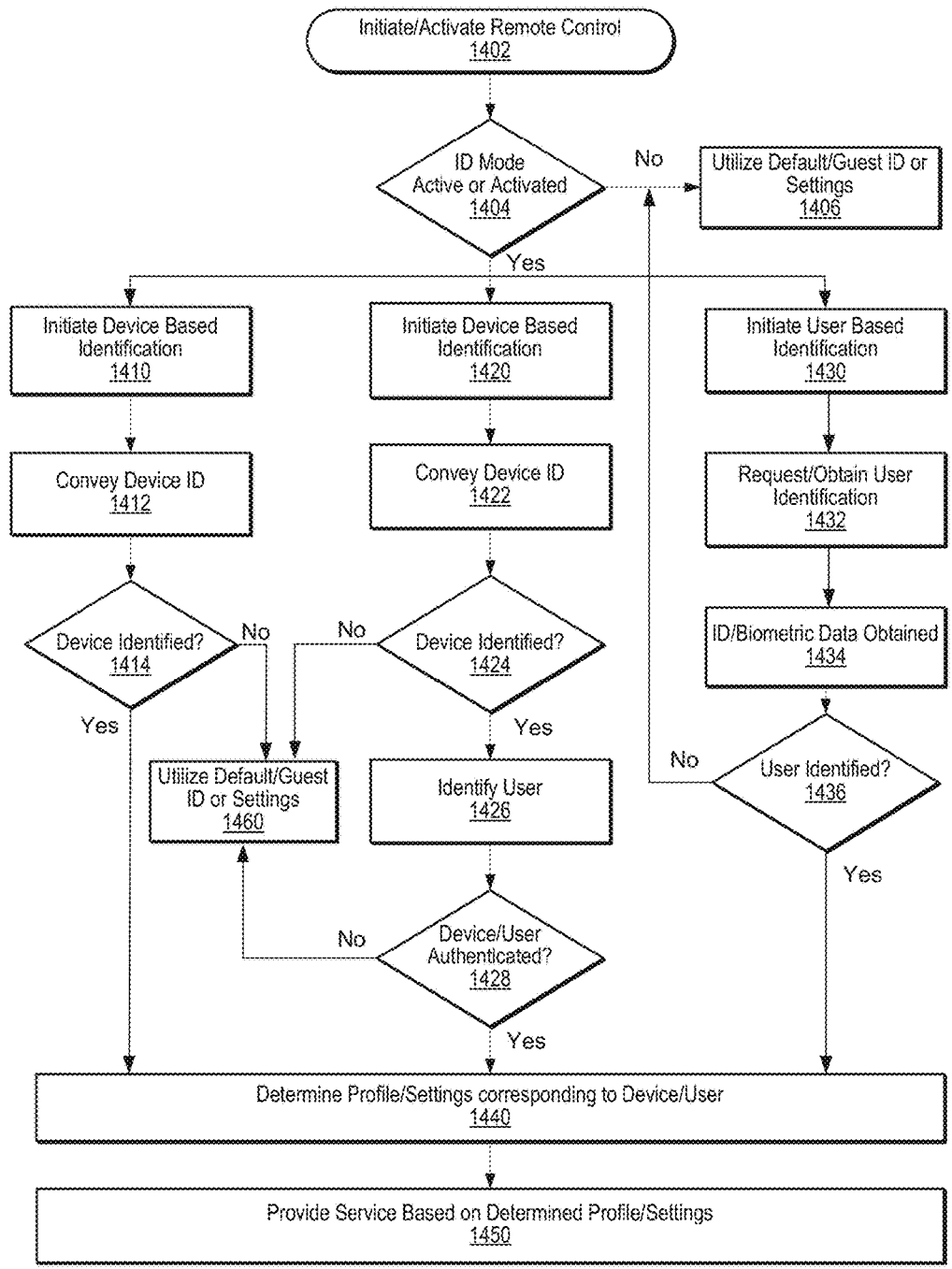
FIG. 14 depicts one embodiment of a method for identifying a subscriber.

FIG. 14 illustrates one embodiment of a method for use in identifying a subscriber and authorizing the receipt of subscriber content at a particular device. In the method shown, a remote control or other handheld device is used to initiate or activate the procedure (block 1402). In various embodiments, such activation may be initiated by starting a particular app on a smart phone, detecting movement of a remote control via an accelerometer or similar device, pushing a button on a remote control, detecting and optionally identifying a fingerprint of a finger resting on a touch pad of a remote control, recognition of a voice in response to the receipt of a voice command, and so on. In an embodiment in which the identification mode may be enabled and disabled, if the mode is disabled (decision block 1404), default settings or guest ID type settings (1406) may be used for the set-top box, television, or other associated video display device. For example, by default a set-top box may be configurable by a viewer to display particular content (for example, content that corresponds to the owner of the home in which the set-top box is located). If ID mode is activated (decision block 1404), then an identification/authorization procedure is initiated. For ease of discussion, three different embodiments are illustrated in FIG. 14. Block 1410 corresponds to an embodiments in which identification is based on the mobile device being used to communicate with the set-top box (e.g., the smart phone based example described above). A second embodiment proceeds with block 1430 is represents a biometric or other approach that is not based on the particular mobile device being used. Finally, a third embodiment begins with block 1420, which represents a combination of device and user identification. Depending on the embodiment, one of these three paths will be chosen. In various embodiments, only one such path/embodiment is available. In other embodiments, multiple such paths/embodiments are available and may be selected as a preferred method by configuring the set-top box or other receiving device accordingly.

Beginning with block 410, device based identification is initiated. In this embodiment, an identification of the mobile device 1412 is received by the set-top box from the mobile device. While a set-top box is described as the receiving device for purposes of discussion, it is to be understood that the receiving device may be a television with supporting circuitry, a game console with supporting circuitry, or otherwise. Having received the device identifier, an effort to identify the device is undertaken (decision block 1414). Such identification may include communication with the subscription provider which accesses a subscriber database or otherwise to determine if the mobile device is associated with a subscription. In other embodiments, the set-top box may store device identifiers for a certain period of time (e.g., 24 hours) with associated authorization information. In such an embodiment, re-authorization would only be needed once per day or according to some other time interval. In such embodiments, the subscription provider may be able to invalidate such set-top box data at will in order to require re-authorization. If the device is not successfully identified, then default or guest settings 1450 may be used. If the device is successfully identified and it is associated with a valid subscription, then settings that correspond to the subscription may be obtained (e.g., settings for the set-top box environment, settings for the particular user, etc.) (block 1410), and access to the subscription based content is authorized (block 1450).

Alternatively, the path may begin with block 1430 where user based authentication is initiated. In such an embodiment, user identification may be requested by the remote control/mobile device (block 1432). In response, a viewer provides biometric or login type data (block 1432). If the user identification is successful (block 1436), then the method continues with block 1440. Otherwise, default or guest settings may be used (block 1406). User identification may include a process similar to that described in association with block 1414.

Finally, the third approach begins with block 1420 where device based identification is initiated. In this embodiment, the device is first identified (blocks 1422 and 1424). If the device is successfully identified, then an attempt to identify the user is made (block 1426). This may be used to verify that the remote control/mobile device is being used by the rightful owner or otherwise expected user. If both the device and user are properly identified as corresponding to a valid subscription (decision block 1428), then the method proceeds with block 1440. Otherwise, default or guest settings may be used (block 1406). In each of the embodiments, default settings may be configurable and may include disabling access completely, conveying a communication (email, text message, etc.) that indicates the failed attempt, or otherwise.

Figure 15:
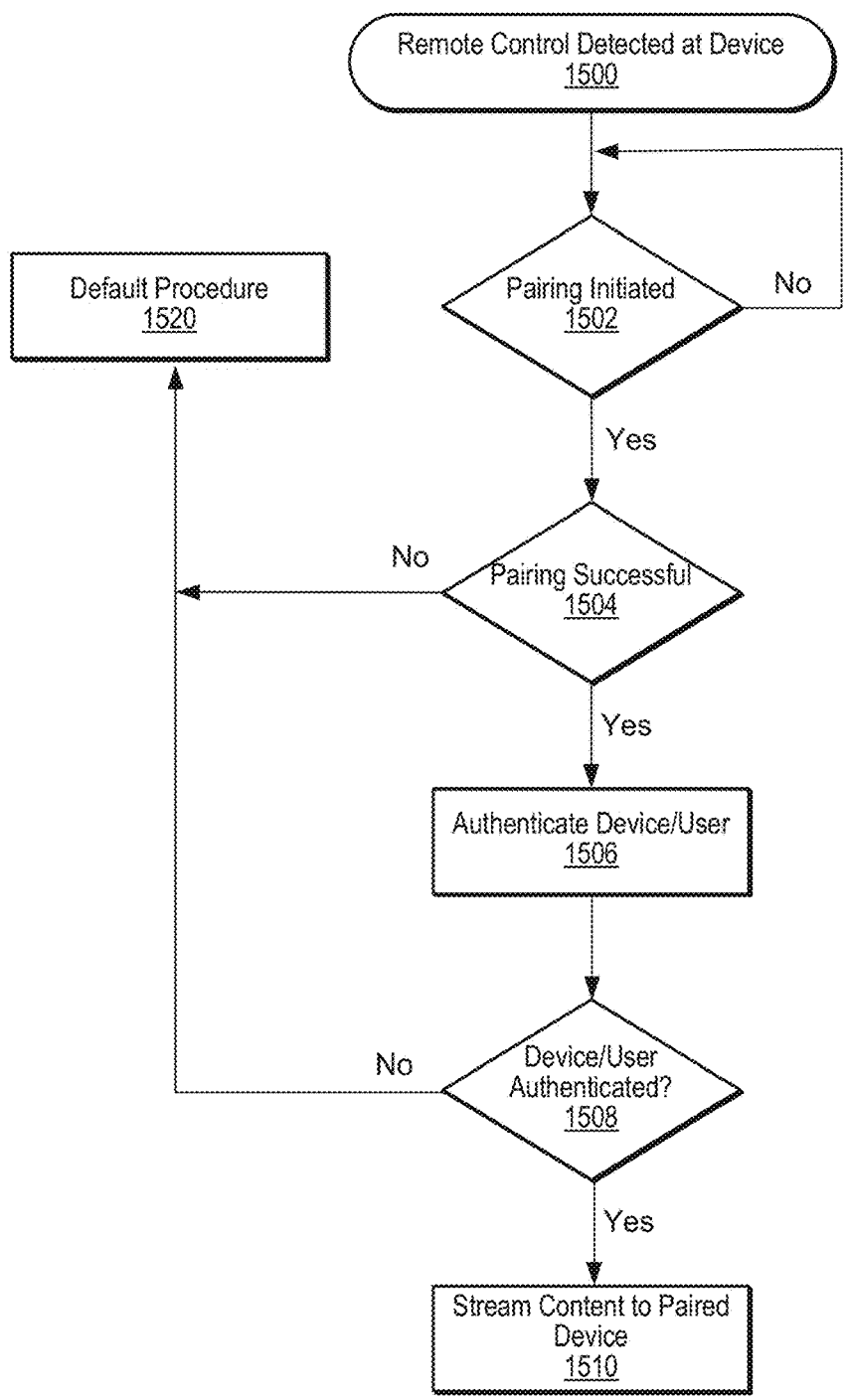
FIG. 15 depicts one embodiment of a method for pairing a television and mobile device.

Turning now to FIG. 15, one embodiment of a method for pairing a remote control or other mobile device with a set-top box or other video display device is shown. In various embodiments, a remote control or other device may use Bluetooth or any other suitable wireless communication protocol to establish communication with a set-top box or other device. In the example shown, a remote control device is detected (block 1500). This detection may be pursuant to an explicitly initiated detection procedure, or could be based on a constant broadcast and detection mechanism. Responsive to detecting a device, a pairing attempt may be initiated (decision block 1502). If pairing of the remote control with the set-top box is successful (decision block 1504), then device and/or user authentication is initiated (block 1506). This authentication may correspond to the various embodiments discussed in relation to FIG. 14. If authentication is successful (decision block 1508), then streaming of the subscription based content to the paired device (e.g., set-top box) is authorized. If authentication is not successful (decision block 1508), then a default procedure may be used (block 1520). This default procedure may include disabling access to the set-top box, using default or guest settings, or any other procedure deemed suitable.

Figure 16:
FIG. 16 depicts one embodiment of a video display.

As discussed above, the primary provider will generally have a great deal of content available for viewing by a given subscriber. The content that is available may be determined in part based on secondary subscriptions of the viewer. As noted, there may be duplication among the secondary subscriptions and/or primary subscription as to available content. Additionally, particular content may be available in many forms. FIG. 16 illustrates some of the various forms that content may take.

In the example shown, content may differ as to cost 1602 (viewable for free or viewable for payment of a fee) and quality (HD or SD) 1604. In addition, presentation of content may include presentation with advertisements (ADs) or without ADs 1606. With only these variables, given content may correspond to one of eight different forms/presentations as shown by the tree 1610. In this case, the eight possibilities are:

1. Free, HD, with ADs
2. Free, HD, without ADs
3. Free, SD, with ADs
4. Free, SD, without ADs
5. Paid, HD, with ADs
6. Paid, HD, without ADs
7. Paid, SD, with ADs
8. Paid, SD, without ADs Given these possibilities, a viewer may have various preferences regarding how the given content is prioritized when either being presented as being available or when being selected for viewing. For example, a viewer may give a higher priority to free content over paid content. Also, HD content may be given priority over SD content, and so on. Using such preferences, selections from available content may be made for presentation to the viewer or when particular content is selected for viewing. In addition to such preferences, additional factors 1608 may be used to determine which content is provided to a viewer. For example, bandwidth considerations may affect the selection of content. If it is determined that the bandwidth to the viewer's device is limited, HD content may be disfavored (at least temporarily) until the condition eases. In such a case, the options indicated by 1620 and 1622 in FIG. 16 may be eliminated. Additionally, a viewer's preferences may generally indicate a preference for HD content. However, on a particular occasion, the viewer's target device may have a very small display which may not generally reveal significant differences between SD and HD content. In such a case, SD may be preferentially conveyed.

Figure 17:
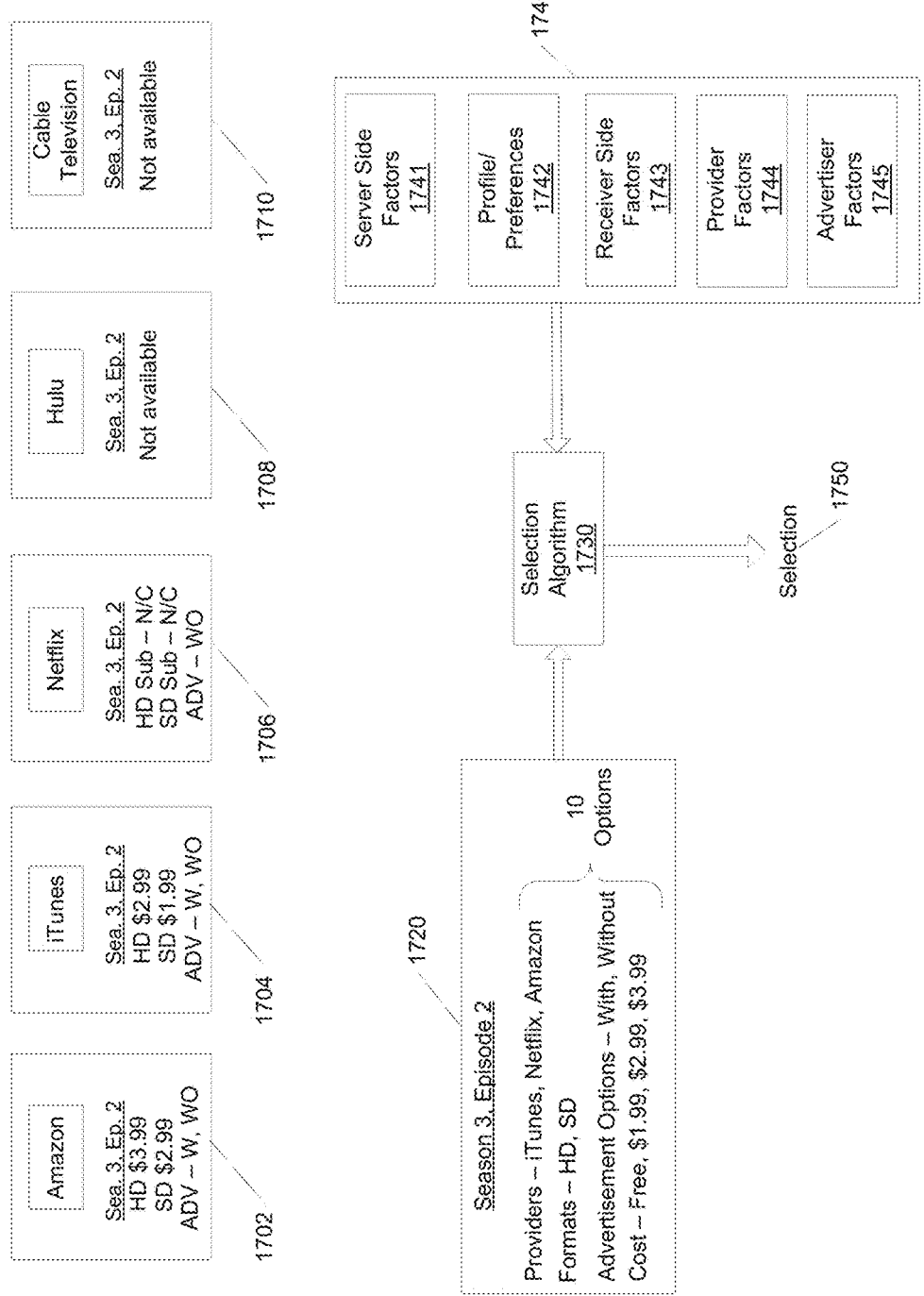
FIG. 17 depicts one embodiment of a video display.

FIG. 17 depicts one embodiment in which multiple options for content are available. In the example shown, five secondary providers 1702, 1704, 1706, 1708 and 1710 are shown. The particular content in question is Season 3, Episode 2 of a given series. For this given episode, box 1720 shows there are 10 different selections available. There are three secondary providers of the particular content available—iTunes, Netflix, and Amazon. The content is available in both HD and SD. The content is available for free (Netflix subscription—no additional charge N/C), at a cost of $1.99, $2.99, and $3.99. Finally, the content is available with or without advertisements. All 10 options serve as input to a selection algorithm 1730. Also serving as input to the selection algorithm are server side factors 1741, viewer profile/preferences 1742, receiver side factors 1743, provider factors 1744, and advertiser factors 1745 (collectively factors 1740). Viewer profile/preferences 1742 may include information based on a viewer's viewing habits and activities, explicitly entered viewer preferences or information, profile and/or preference information related to other viewers, or any combination of these. Such profile and/or preference information may generally be referred to as a viewer "profile" herein. Server side factors 1741 may include processing and bandwidth considerations. Profile/Preferences 1742 have been discussed. Receiver side factors 1743 may include information received from a target device regarding processing, memory, or other condition that may affect performance. Provider factors 1744 may include agreements with secondary providers regarding how content is to be provided. Finally, advertiser factors 1745 may include agreements with advertisers how advertisements are to be presented. As may be appreciated, many other factors are possible and are contemplated.

Given the available content options and factors 1740, the algorithm 1730 selects one or more of the options for presentation to the viewer. Such a process may be repeated as need to generate a plurality of items for presentation to a viewer (e.g., a number of episodes of a given series).

In the following discussion, various embodiments of the operation of a receiving device and interface are shown. Generally speaking, the embodiments described in the following figures are configured to operate with the embodiments in the foregoing description. It is further noted that the following described embodiments may be implemented in association with other video content delivery systems. For example, the following embodiments may be utilized in association with traditional cable or satellite television systems, special purpose set top boxes (e.g., Roku type boxes), Internet video providers, and so on. All such embodiments are contemplated.

Figure 18:
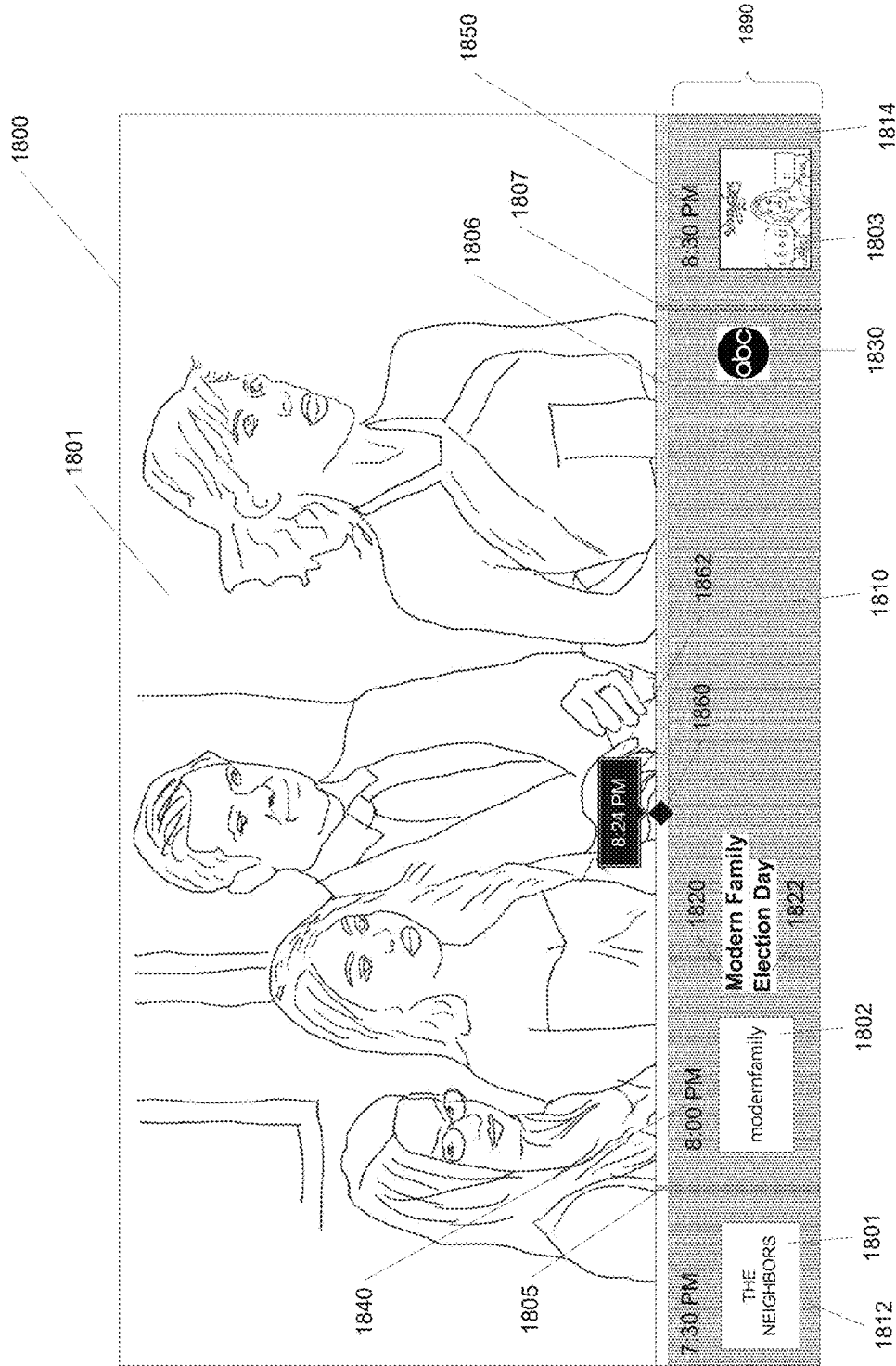
FIG. 18 depicts one embodiment of a video display and channel bar.

FIG. 18 illustrates one embodiment of a display with user interface channel bar. Display 1800 is shown displaying video content 1801 that may be streamed from a subscription based service provider (e.g., Apple TV). In various embodiments of the systems and methods described herein, a channel bar 1890 similar to that shown in FIG. 18 may be automatically displayed when a viewer turns on a television (or television and set top box) for viewing. The particular channel displayed may correspond to the last channel being watched when the television was turned off, a particular favorite channel that has been identified either explicitly or implicitly (e.g., based on viewing history), a channel with a particular program airing that is predicted to be of interest to the viewer (e.g., based on viewing history, past purchases, etc.), or otherwise.

Also shown in the lower portion of the display 1800 is a "scrubber" bar 1806 and channel bar 1890. In various embodiments, scrubber bar 1806 and channel bar 1810 are graphic overlay elements generated by a set-top box on top of the video content 1801. In the example shown, channel bar 1810 includes a central portion or element which corresponds to the currently displayed video content (an episode of the Modern Family television episode). This central portion includes a title 1820 for the currently depicted television series (Modern Family), and title 1822 of the currently depicted episode (Election Day). Also included in the central portion is a small image 1802 that corresponds to the currently depicted video content. In various embodiments, this image 1802 may be a still image, video content, animation, or otherwise corresponding to the television series or the particular episode. Also shown in the central portion is a beginning time indicator 1840 (8:00 PM) for the currently depicted video content. The central portion also includes an identification 1830 of the channel to which the currently displayed channel bar corresponds.

The central portion 1810 of the channel bar is separated from a first portion 1812 by a first separator 1805, and a second portion 1814 by a second separator 1807. The first portion includes the designation "Previous" and includes an image 1801 of a television program which immediately preceded the currently displayed content on the channel identified by the indicator 1830 (the same channel as the currently displayed content). The second portion 1814 includes an image 1803 that corresponds to the television program that immediately follows the currently displayed content on the identified channel 1830. The second portion also includes a time indicator 1850 (8:30 PM) which indicates at what time the television program identified in the second portion 1814 begins. In general, these time indications may serve to indicate the duration of the corresponding video content. Other embodiments may include an explicit duration indication in the channel bar for each element/show depicted. The scrubber bar 1806 includes a current position indicator 1860 that is used to indicate the current position of the displayed content 1801 within the television program identified in the central portion 1890 of the channel bar. Also shown is a time indicator 1862 that corresponds to the current position indicator 1860. In the present example, the video content 1801 is that of a live television broadcast. As such, the scrubber bar to the left of the position indicator 1860 has a different appearance from that of the scrubber bar to the right of the position indicator 1860. The lighter colored portion to the left of the indicator 1860 indicates already broadcast content. As the content has already been broadcast, it is possible to rewind back into that content. The darker colored portion of the scrubber bar to the right of the position indicator 1860 indicates content which has not yet been broadcast. Consequently, it is generally not possible to fast forward to such (future) content. However, in various embodiments as will be discussed later, such "future" content may be immediately viewable.

In various embodiments, the display shown in FIG. 18 is presented as a uniform presentation to the viewer. In other words, the viewer is not provided any indication that any element of the presentation corresponds to other than a single subscription (e.g., a cable television subscription). However, in embodiments according to the primary and secondary subscriptions as discussed above, the primary subscription based provider of the content displayed in FIG. 18 has aggregated and stored video content corresponding to numerous secondary subscription based providers. Accordingly, while a viewer may perceive the content displayed in FIG. 18 as representing that corresponding to a cable television subscription (for example), in fact the primary subscription provider provides the content in a manner that is agnostic with regard to its associated source. In other words, the viewer may have a cable television subscription with a given cable television operator.

Figure 19:
FIG. 19 depicts one embodiment of a video display and channel bar.

A viewer's secondary subscription entitles the viewer to access particular content stored in the primary provider's server farm that represents the cable television subscription content. The content actually provided to the viewer may not have been obtained from the cable television operator—it is of no importance to the primary provider. The content in this case is fungible as to its source. Similarly, the content depicted as the previous television program 1812 and the content depicted as the next television program 1814 are likewise fungible as to source. If the viewer rewinds into the "Previous" content 1812, the content displayed may in fact be video content that was recorded and stored in the server farm a year ago (e.g., assuming the episode was a rerun and was originally broadcast at least a year ago). From the perspective of the viewer, they had simply rewound to buffered content that was broadcast within the last hour. Additionally, the content itself may have actually been acquired from a cable television or other operator other than the one to which the viewer has a subscription. In each case, the original source of the video content is unimportant to the primary provider. All content is provided directly by the primary provider, and sources of content are relevant to the extent that they are used to identify content available according to a given secondary subscription. Similarly, the next television program 1814 may be obtained by the primary provider from a source other than the subscribed cable television operator. In the embodiment of FIG. 18, the central portion of the channel bar 1890 is made the largest portion of the channel bar. This central portion corresponds to the video content currently displayed and provides additional space for inclusion of details and information concerning the currently displayed content. In addition, the portion of the scrubber 1806 that corresponds to this central portion is likewise enlarged. The portions (1812, 1814) at either end of the channel bar 1890 are smaller in comparison to the central portion. FIG. 19 illustrates an embodiment of the display 1900 shown in FIG. 18 when the channel bar 1890 has either been dismissed by the viewer, or has been removed due to a timeout condition (e.g., viewer inactivity for at least a given period of time). Here, the video content 1901 continues on the display 1900.

Figure 20:
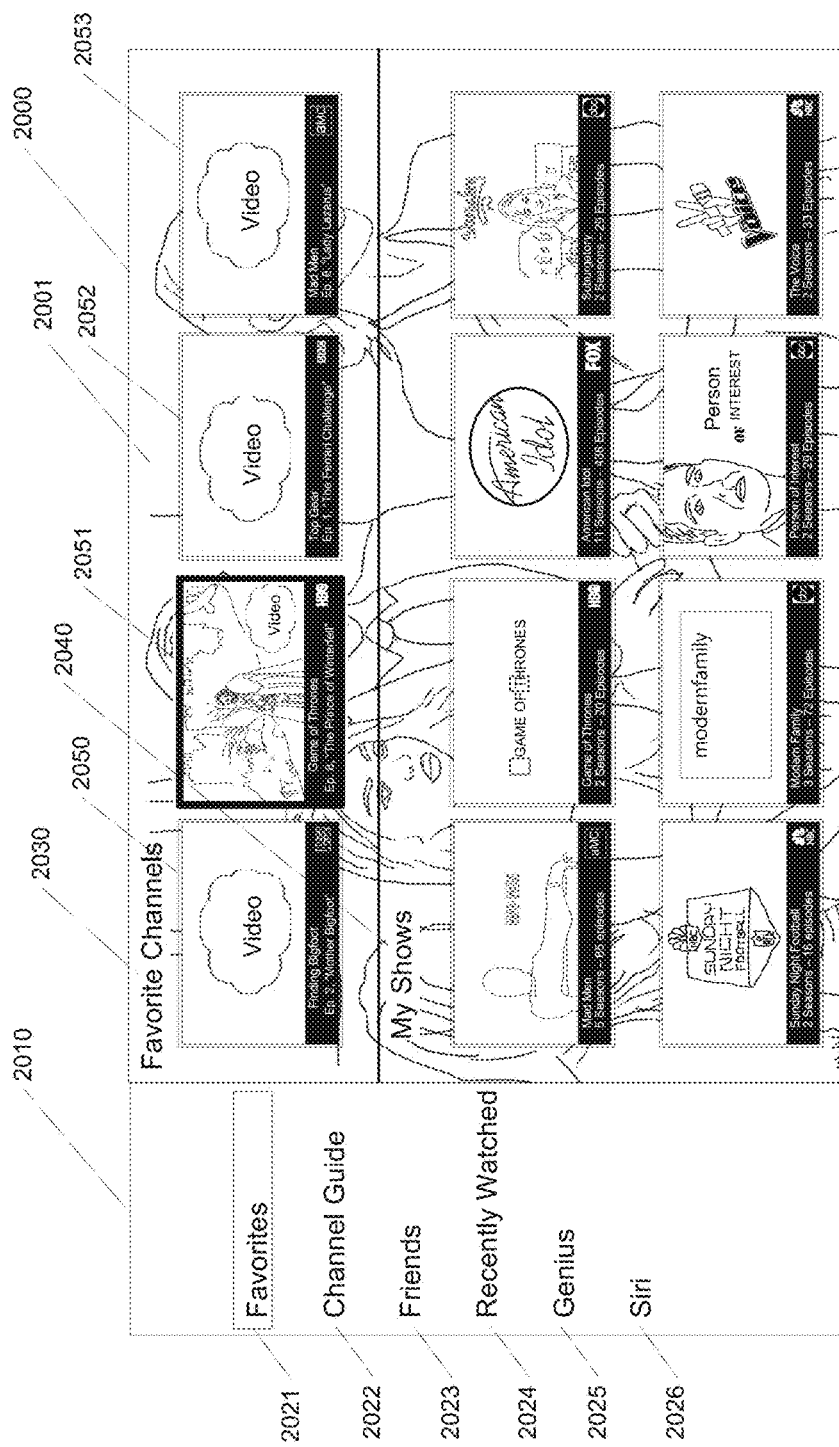
FIG. 20 depicts one embodiment of a video display and user interface.

Turning now to FIG. 20, one embodiment of a display 2000 is shown with the presentation of video content 2001. However, in this example, one embodiment of a "side bar" 2010 is presented with other content that will be described. It is noted that while the "side bar" is described as such for purposes of discussion, in various embodiments, the side bar may in fact be presented along the top, bottom, opposite side, center, or otherwise. For example, an embodiment in which the side bar is presented in the center may have related content displayed surrounding the bar. All such embodiments are contemplated. In various embodiments, the side bar 2010 and/or related elements are generated (e.g., by a set-top box) as overlays. However, as with all overlays discussed herein, presentation as integrated video elements is possible as well.

As shown in FIG. 20, the side bar 2010 includes multiple elements 2021-2026 that may be highlighted and/or selected by a viewer (e.g., using input via a remote control device). In this example, the displayed elements generally correspond to categories including Favorites 2021, Channel Guide 2022, Friends 2023, Recently Watched 2024. Also shown is a Genius category 2025 that may be selected to provide recommendations based on other content the viewer has watched, liked, purchased, rented, and so on. Further, a Siri category 2026 is included which may be selected for use in providing voice input to the system (e.g., directives, queries, etc.). Overlaying the remainder of the display are other side bar related elements. In this example, the Favorites element 2021 has been highlighted or selected by a viewer. In response to such a selection, video and/or other media content that the viewer has indicated are favorites of the viewer are displayed to the right. In this example, the favorite content includes Favorite Channels 2030 and favorite shows termed My Shows 2040.

In the Favorite Channels 2030 portion of the display, four channel elements 2050-2053 ("channels") are displayed—each showing video content for the corresponding channel. The display of the channels is that of a miniature display with an aspect ratio that corresponds to a typical television. As may be appreciated, the size and aspect ratio of the depicted channels may differ from that shown. Additionally, the number of "channels" shown may be more than four, or fewer than four. For example, a large number of such channels may be depicted by making each of the channel depictions smaller. It is also noted that not all such channel depictions need be the same size. In various embodiments, some may be larger than the others. All such alternative embodiments are contemplated. The video content being shown for each channel may be live broadcast video, for example, or otherwise.

In the embodiment shown, each channel depiction includes not only video content for the corresponding channel, but also a description at the lower part of the depiction which identifies the television series to which the video content corresponds, an episode number for the television show, a title for the particular television show, and an identification of the channel. For example, channel element 2051 provides the series title Game of Thrones, with episode 8 (Ep. 8) entitled "The Prince of Winterfell" currently being displayed. The channel identifier identifies the corresponding channel as HBO. It is noted that in this discussion, and elsewhere in the described embodiments, various embodiments may permit the viewer to configure the system such that video may or may not be displayed. For example, in some cases, it may not be desirable to have video displayed which would include "spoilers". In various embodiments, the system may be configured so that only animations, still pictures, or "innocuous" (non-spoiling) video is displayed. In some cases, it may be configurable based on category. For example, the viewer may not wish to see video displayed for sports events which may give away the winner/winning team. In other embodiments, the viewer may wish to see the video for multiple sporting events at a time so that all may be watched simultaneously. All such embodiments are contemplated.

In the My Shows 2040 portion of the display, eight television show elements are depicted. In this example, the television shows are depicted in a manner similar to that of the channels discussed above, and may vary in their depictions according to the above discussion as well. In the embodiment shown, each of the favorite shows depicts artwork for the corresponding show. However, as above, video or other content may be displayed. For each of the eight shows depicted, the lower portion of the depicted show includes descriptive information including a title of the show, how many seasons of the show (television series) are available for viewing, how many total episodes are available for viewing, and an identifier for the channel which carries the show. For example, the show in the upper left portion of My Shows 2040 depicts the Mad Men television show. Artwork representative of the television show is depicted.

The title "Mad Men" is provided along with an indication that 5 seasons and 65 episodes are available for viewing. The identified channel in this case is AMC.

It is noted that while the example of FIG. 20 depicts four channels and eight shows, they could be divided differently. For example, a larger number of channels than shows could be depicted. In various embodiments, the viewer may scroll or page through each category (Channels and Shows) of elements to view different channels and/or shows. Additionally, the viewer may use a remote control to dynamically change how many elements are depicted at once. For example, a viewer may zoom in on a single show to enlarge its depiction. Alternatively, a viewer may effectively zoom out to increase the number of shows depicted to twelve, sixteen, or some other number of elements. In addition, in various embodiments, the underlying video content 2001 may be the content being displayed at the time the viewer caused the side bar 2010 to be displayed. In various embodiments, the viewer may cause the audio for one of the elements 2050-2053 (or one of the shows) to be presented by moving the focus to that corresponding element. For example, in FIG. 20 the bold outline indicates element 2051 has focus and the audio for Game of Thrones may then be presented. In some embodiments, moving focus to an element may cause the corresponding channel or show to be displayed as the underlying content 2001. All such embodiments are contemplated.

Figure 21:
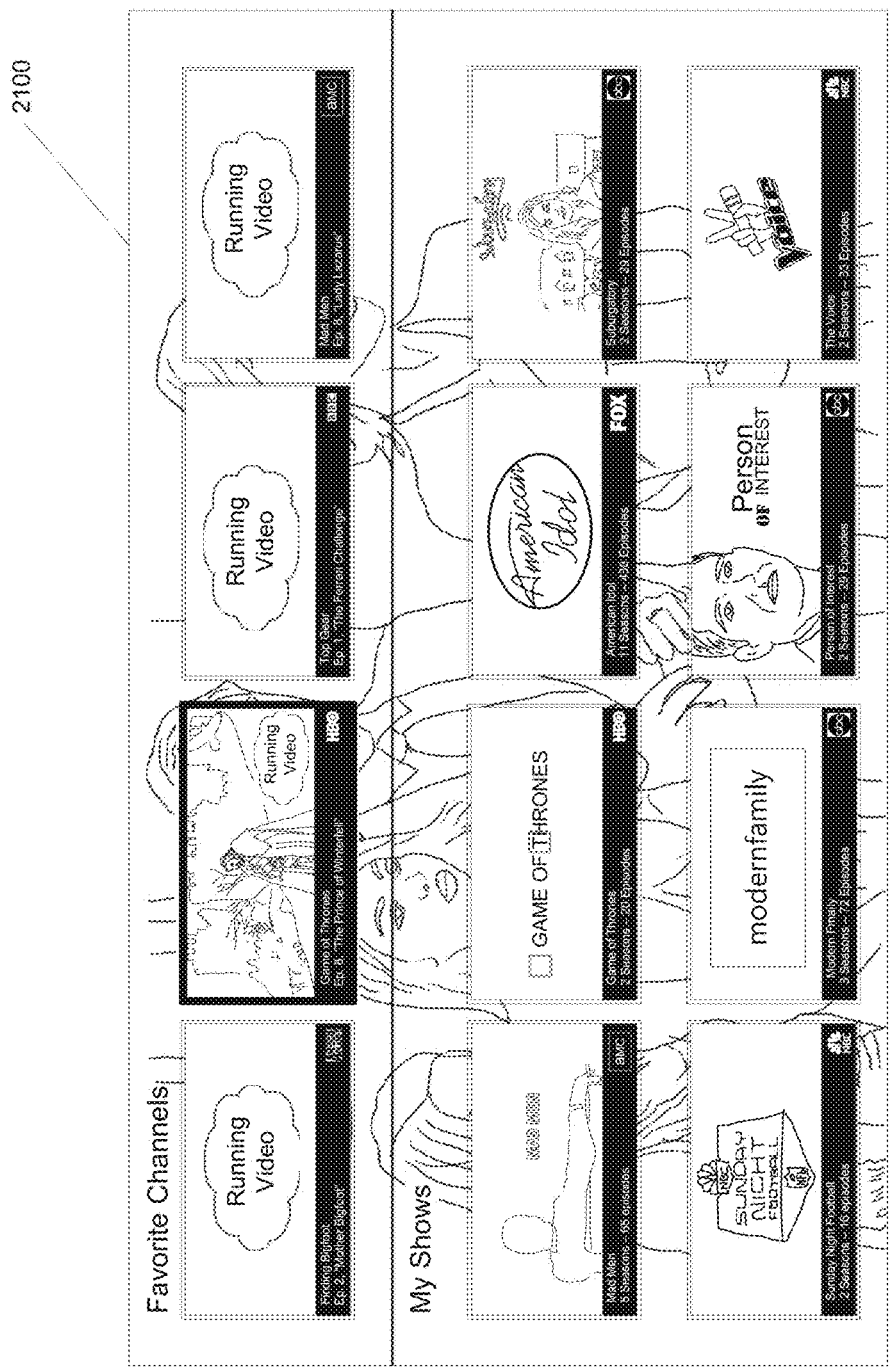
FIG. 21 depicts one embodiment of a video display and user interface.
Figure 22:
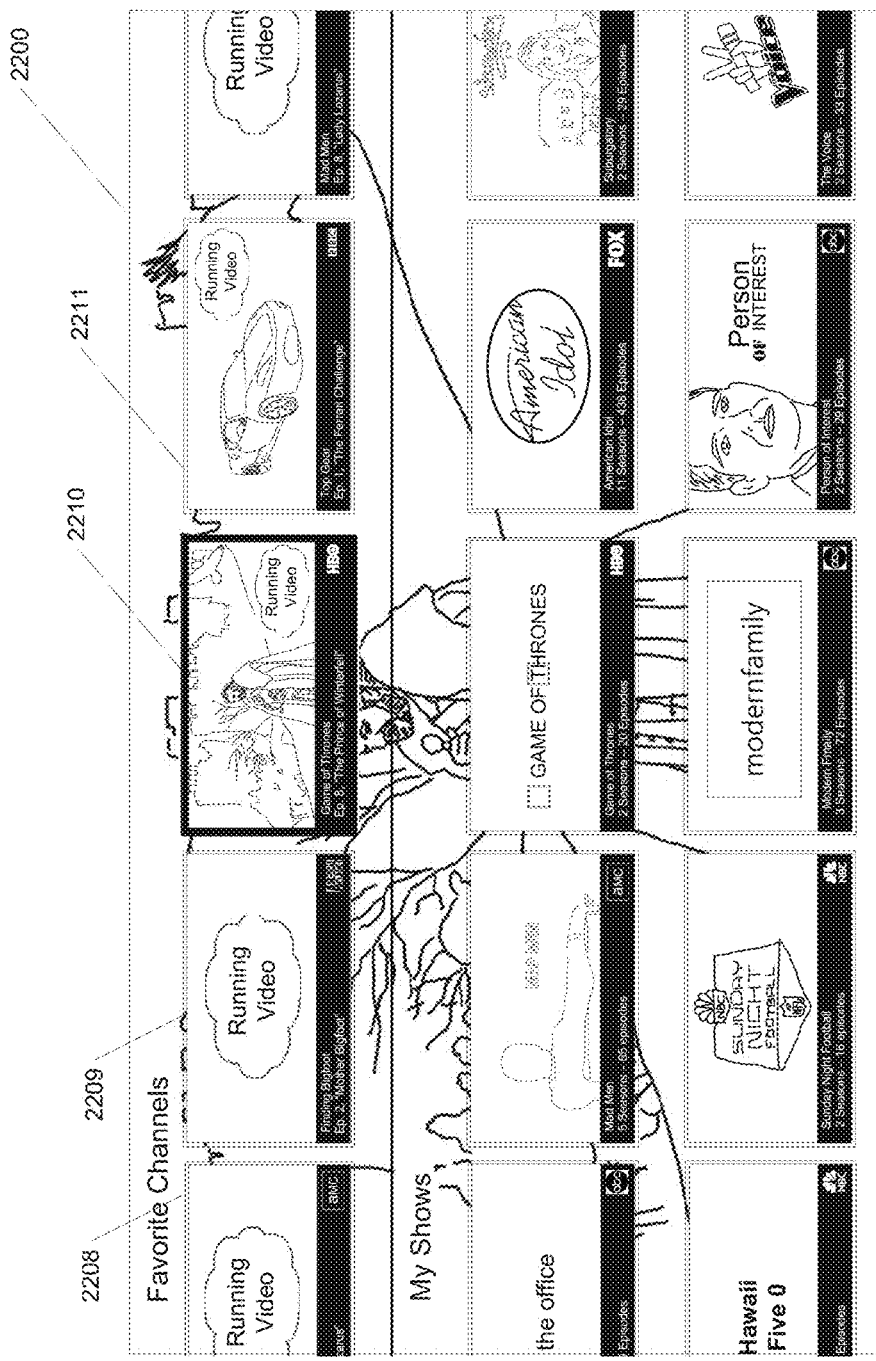
FIG. 22 depicts one embodiment of a video display and user interface.

FIG. 21 depicts a display 2100 the shows the side bar content of FIG. 20 without the side bar itself. In various embodiments, a viewer may use an input device to display or not display the side bar. Another input may be used to cause the side bar content to be removed entirely so that the underlying content is displayed in an unobstructed manner. FIG. 22 illustrates an alternative embodiment of the side bar content. In the display 2200 shown, the side bar content as before is depicted. However, in this embodiment, the content is clearly organized in a left to right/right to left scrolling manner. Additional content "extends" (in effect) off the edges of the screen. In this manner, it is intuitive to the viewer as to how the additional content may be viewed (e.g., by moving right or left).

Figure 23:
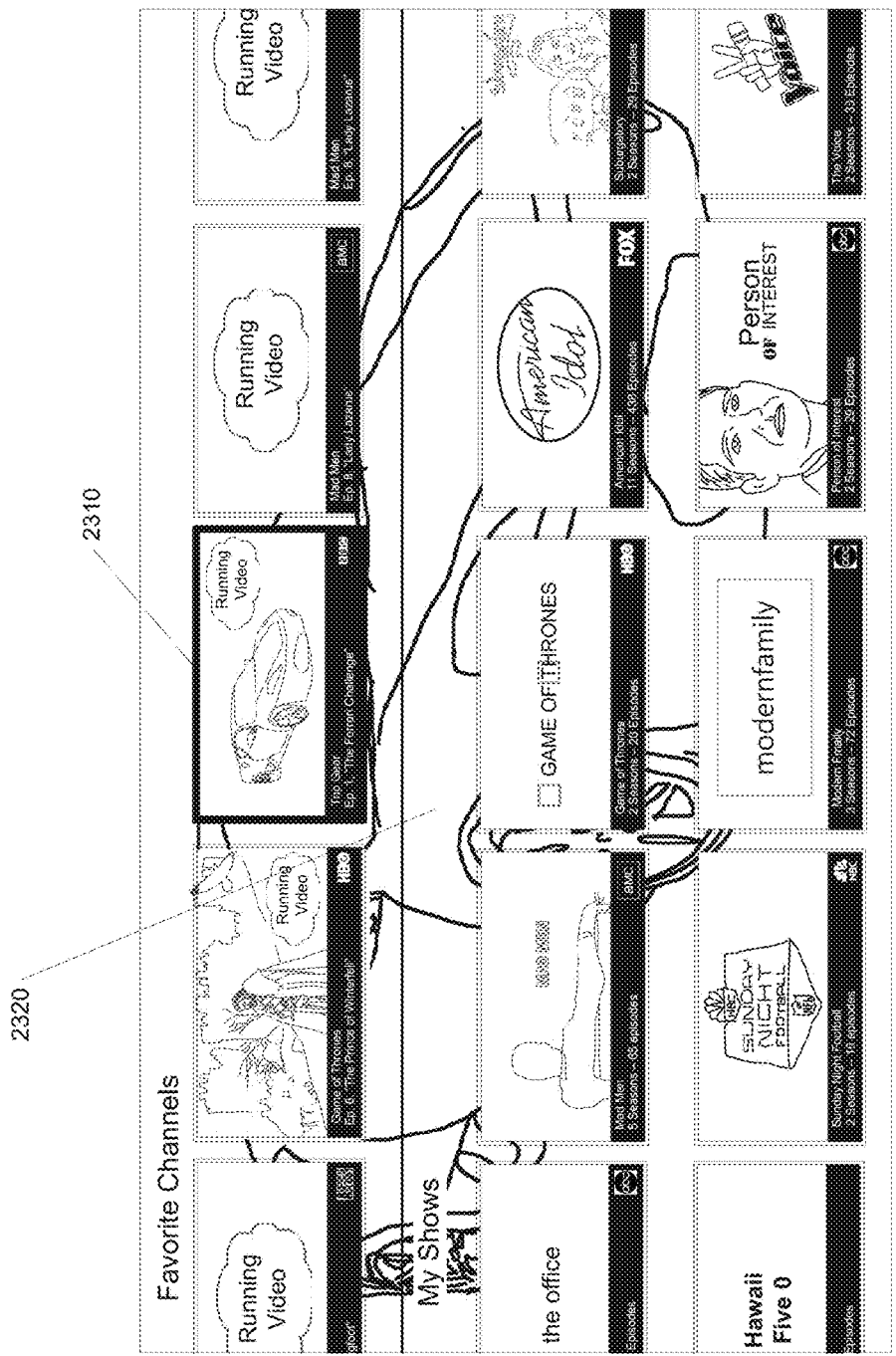
FIG. 23 depicts one embodiment of a video display and user interface.

In various embodiments, the focus may itself move and as the focus attempts to move beyond the edge of the display, new content is brought into view. For example, element 2210 is show to currently have focus as depicted by the bold border. This focus may be movable to element 2209. An effort to move to element 2208 (which is partially off of the display) may cause element 2208 to move to the right—potentially bring other content into view. Alternatively, the focus itself may be fixed in the center as shown. In such an embodiment, moving the focus actually moves the underlying content right or left. A move to the right may move element 2211 (Top Gear) into focus. FIG. 23 illustrates such an embodiment where Top Gear 2310 now has focus In various embodiments, the element with focus may have its audio presented (such a feature being enabled or disabled by the viewer). In the example shown, the item in focus also causes its content to be displayed as the underlying content 2320. However, as in the previous discussion, this may or may not be the case.

Figure 24:
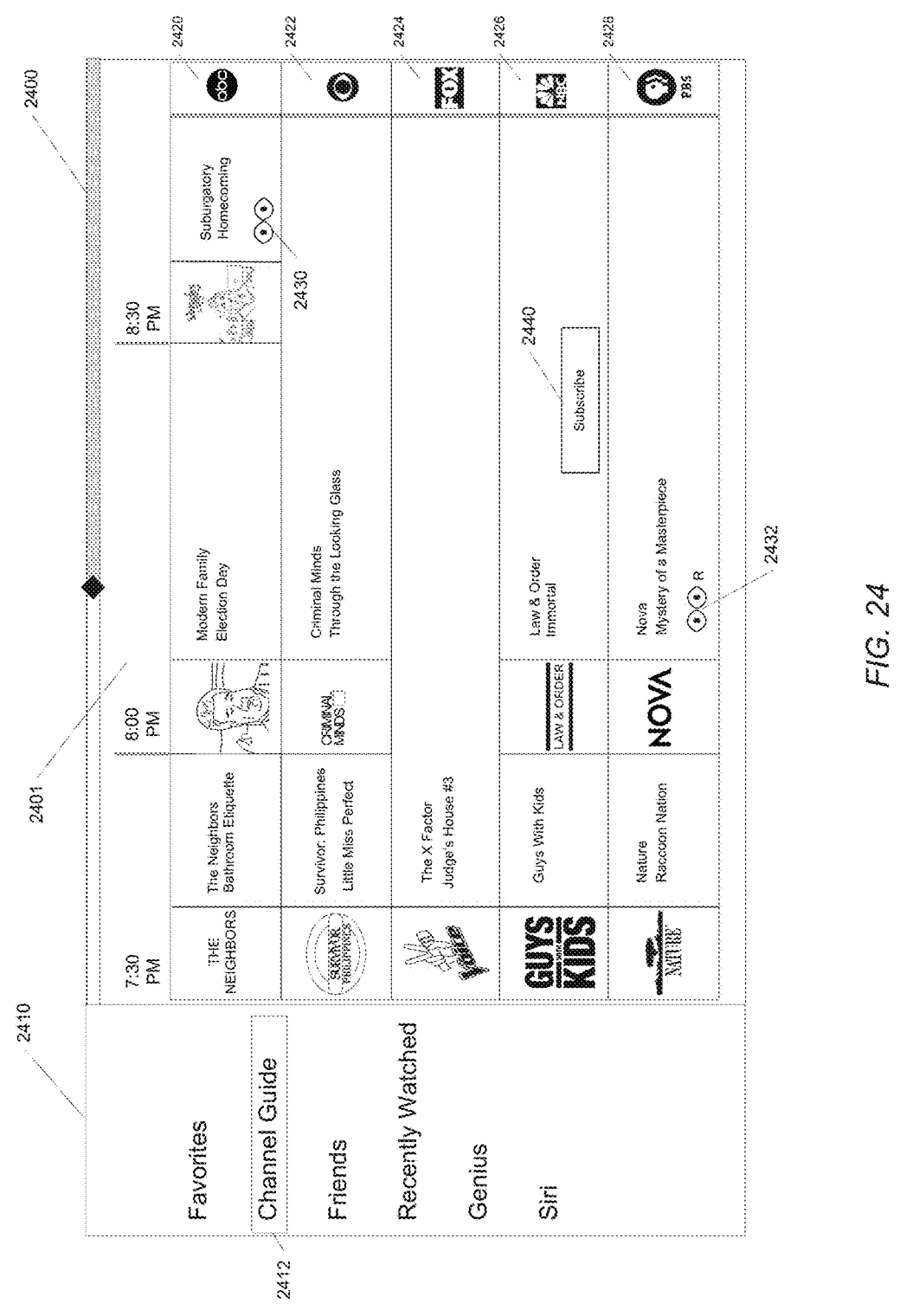

Turning now to FIG. 24, the side bar 2410 is again depicted on a display 2400. In this example, the Channel Guide element 2412 has been highlighted/has focus/or has been selected. In the embodiment shown, selection of the Channel Guide causes display of information regarding available channels. In this example, the embodiment is an electronic program guide (EPG) type display. EPG 2400 includes a scrubber bar similar to that previously described in FIG. 18. Included is a time bar 2401 displaying time periods for the grid. A separate row is included for each of five different television channels—ABC 2420, CBS 2422, FOX 2424, NBC 2426, and PBS 2428. Each portion of the grid for a given time slot then displays an image and descriptive information such as series title, and episode title for a television program. For example, the 7:30 PM time slot for the CBS network includes an image for the Survivor Philippines series with series title and episode title Little Miss Perfect. In this example, the display corresponds to live television broadcast and the scrubber depicts an already broadcast portion (light colored) and an as yet broadcast portion (darker colored). However, a "watch now" indicator 2430 indicator appears for the show "Suburgatory" to be broadcast at 8:30 PM.

As suggested, this indicator identifies content that is available for viewing immediately. Similarly, the "Nova" program includes a watch now indicator 2432 indicating it is immediately available for viewing. Having such watch now indicators in an EPG is rather strange given the television programs correspond to future broadcasts. However, given the systems, methods and mechanisms described herein, this is entirely possible.

As previously discussed, the systems described herein are generally agnostic as to a source of particular video content and as to a timing of its acquisition. Consequently, the constraints suggested by a typical EPG and television system and are no longer present. The television service provider which provides an EPG does so to inform the viewer as to the broadcast lineup and when particular content will be available for viewing. In this manner, the viewer can view or record the content for later viewing as desired. However, in the embodiment of FIG. 20, the EPG is provided by the primary provider to indicate to the viewer the programming schedule of various networks and not necessarily to indicate the availability of the video content. Consequently, while the Nova show "Mystery of a Masterpiece" is scheduled for broadcast on PBS from 8-9 PM, the primary provider does provide that content to the viewer by acquiring it from PBS during such a broadcast. Rather, the content is simply content that may or may not exist in the primary provider's data stores. If it does currently exist, then it may be available immediately. In this case, the episode in question is a repeat as indicated by the R designation next to the watch now indicator. Therefore, the episode is immediately available. That the episode appears in the EPG as being scheduled for broadcast beginning at 8:00 PM is happenstance.

While the NOVA episode is a repeat, the Suburgatory episode is not a repeat. The question may then arise as to how an episode which has not yet been broadcast can be immediately available for viewing. The answer lies in the record everything all the time design of the primary provider system. The Suburgatory episode is scheduled for broadcast beginning at 8:30 PM in a given time zone. However, in the present case, the episode has already aired in an earlier time zone. The content already resides in the primary provider's data stores and is immediately available for viewing. It is noted that in some cases agreements may be in place which prevent such "early viewing" of an episode. Such agreements may require that live broadcast episodes such as these be viewable during their "proper" time slots. Nevertheless, the systems described herein are fully capable of providing such early viewing and identifying such episodes in an EPG. Also shown in FIG. 20 is a selectable element 2440 that enables the viewer to subscribe to the Law & Order show (i.e., it is not currently subscribed). Selecting element 2440 may then present the viewer with options for subscribing to the series, purchasing a single episode, or otherwise. When selecting a particular series or episode (or any other content) for a subscription, as noted above there may be many sources available for the content. For example, numerous providers may be available for episodes of Law & Order. In such cases, the viewer may select from the available options to complete the subscription. In various embodiments, the various options may be prioritized or otherwise filtered for presentation to the viewer.

Turning now to FIG. 25, the side bar is again illustrated. In the display 2500 shown, the side bar 2510 is shown with the Friends element 2512 selected. In various embodiments, the systems and methods described herein enable viewers to identify other viewers as "friends". Such identification may use explicit input of friend identifier (IDs) to identify friends, sending and accepting of friend requests, the ability to establish one-way friendships (i.e., a first viewer identifying a second as a friend does not necessitate that the second identify the first as a friend), and so on. Associated with such friends may also be configurable levels of privacy. For example, close friends may have full access to a viewer's television viewing habits. Friends that are not so close may have more limited access to such information. In some embodiments, a viewer may be able to import friends from a social networking site. Various such embodiments are possible and are contemplated.

Figure 25:
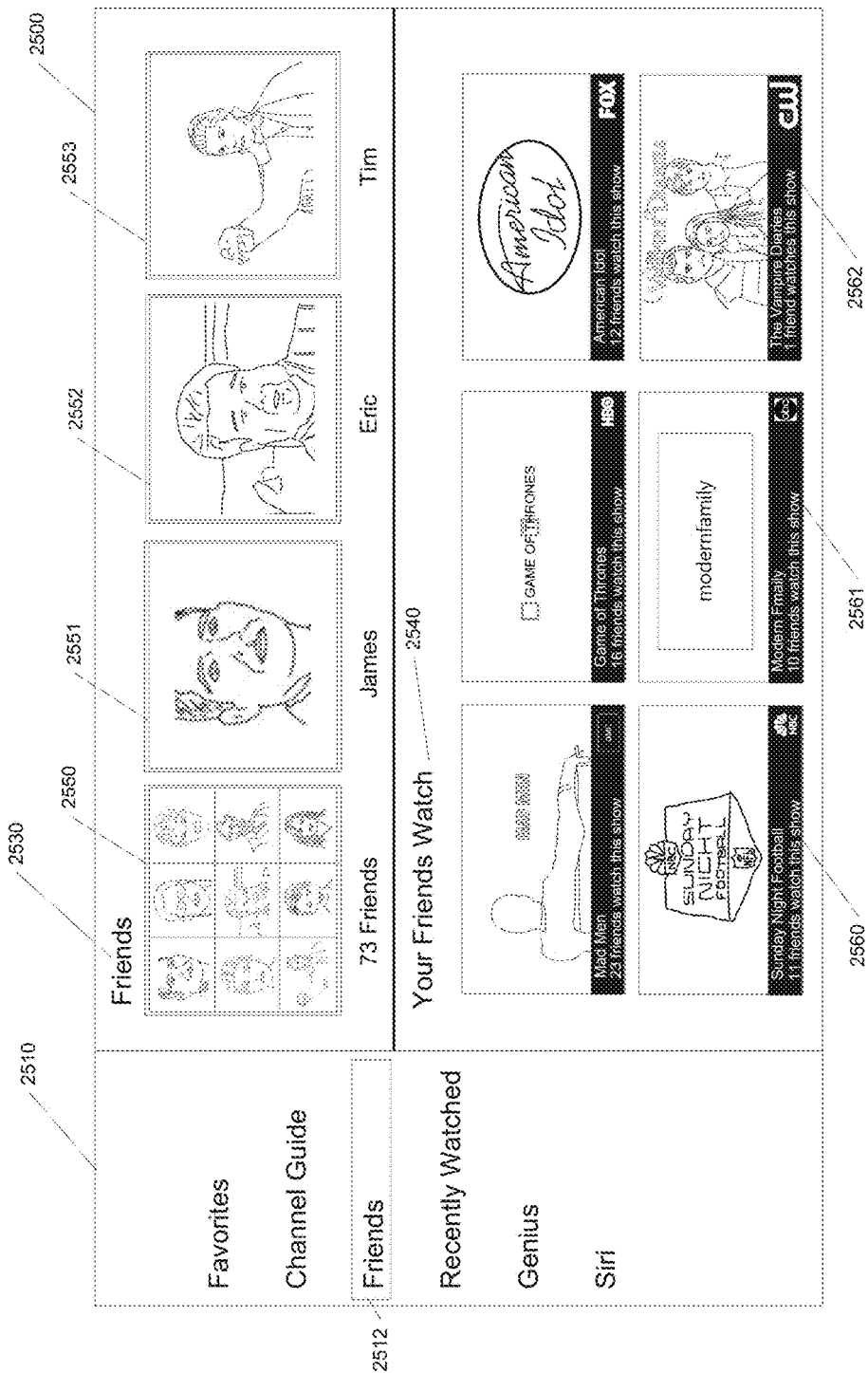
FIG. 25 depicts one embodiment of a video display and user interface.

In the embodiment shown, selection of the Friends element 2512 causes the display of a Friends 2530 category and a Your Friends Watch 2540 category. The friends category in this example includes a composite element 2550 representative of all of a viewer's friends (or some identified subset), along with selected individual friends 2551-2553 (e.g., these could be the closest friends, those most recently active in the system, those currently online, etc.). In various embodiments, friends may establish a profile within the television system that includes a picture, avatar, or other self-representation. While the Friends category 2530 depicts various friends of a viewer, the Your Friends Watch category 2540 depicts various television shows that are watched by the viewer's friends. In the example shown, artwork for each show is presented. However, other embodiments may display video (live or otherwise) for the given show. Also shown in the example of FIG. 25 is a brief description for each show in including its title an network. Additionally, each show provides an indication regarding the popularity of the show amongst friends. In the example shown, the number of friends that watch the particular show is indicated.

Figure 26:
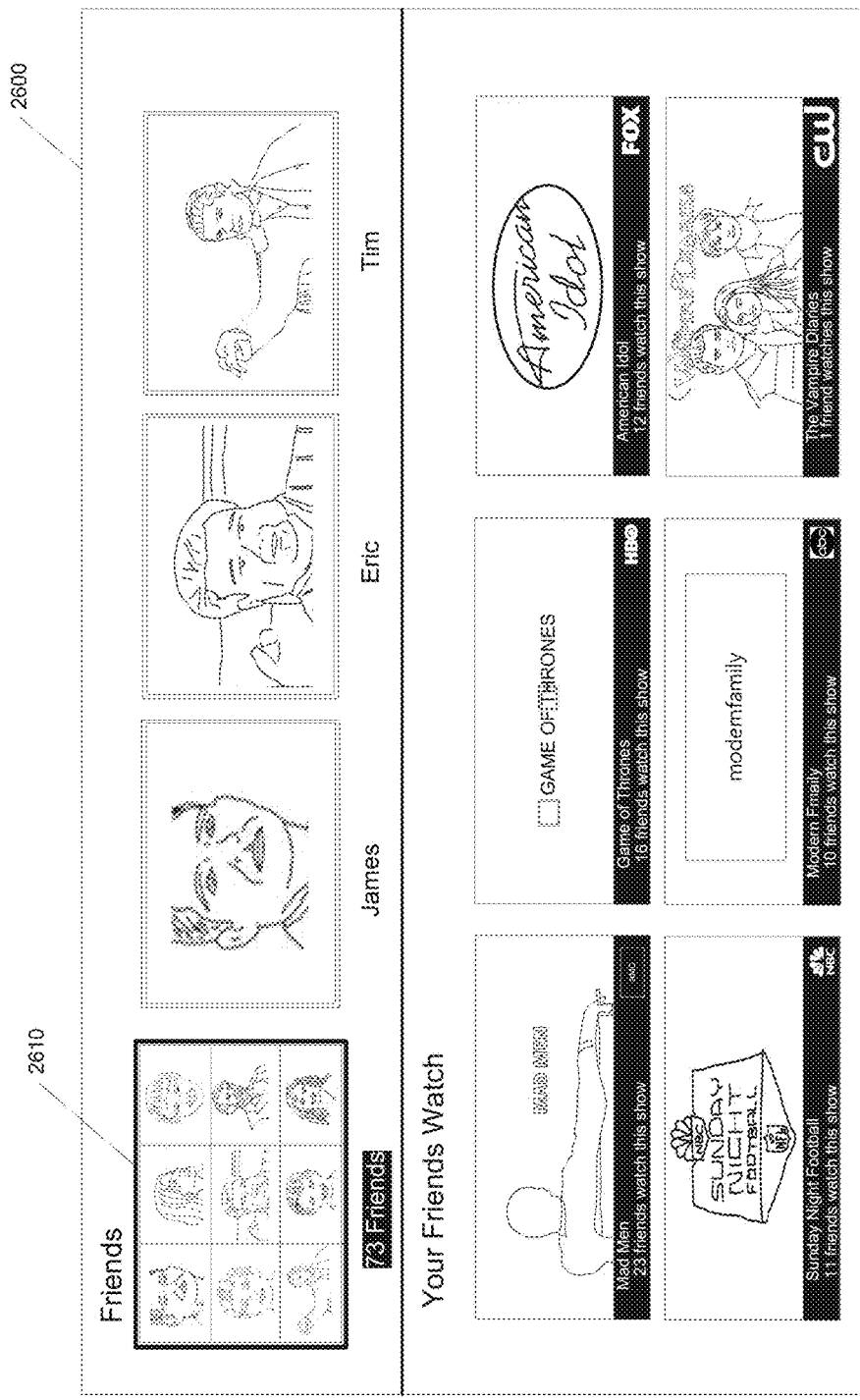
FIG. 26 depicts one embodiment of a video display and user interface.

FIG. 26 illustrates the Friends content of FIG. 25 without the side bar itself which may be dismissed by a viewer. In the example shown, the display 2600 shows composite element 2610 has focus. Element 2610 includes a number of pictures corresponding to the friends represented by the composite element. Beneath the element 2610 is an indication as to how many friends ("73 Friends") are represented by the composite element 2610. In this embodiment, selection of the composite element causes the content displayed in the Your Friends Watch category to be representative of the shows watched by the collection of 73 friends represented by the composite. In some embodiments, selection of a Friends element (e.g., move focus to an element, and then provide further input to select the element) may cause further information on the friend(s) to be displayed. For example, such selection of an individual friends could lead to a landing page created by that friends. Additionally, it may be possible to chat with the friends (text, audio, and/or video), leave messages, etc. All such embodiments are possible.

Figure 27:
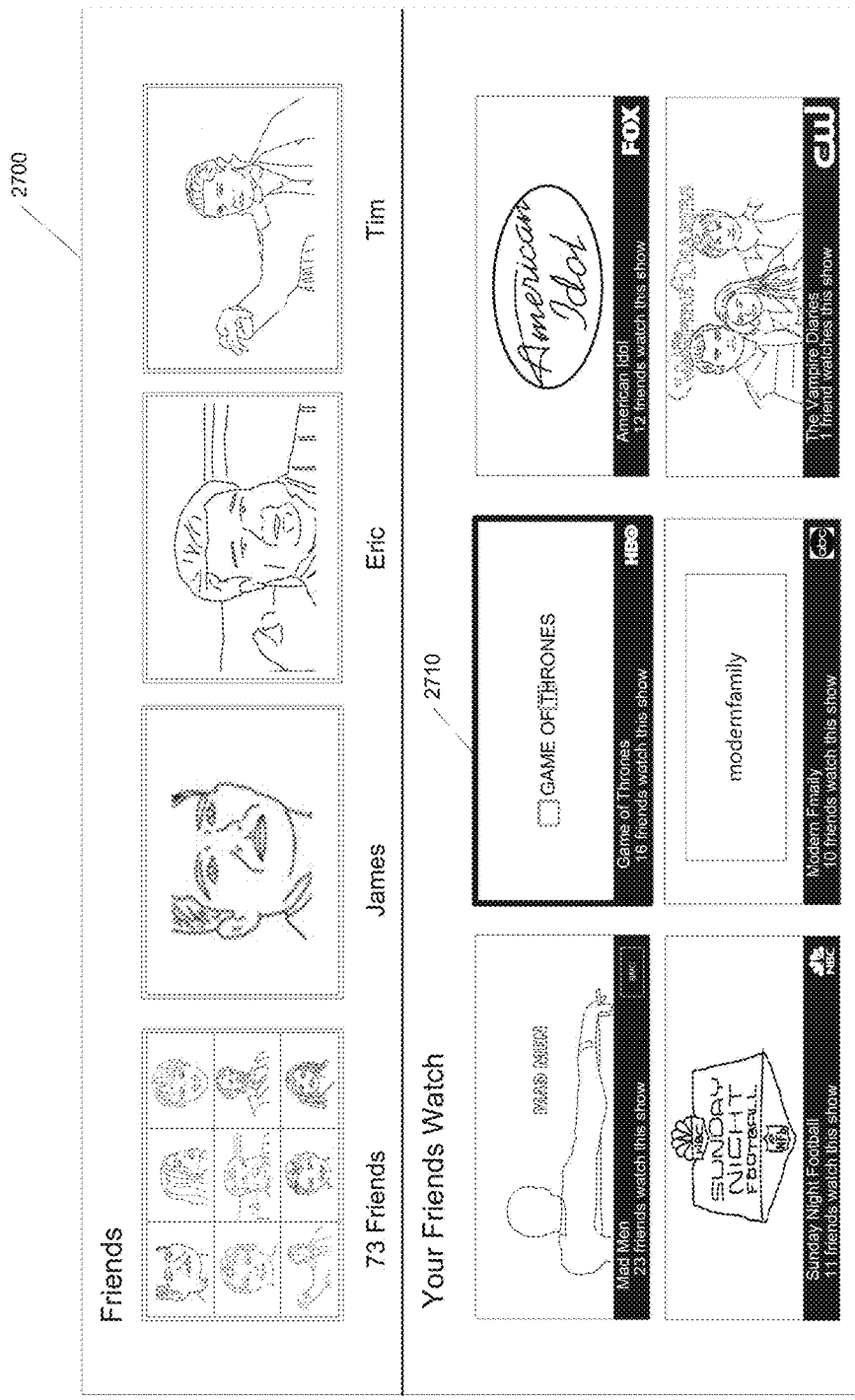
FIG. 27 depicts one embodiment of a video display and user interface.
Figure 28:
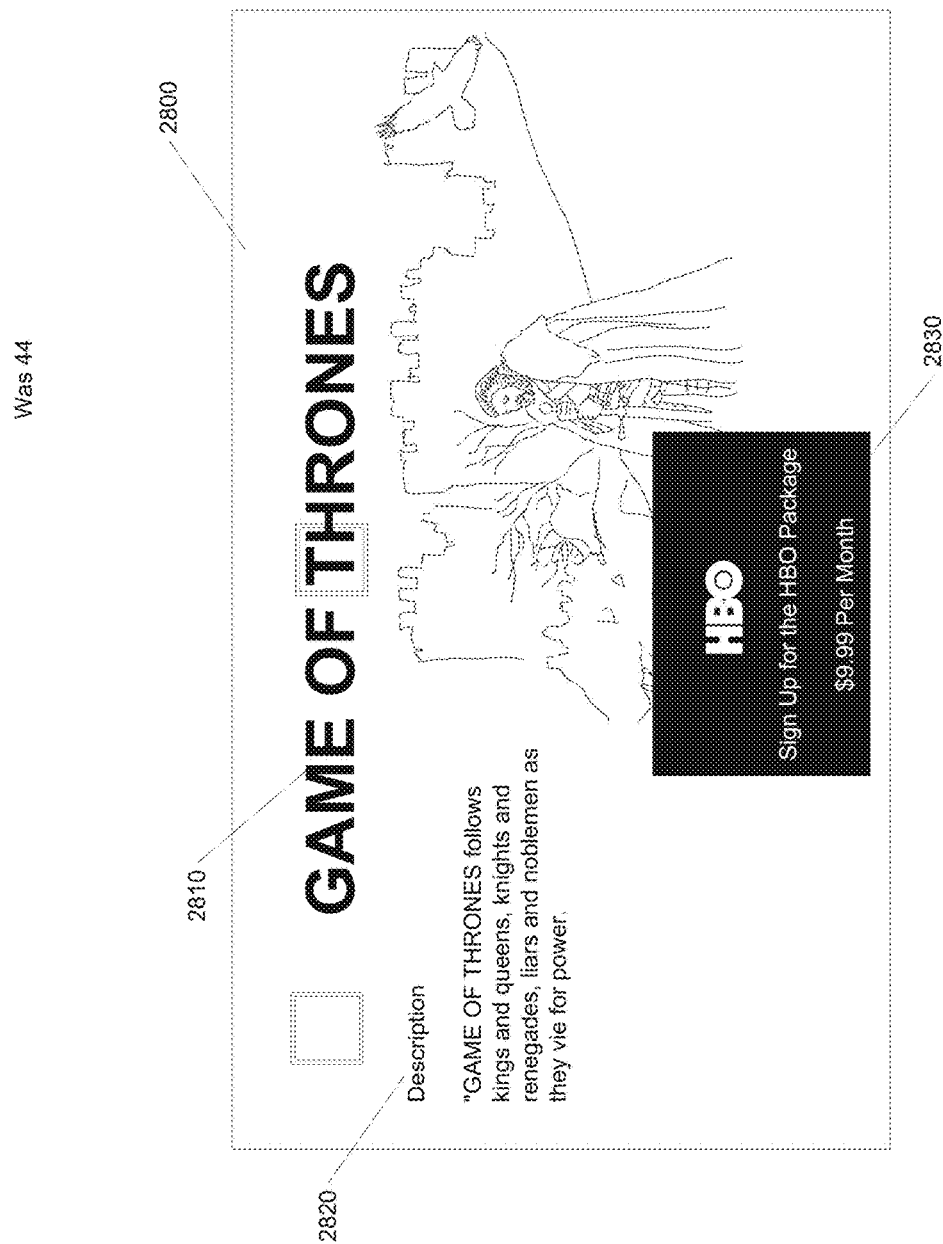
FIG. 28 depicts one embodiment of a video display and user interface.

FIG. 27 illustrates that focus may be moved to each of the elements in the Your Friends Watch category. In FIG. 27, focus has been moved to element 2710 that displays the Game of Thrones television show—a show that is popular with the viewer's friends. Desiring more information regarding this show, the viewer provides additional input which in one embodiment presents a display such as that shown in FIG. 28. FIG. 28 illustrates a landing page for the Game of Thrones selection of FIG. 27. In this case, the landing page 2800 provides video content (video, still, or animation), a title of the series 2810, and a description of the series 2820. In this example, the viewer does not have a subscription to the access the content (e.g., a secondary subscription to HBO). Therefore, a banner is displayed 2830 that informs the viewer that the series is not currently available according to their current subscriptions and advises that they may sign up (subscribe) for $9.99 per month. In various embodiments, a user may select the banner and immediately subscribe to HBO. In various embodiments, the viewer makes the subscription through the primary provider which handles communications with the HBO subscription service. In some embodiments, billing for the HBO service may be included in the viewer's primary provider bill. In such embodiments, subscribing to HBO may be as simple as a couple of button presses to authorize the subscription. Following this simple subscription process, all of the HBO content held by the primary provider is immediately available to the viewer. In other embodiments, rather than subscribing through the primary provider, the viewer may be taken to an HBO subscription service site to complete the subscription process. Billing may be direct to the viewer or included with the primary provider billing as mentioned above.

Figure 29:
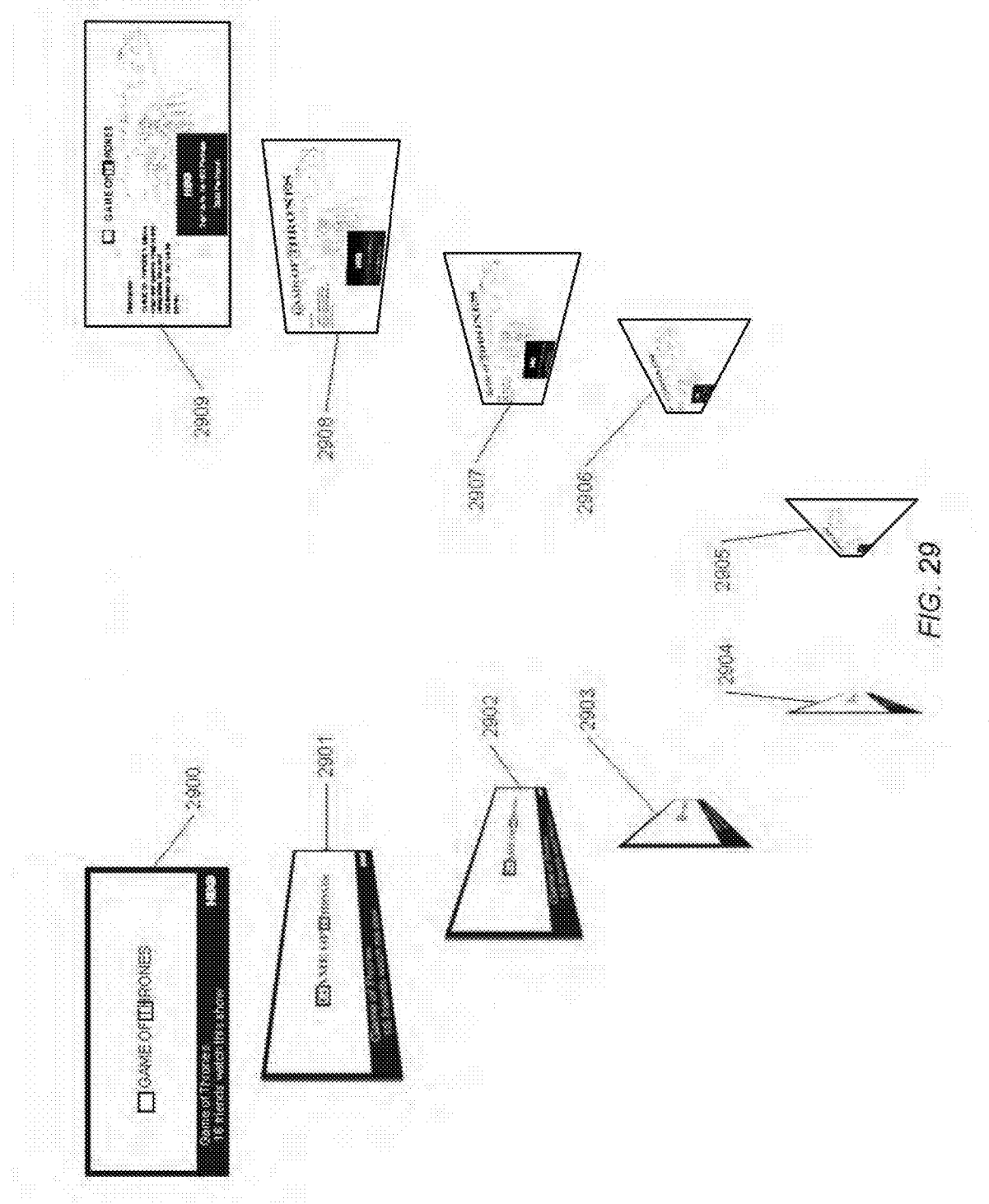
FIG. 29 depicts one embodiment of a video display and user interface.
Figure 30:
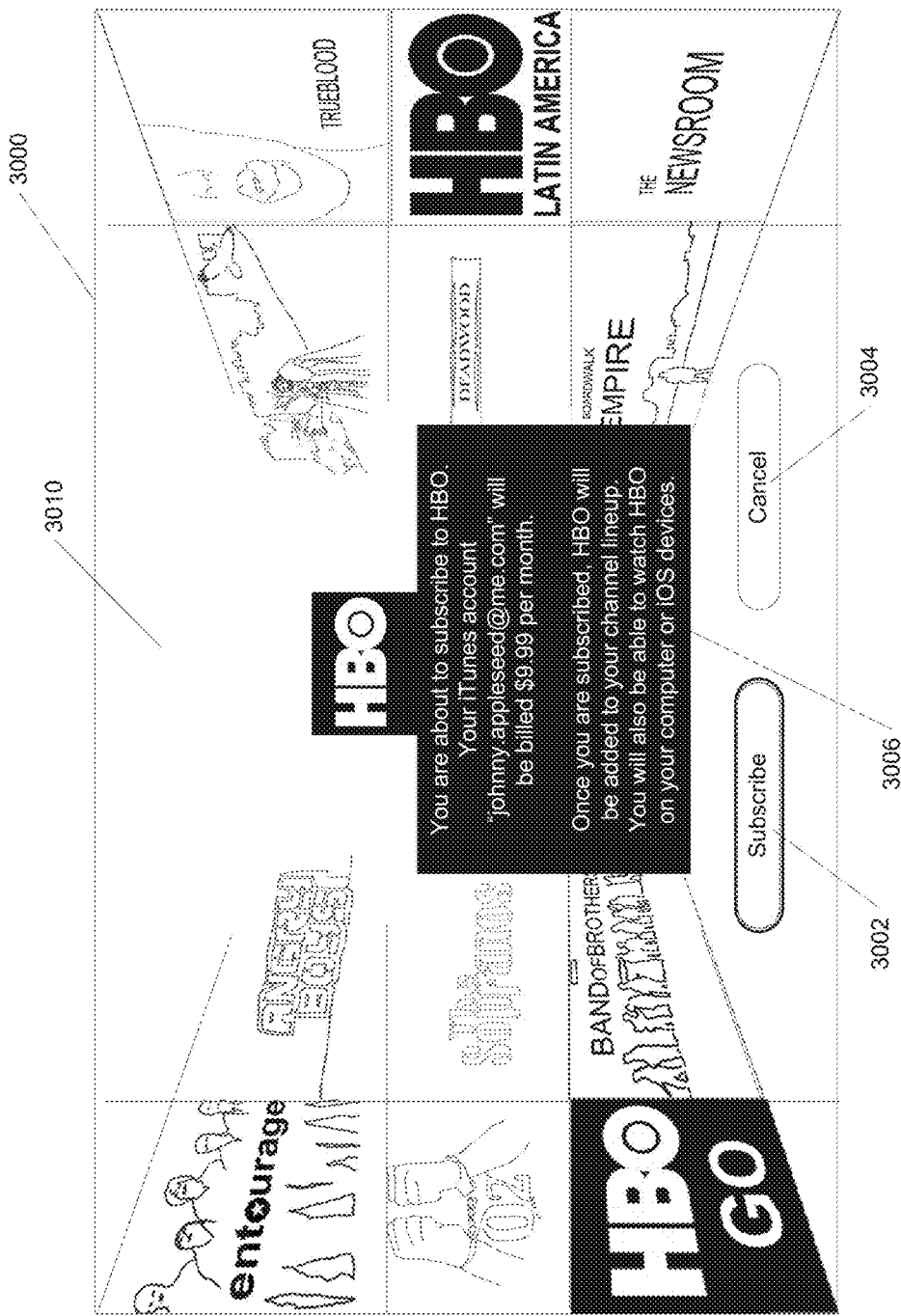
FIG. 30 depicts one embodiment of a video display and user interface.

In various embodiments, selection of an element such as the element 2710 of FIG. 27 may cause an animation when transitioning from one display to another. For example, in one embodiment as shown in FIG. 29, the element 2900 when selected causes a rotation animation 2901-2908 which gradually replaces the first display with the display 2909. Numerous such embodiments are possible and are contemplated. Assuming the viewer chooses to subscribe to HBO, FIG. 30 illustrates one embodiment of a display 3000 that may be presented. The display 3000 depicts a gallery of content that available from content provider. Additionally, information 3006 is provided that describes a subscription is about to be purchased and how billing may be effected. In this case, the viewer makes the subscription through their iTunes account. Subscribe 3002 and Cancel 3004 buttons are depicted as well. In such an embodiment, transactions between the provider HBO and Apple (the iTunes account provider) regarding the subscriber's new subscription may be handled without need for additional involvement on the part of the subscriber. Such an embodiment may be easier and less frustrating for the viewer than may otherwise be the case. In other embodiments, the viewer could be connected to the new provider, or the viewer may need to call another provider to complete the subscription process.

Figure 31:
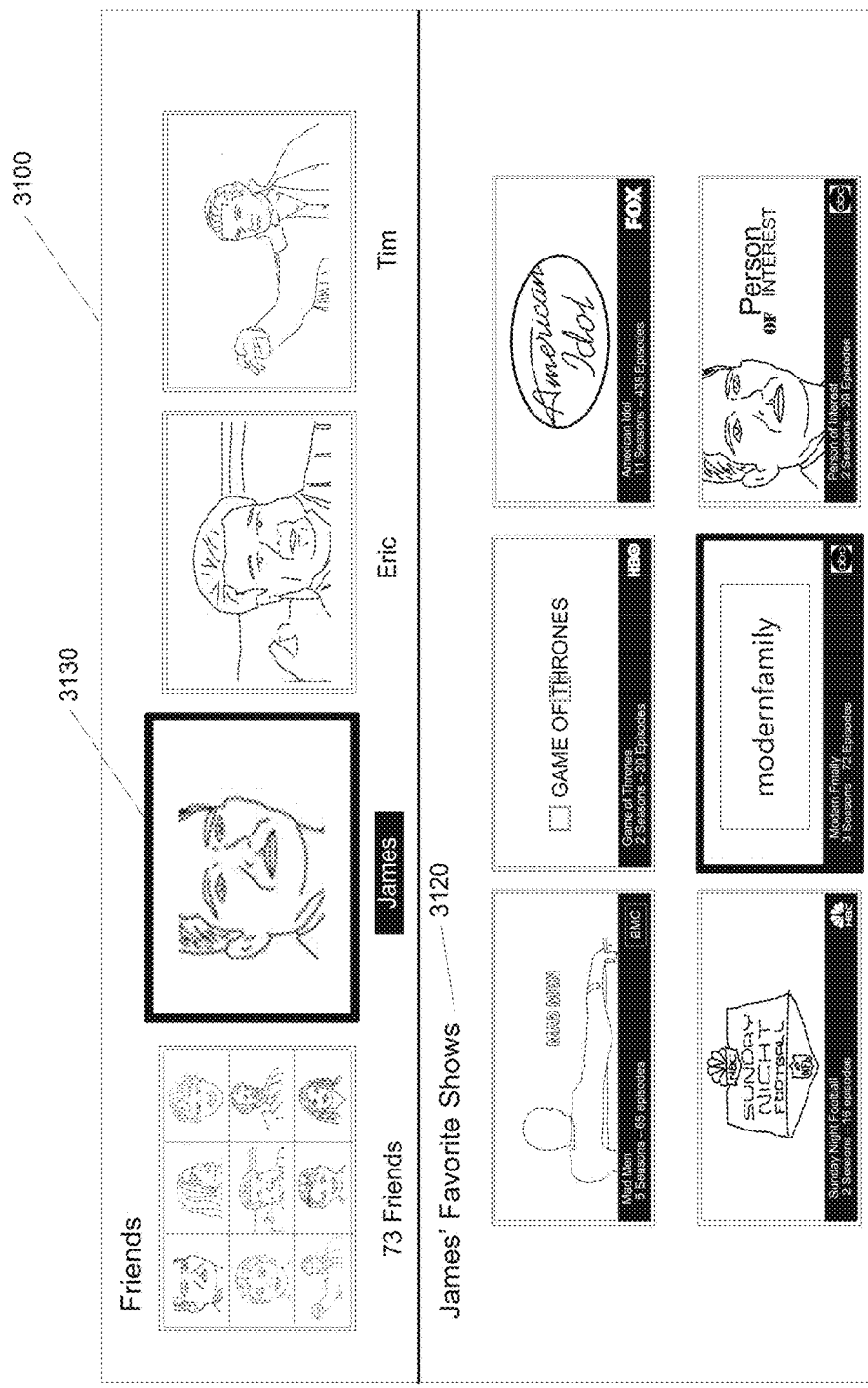
FIG. 31 depicts one embodiment of a method for scoping an interface channel bar.

Returning again to the Friends content depiction 3100, FIG. 31 illustrates an embodiment in which an individual friend 3130 has focus. In this case, the friend "James" has focus and "James Favorite Shows" 3120 are depicted. In this embodiment, each of the shows that James likes is shown with video/artwork etc., and a brief description such as the title of the show and corresponding network. In contrast to the composite friends view, there is not an indication as to how many friends like the show (though there could be). Rather, in this case the information indicates how many seasons and episodes of each show are available. As in the previous discussion, each of these elements is selectable and will be discussed shortly. For example, selection of the Mad Men or Modern Family elements may lead to landing pages for the respective shows. Examples of such will be discussed shortly.

Figure 32:
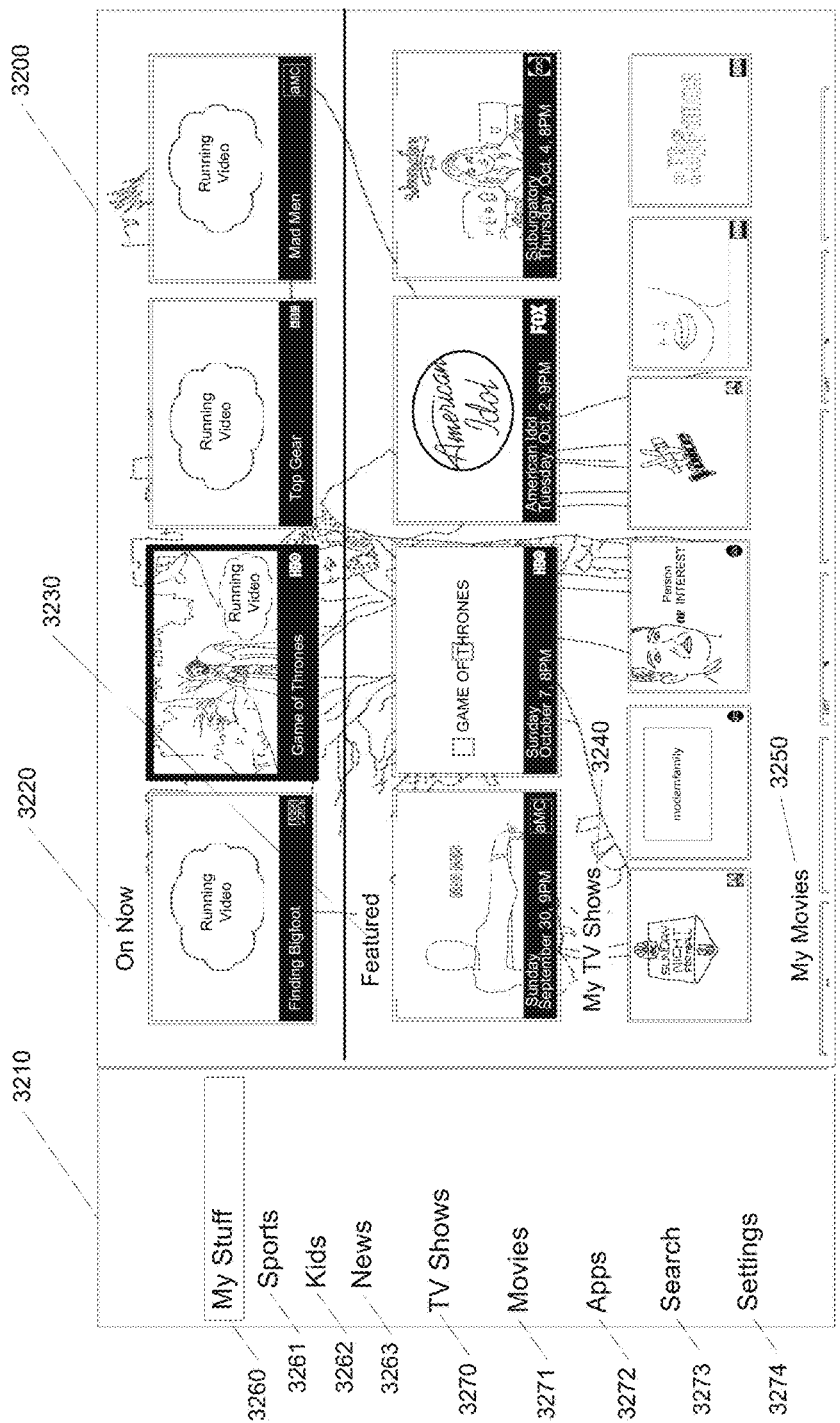
FIG. 32 depicts one embodiment of a video display and user interface.

Turning now to FIG. 32, an alternative embodiment of a side bar is shown. In the example presented, the display 3200 includes a side bar 3210 as before. In this embodiment, the content of the side bar and corresponding presentation is somewhat different. The side bar 3210 is shown to include six categories and a representative sample of three subcategories. The main categories depicted are My Stuff 3260, TV Shows 3270, Movies 3271, Apps 3272, Search 3273, and Settings 3274. Subcategories of the My Stuff category 3260 shown are Sports 3261, Kids 3262, and News 3263. As in the previous examples, side bar related content is shown overlaying the presented video content. In this case, My Stuff 3260 has focus and the side bar related content includes the categories On Now 3220, Featured 3230, My TV Shows 3240, and My Movies 3250.

Generally speaking, in various embodiments, the My Stuff category includes content that a viewer has identified as being reserved or otherwise set apart (collected) for easy access. This category may also include content rented or purchased by the viewer. In FIG. 32, shows that are currently being broadcast that are included in the viewer's My Stuff category 3260 are displayed in the On Now 3220 portion of the display (the upper portion in this embodiment). Four such shows are displayed, though in other embodiments the number may differ. Also shown is a Featured category 3230. In various embodiments, this category may be used to promote selected shows to the viewer. Such shows may be predicted to be of interest to the viewer based on the viewer's profile or history. Alternatively, the shows could be selected based on what other people have indicated as being of interest. Still further, the selections could be made based on promotional space or time purchased by advertisers. These and other embodiments are contemplated. In this example, each promotional item includes an indication as to when and on what network the show can be viewed.

Also shown is a My TV Shows category 3240. In various embodiments, these shows have been identified by the viewer as being flagged or otherwise identified for inclusion as part of the viewer's My Stuff. For example, these could represent favorite shows of the viewer. In various embodiments, artwork, video (live or otherwise), is shown for each show element. In some embodiments, particular video highlight clips may run. Finally, a My Movies category 3250 is shown. In the example shown, the corresponding elements extend beyond the bottom of the display. Accordingly, the viewer will scroll or page down to view the content. In this case, the content represents movies the viewer has identified for inclusion.

As noted in the side bar 3210, various subcategories are available under the My Stuff category 3260. In some embodiments, providing focus to one of these subcategories will cause the corresponding content displayed to the right to be filtered accordingly. For example, selection of the Sport subcategory 3261 will cause the On Now category 3220 to display sports that are currently being broadcast. Likewise, the Featured 3230, My TV Shows 3240, and My Movies 3250 categories will likewise be filtered to show sports related feature content, TV shows, and movies. In a similar manner, the subcategories Kids 3262 and News 3263 may be selected to cause the related content to be filtered for kids and news subject matter, respectively. These and other subcategories are possible and are contemplated. In various embodiments, these categories may be created by the viewer based on predefined selections. For example, numerous provider created subcategories may be chosen from for inclusion in the side bar by the viewer. In other embodiments, viewers may create, name, and define their own subcategories. Such viewer created subcategories may be made available to other viewers for inclusion in their own side bar user interfaces. All such embodiments are contemplated.

Figure 33:
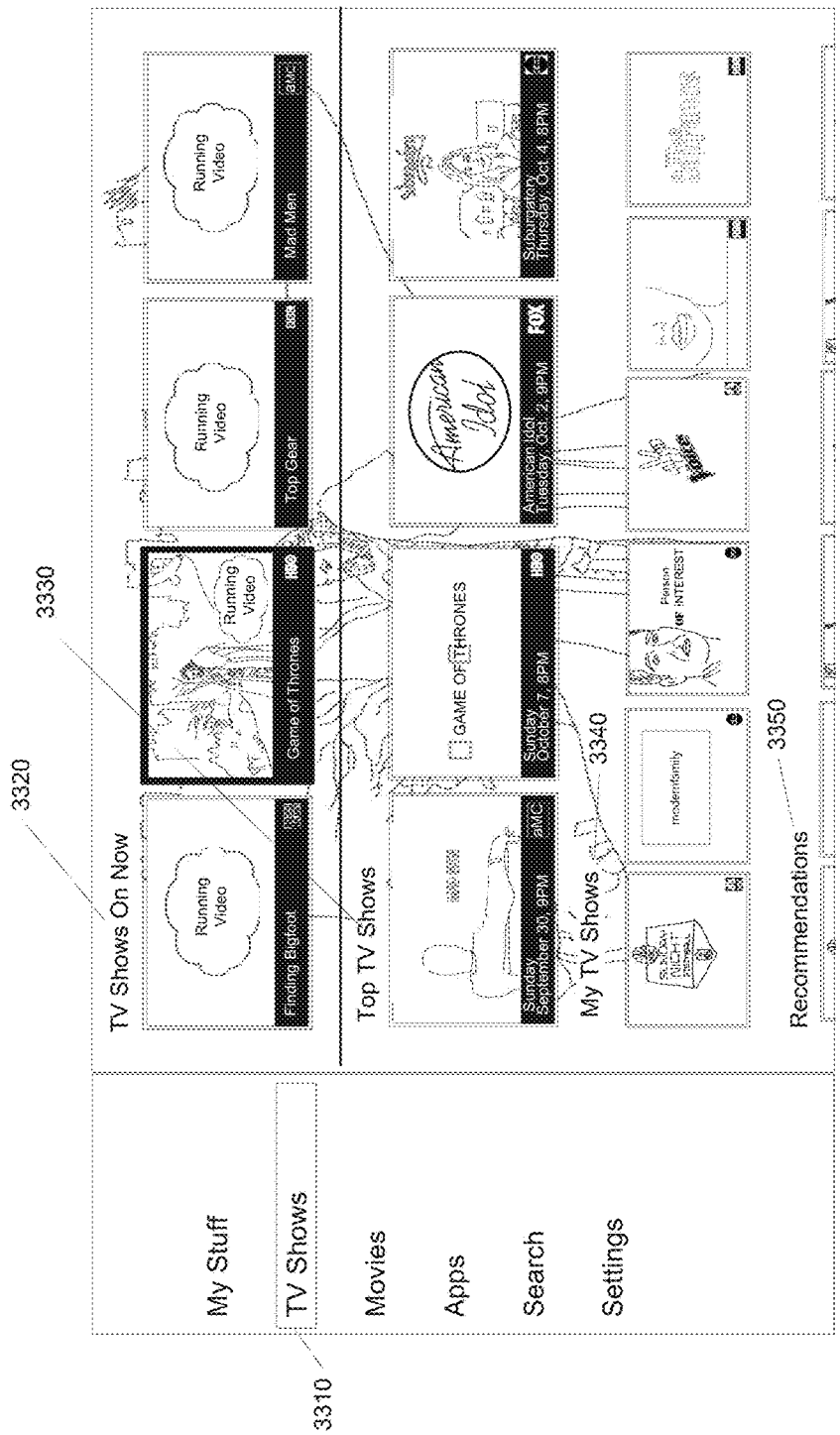
FIG. 33 depicts one embodiment of a video display and user interface.

FIG. 33 illustrates the side bar of FIG. 32 when the TV Shows category is highlighted or selected. In response to this selection, the related content which is displayed is changed to reflect this newly selected category. In this case, the related content which is displayed is related to television shows. In the exemplary embodiment of FIG. 33, there is included a TV Shows On Now category 3320, a Top TV Shows category 3330, a My TV Shows category 3340, and a Recommendations category 3350. In this case, the TV Shows On Now category 3320 may include a random selection of shows currently being broadcast or a particular selection of shows being broadcast. Each of the displayed elements in this category may display video of the live broadcast. The Top TV Shows 3330 may, for example, represent shows which are highly rated in general. The My TV Shows category 3340 may include depiction of television shows which the viewer has previously included as part of My Stuff. Finally, Recommendations 3350 may include television shows which are recommended to the viewer on the basis of the viewer's profile, history, friend's likes, critics reviews, current likes of the broader viewing audience, or otherwise. In other embodiments, recommendations could be based simply on the number of people watching them.

In various embodiments, the Recommendations category (described here and elsewhere) may be context sensitive based on the particular viewer identified as currently watching. For example, in various embodiments the system may account for multiple viewers in a single household. Identification of a particular viewer could be based on input received from the viewer, biometric data (e.g., thumbprint on a remote control device, voice recognition, face recognition, and so on. Additionally, the context may include the time of day. For example, more mature content may not be recommended earlier in the day when kids are more likely to be present. Various such embodiments are possible and are contemplated.

Figure 34:
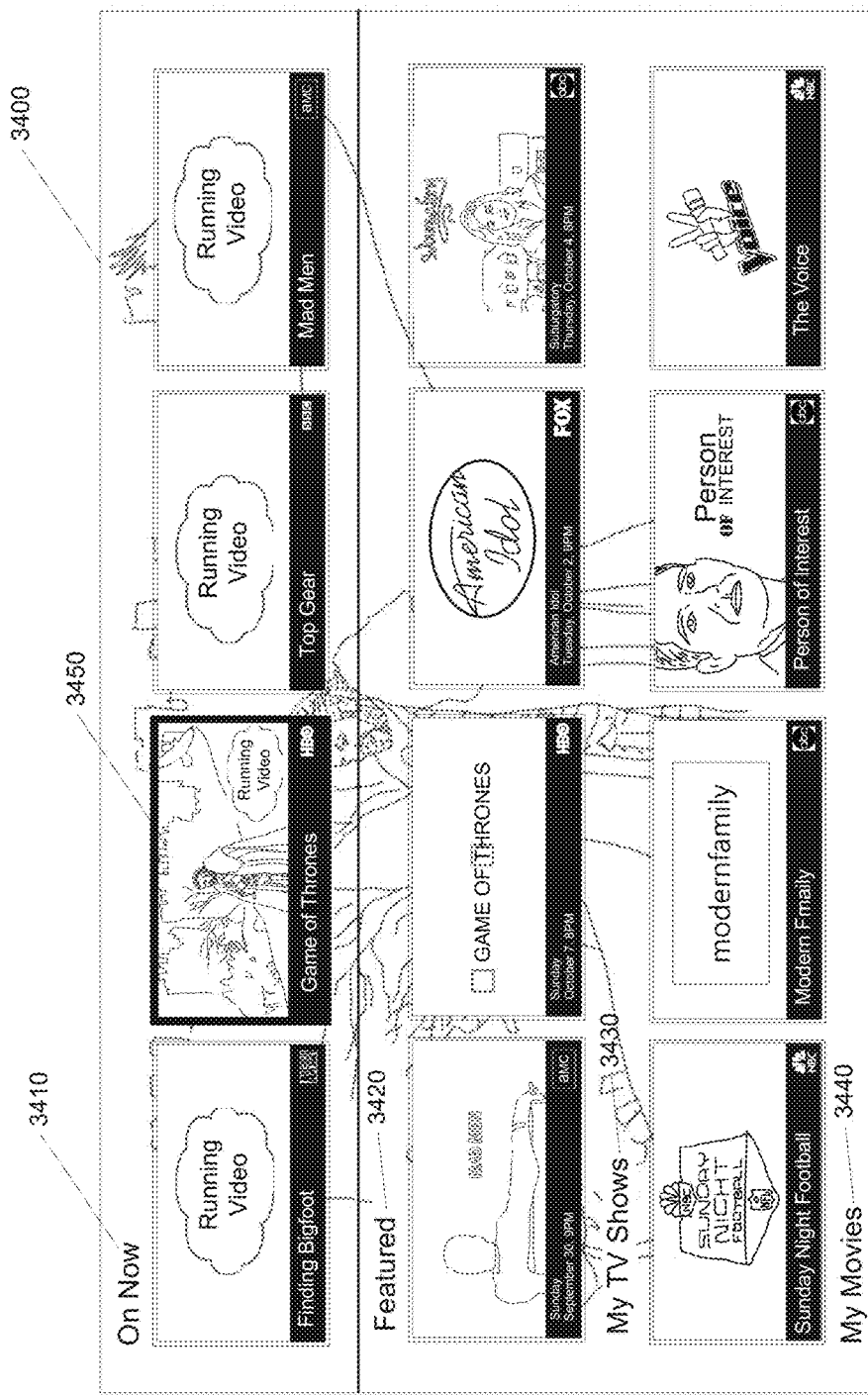
FIG. 34 depicts one embodiment of a video display and user interface.
Figure 35:
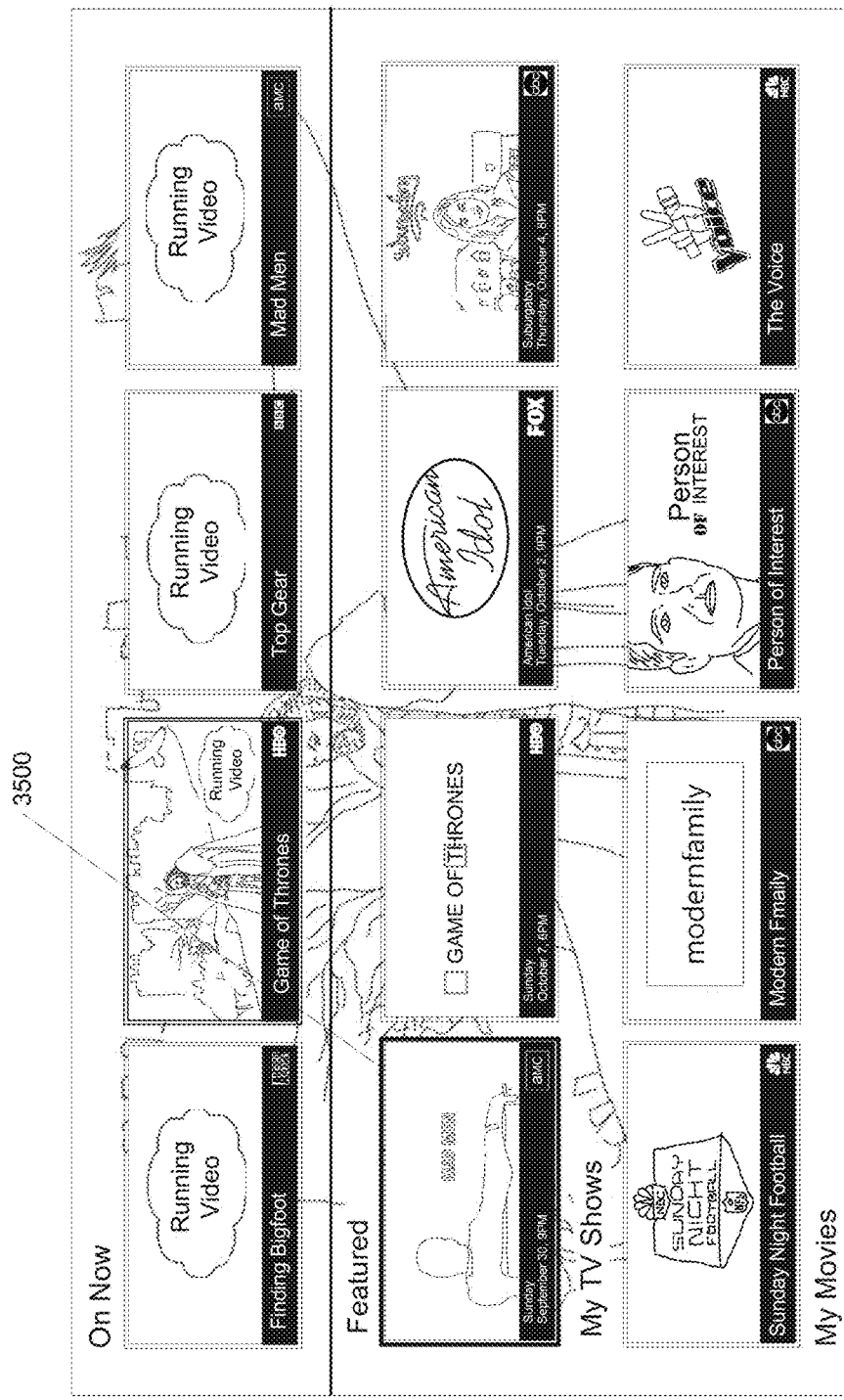
FIG. 35 depicts one embodiment of a video display and user interface.

FIG. 34 illustrates the content of FIG. 33 on a display 3400 without the side bar itself. In this example, element 3450 (Game of Thrones) currently has focus. FIG. 35 illustrates an embodiment where the viewer has now moved the focus to element 3500. As previously noted, each of the elements is further selectable by a viewer. Assuming the viewer now selects element 3500, further information regarding the selected content is displayed.

Figure 36:
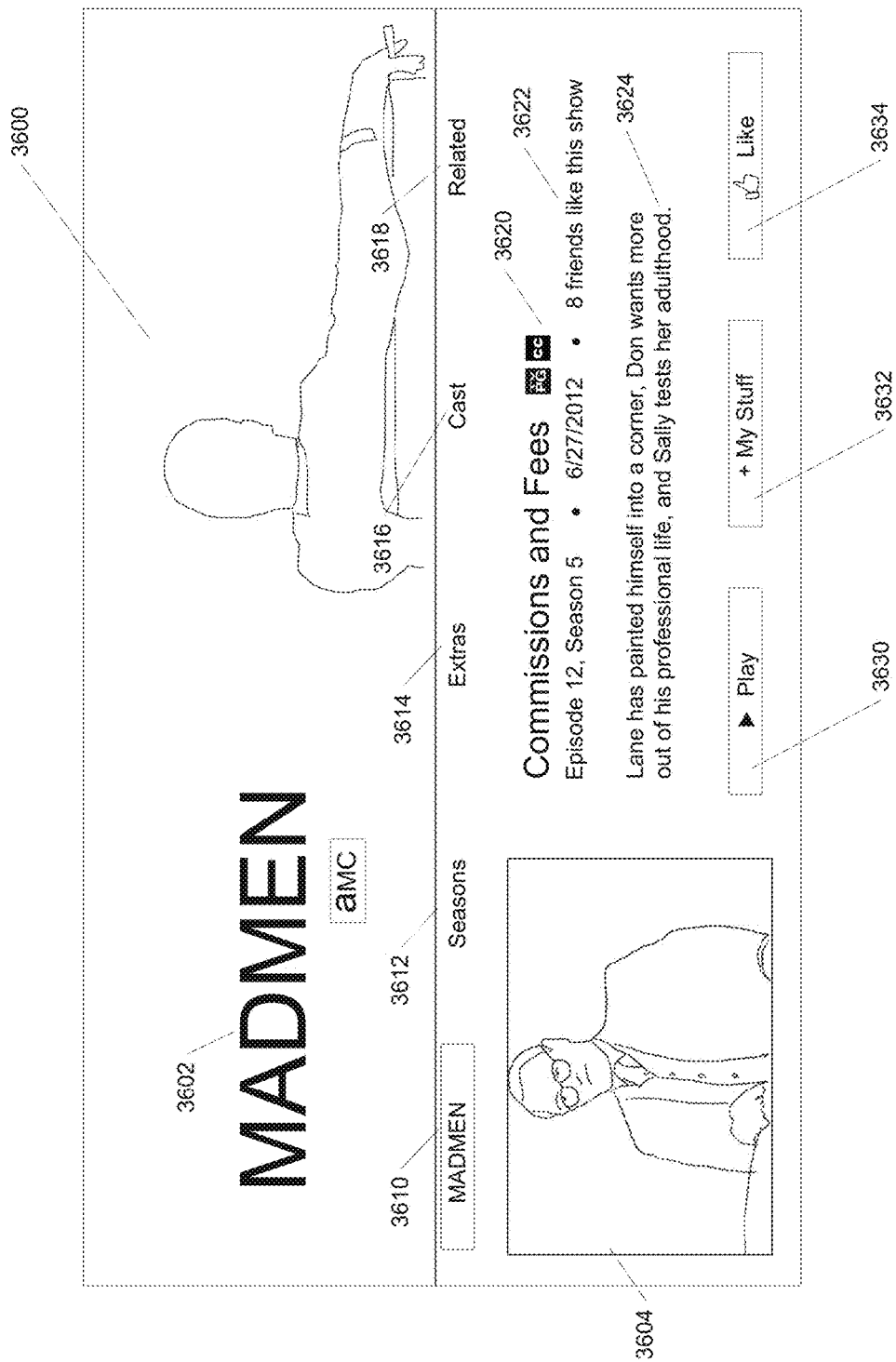
FIG. 36 depicts one embodiment of a channel bar animation.

In various embodiments, selection of the element 3500 causes the display of a landing page for the Mad Men television show as shown in FIG. 36. This landing page, as well as others described herein, generally provides a centralized location from which further information and media related to the show may be obtained. Such landing pages may provide access to content derived from a subscription provider, the Internet, proprietary sources, social media, or otherwise. In the example shown, the landing page generally includes an upper portion with artwork 3600, video, or other content. Additionally, a title 3602 for the landing page show is provided, and perhaps an indication of the corresponding network.

Approximately along the middle of the landing page are a number of categories selectable by a viewer to access additional information. In the example shown is a Madmen 3610 category that in this case may be selected/highlighted to display additional information regarding a current episode of the television show. Other categories to be discussed further below include Seasons 3612, Extras 3614, Cast 3616, and Related 3618. As shown, the MadMen category is currently highlighted and causes the display of information regarding an episode entitled "Commissions and Fees" 3620. Further information 3622 indicates this is episode 12 of season 5 of the series, and has an air date of Jun. 27, 2012. Also noted is 8 friends have indicated that they like this show. A brief description 3624 is provided along with video/picture/artwork 3604 for the series or episode as well. Also provided are graphic elements 3630, 3632 and 3634 which may be selected by the viewer. Selection of the Play element 3630 may cause the depicted episode to be presented. Selection of the My Stuff element 3632 may be selected to add the series and/or episode to the viewer's My Stuff category (as previously discussed). Finally, the Like element 3634 may be selected to indicate to viewer's likes the series and/or episode.

Figure 37:
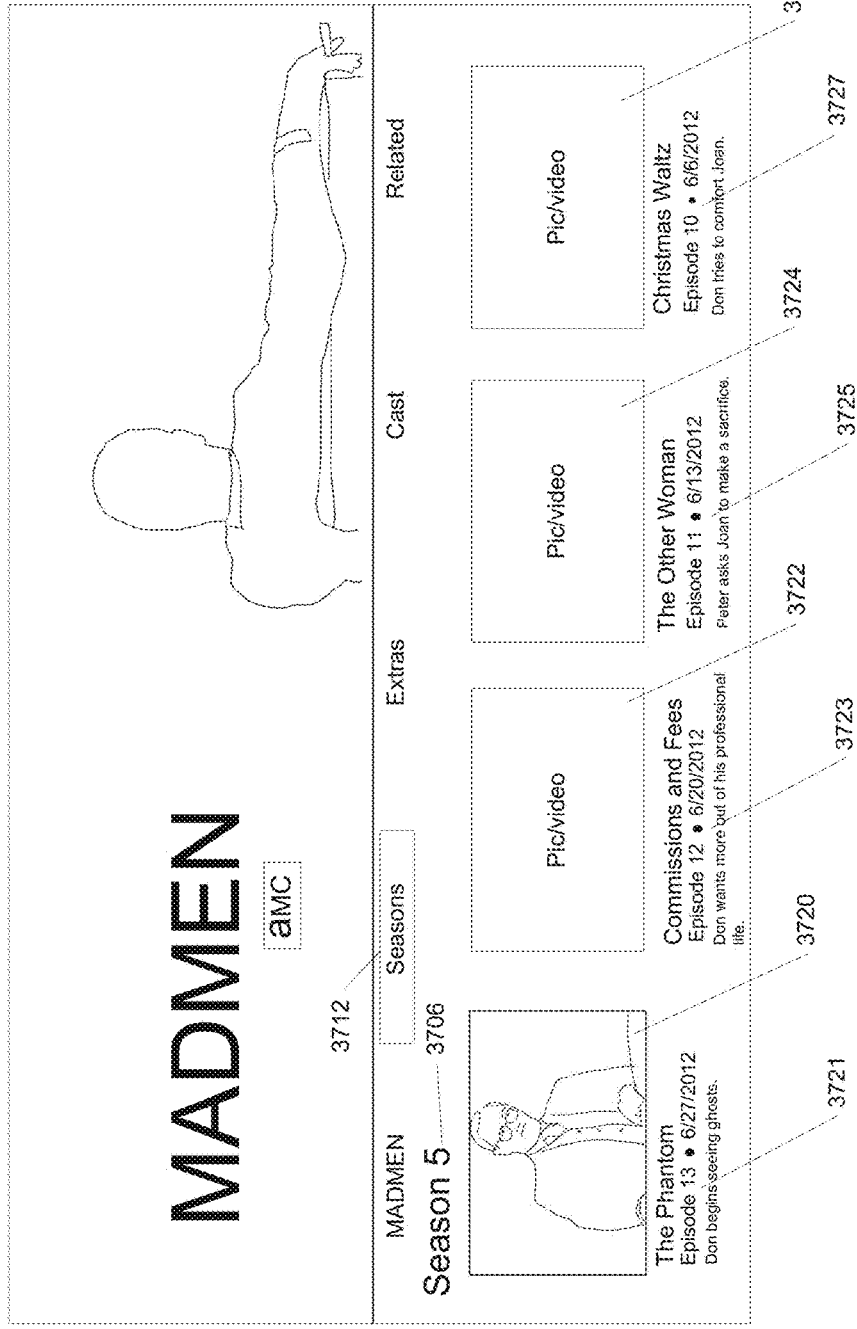
FIG. 37 depicts one embodiment of a channel bar animation.

FIG. 37 illustrates the same landing page where the viewer has now selected the category Seasons 3712. In the embodiment shown, selection of this category causes the display of information regarding seasons and episodes of the television series. In this example, episodes for Season 5 3706 are displayed. Using a remote control or other input, a viewer may scroll (or page) through these and other episodes and seasons not currently displayed. In this embodiment, four episodes are shown, each of the episodes includes a video/picture/artwork element (3720, 3722, 3724, 3726), and a corresponding description of the episode (3721, 3723, 3735, 3727). Each of the descriptions in this case includes a title for the episode, identification of the number of the episode, original air date for the episode, and a brief description of the storyline for the episode. Of course, other content may be presented as an alternative, or in addition, to the content depicted. In various embodiments, a viewer may select a depicted episode to either begin immediate presentation of the episode, or provide other information regarding the episode.

Figure 38:
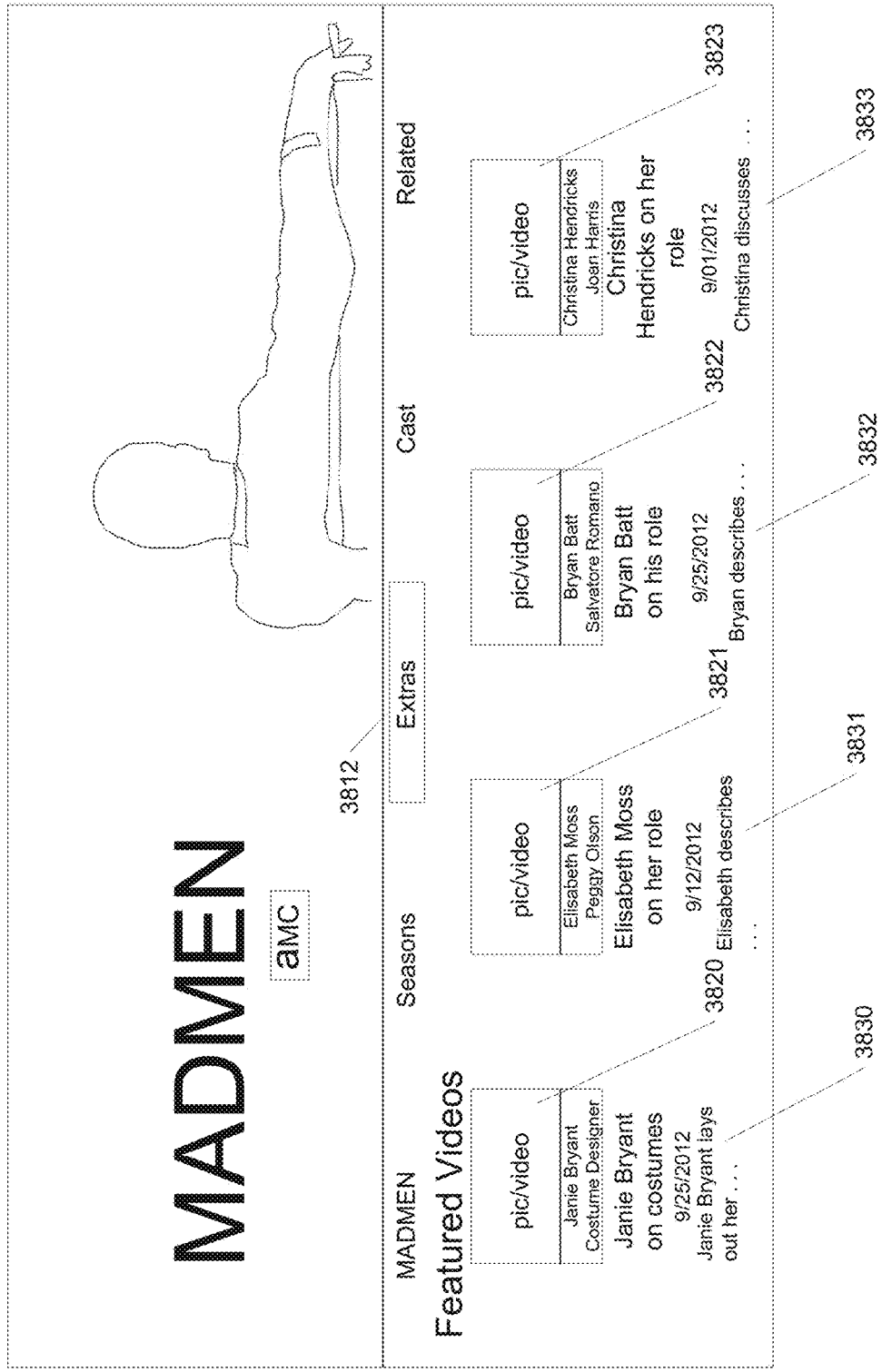
FIG. 38 depicts one embodiment of a channel bar animation.

Turning now to FIG. 38, the same landing page is depicted. However, in this example the Extras category 3812 is selected which causes the display of additional information related to the show. In various embodiments, such extras may represent content about the making of the television show, interesting trivia, gossip, or otherwise. In the example shown, selected videos 3820-3823 are presented that include cast and supporting staff discussing their roles or other aspects of the making of the show. A brief description 3830-3833 is included for each of the elements as well. As in other cases, a viewer may scroll/page through other Extras elements not currently displayed.

Figure 39:
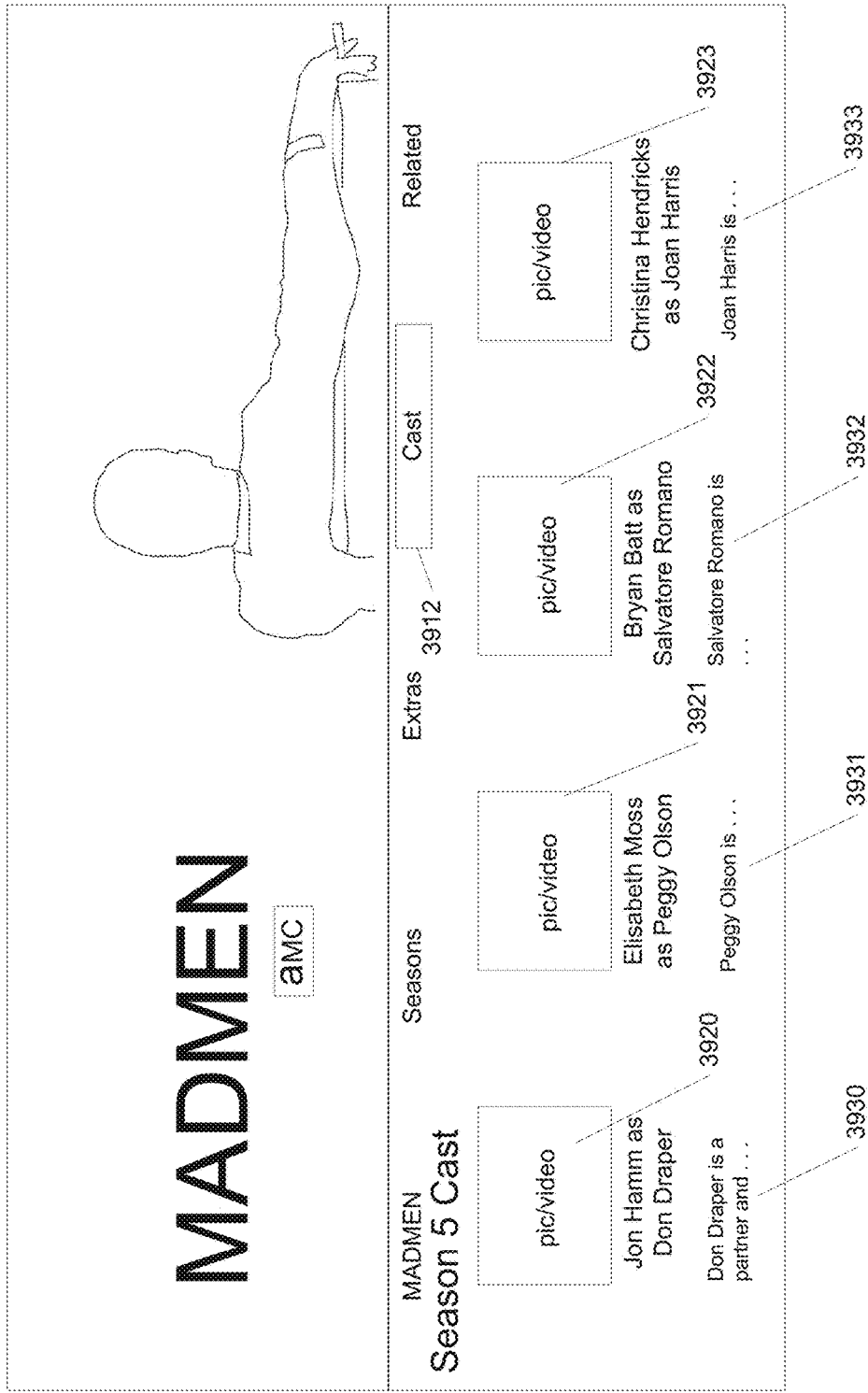
FIG. 39 depicts one embodiment of a video display and user interface.

FIG. 39 continues the depiction of the landing page with the Cast category 3912 selected. Such a selection in this case causes the display of additional information regarding cast members of the television series. Video/pictures 3920-3923 are provided for cast members, along with a description of the actor and character 3930-3933. Selection of a particular cast member element may cause a full screen display of video related to the actor. Alternatively, a landing page dedicated to the actor may be displayed which serves as a launching point for more details regarding the actor. In some embodiments, the actors themselves may provide content for such landing pages. For example, actors may be able to provide daily commentary on any of a variety of topics as desired. Viewers may be able to identify a particular actor as a friend to gain access to the actor's viewing likes/dislikes, and so on. Numerous such embodiments are possible and are contemplated.

Figure 40:
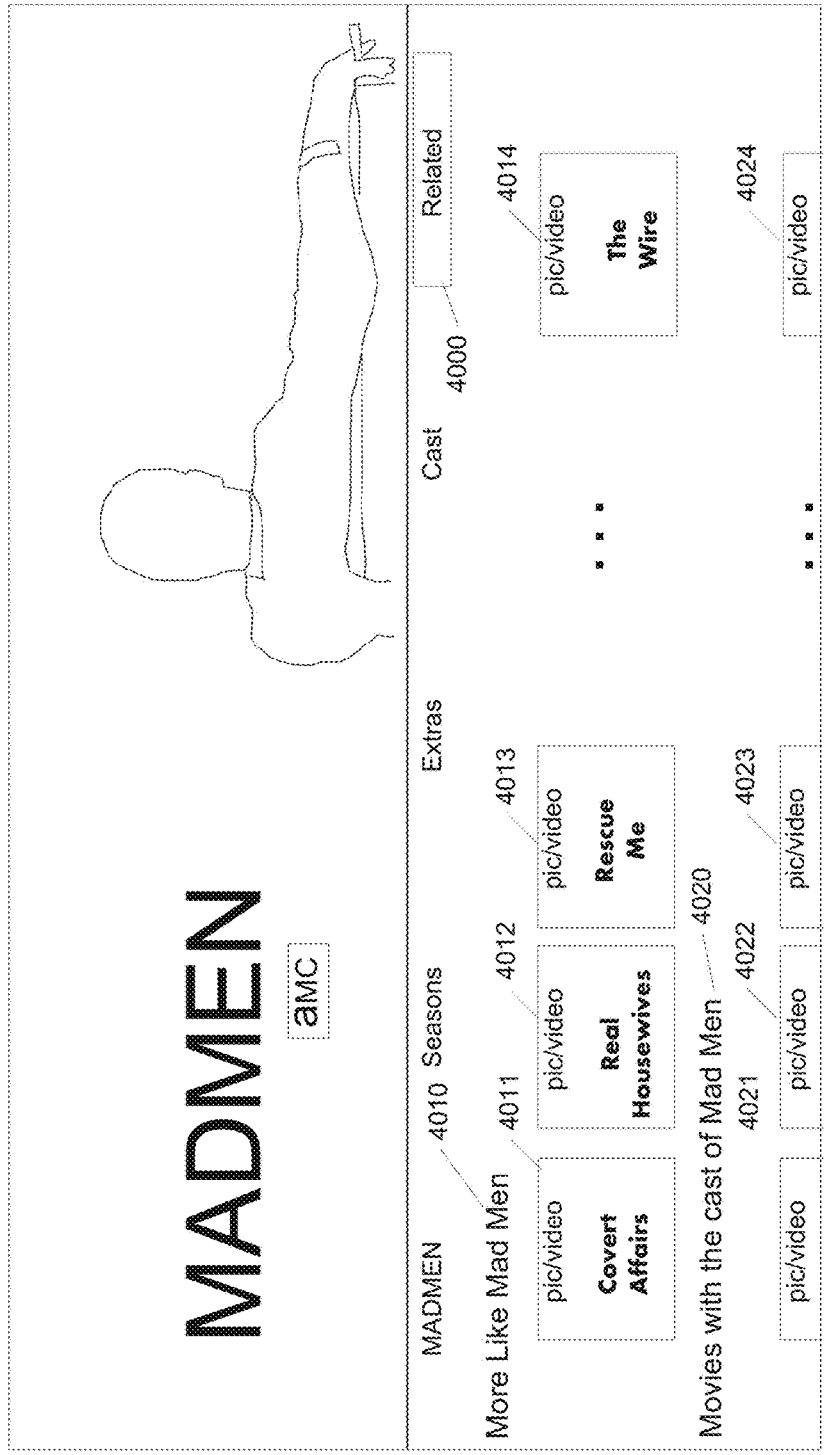
FIG. 40 depicts one embodiment of a video display and user interface.

Finally, FIG. 40 depicts the landing page with the Related category 4000 selected. Selection of Related 4000 in this example causes display of a More Like Mad Men category 4010 and a Movies with the cast of Mad Men category 4020. The first category 4010 may include the depiction of other television shows 4011-4014 which are deemed to be similar to the Mad Men show in some way. The second category 402 includes the depiction of movies 4021-4024 which include at least one of the Mad Men cast members. Other related content may be displayed as well by scrolling or paging as desired.

Figure 41:
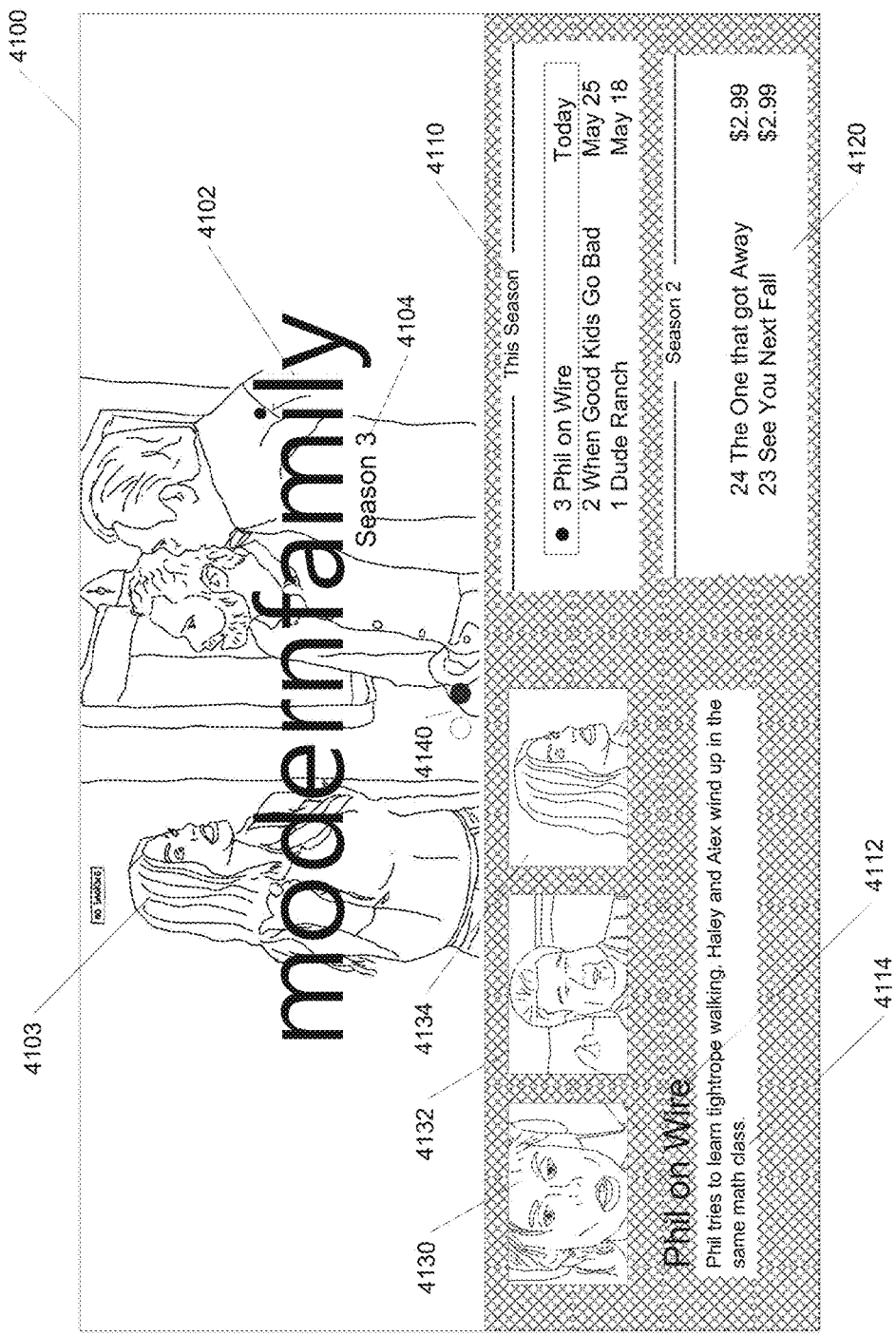
FIG. 41 depicts one embodiment of a video display and user interface.

FIG. 41 illustrates an alternative embodiment for a television show landing page. In the embodiment shown, the upper portion of the display includes the described artwork and title information. The lower portion of the display includes particular regarding seasons and episodes of the series. For example, the lower right portion of the display lists a number of current season episodes 4110 for the season. Also shown are previous season episodes 4120. In this example, episode 3 of the current season ("Phil on Wire") has focus. Focus is depicted here by a box around the entry and a bullet at the beginning of the entry. As may be appreciated, numerous different methods for indicating focus are possible and are contemplated. In various embodiments, information related to the items which has focus is shown in the left portion of the lower display. Here, the title 4112 of the highlighted episode is shown along with a brief description 4114 of the episode. In addition, one or more pictures 4130, 4132, 4134 from the episode are shown. In various embodiments, the pictures 4130, 4132, 4134, may be still images, video content from the episode, animations, or other content related to the series. In some embodiments, pictures of friends who like the episode or television series could be shown, of comments from people regarding the show (e.g., Twitter or Facebook comments). Numerous such embodiments are possible and are contemplated.

Also shown in FIG. 41 for the previous season 4120 is an indication as to cost for viewing rights to the content. Here, for example, each of the two episodes 23-24 of Season 2 are shown to have a cost of $2.99. Selecting one of these episodes may the present a display which enables to viewer to authorize purchase of the content. For example, payment may simply be authorized with or through a primary subscription (e.g., an iTunes account), or the viewer may be connected to a secondary provider to effect payment for the content which then gives the necessary viewing rights. In contrast, selection of one of the current season 4110 episodes may immediately being presentation of the selected episode or bring the viewer to a page with more information regarding the episodes. In some embodiments, whether the selected episode is immediately presented or a page of further information is displayed may depend on the input provided by the viewer. For example, a viewer with a remote control may be able to provide a first indication (e.g. an upward swipe on a touch pad) to indicate immediate play of the episode is desired. Alternatively, the viewer may provide a second, different, input (e.g., a rightward swipe) to indicate presentation of further information is desired. Various such alternatives are possible and are contemplated.

Figure 42:
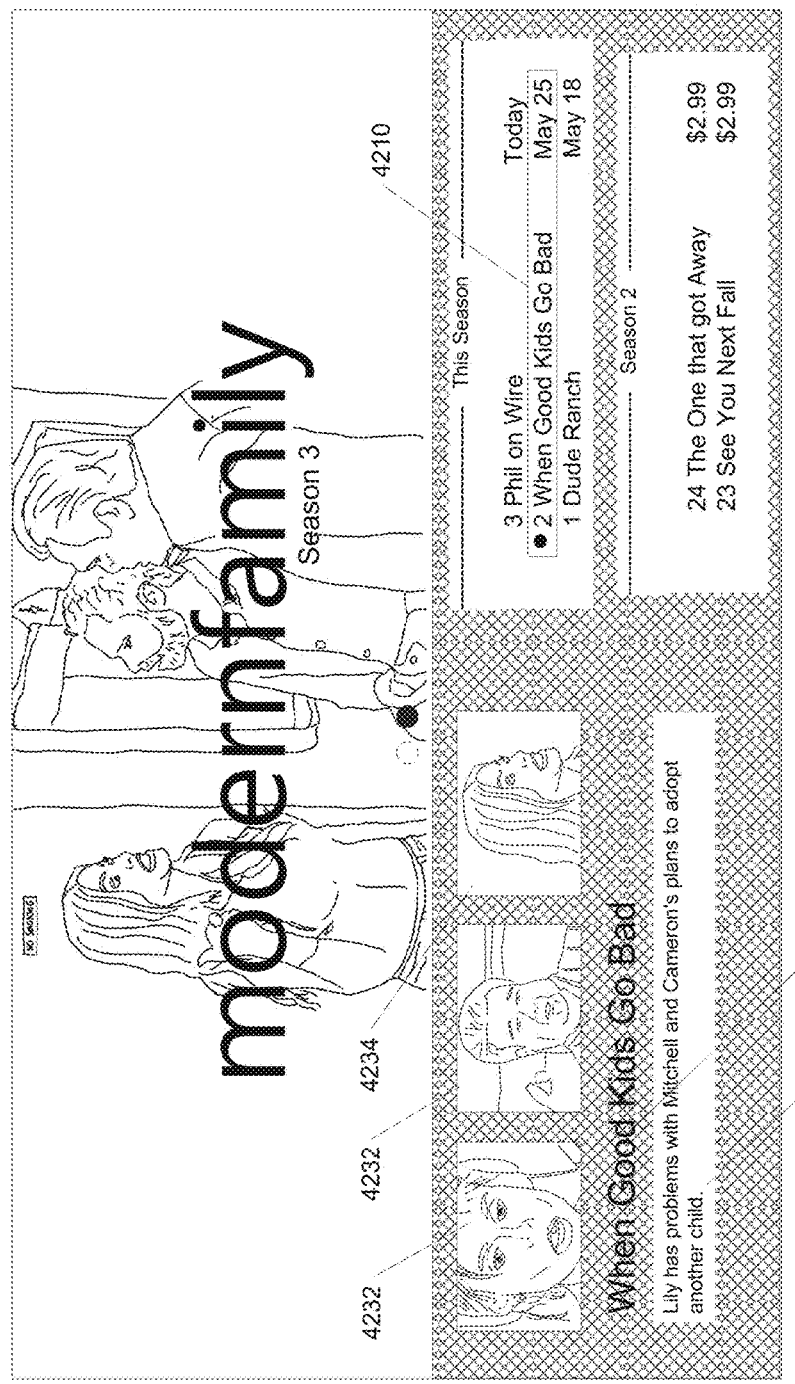
FIG. 42 depicts one embodiment of a video display and user interface.
Figure 43:
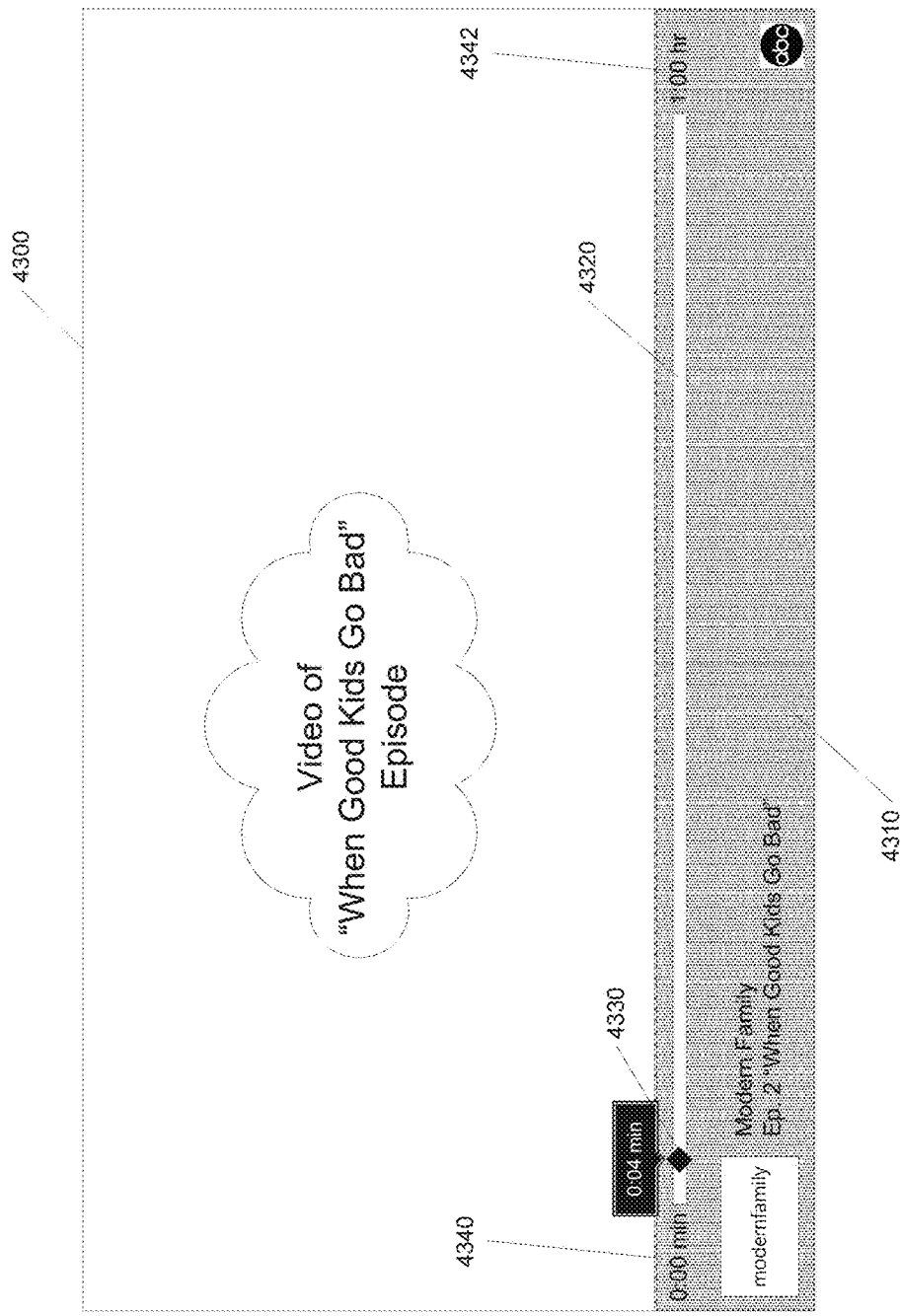
FIG. 43 depicts one embodiment of a video display and user interface.

FIG. 42 illustrates the landing page of FIG. 23 after focus has been moved to episode 2 4210 of the current season ("When Good Kids Go Bad"). Here information regarding the episode is provided in the left lower portion of the display (e.g., title 4212, description 4214, and pictures 4232, 4232, 4234). As discussed, in one embodiment, selection of episode 4210 may being immediate presentation of the selected episode as shown in FIG. 43. FIG. 43 shows display 4300 has begun presenting the selected episode. In the lower portion of the display, a scrubber bar 4320 and program information banner 4310 is displayed. In this embodiment, time information for the single episode is provided adjacent to the scrubber bar 4320. In this example, the episode is one hour in length and the bounding time indicators are 0:00 min 4340 and 1:00 hr 4342. The current position indicator 4330 depicts the current play position and time. In various embodiments, such a banner may be displayed when presentation of the video content begins, and may time out after a brief interval. A viewer may cause the scrubber/banner to reappear using a remote control device.

Figure 44:
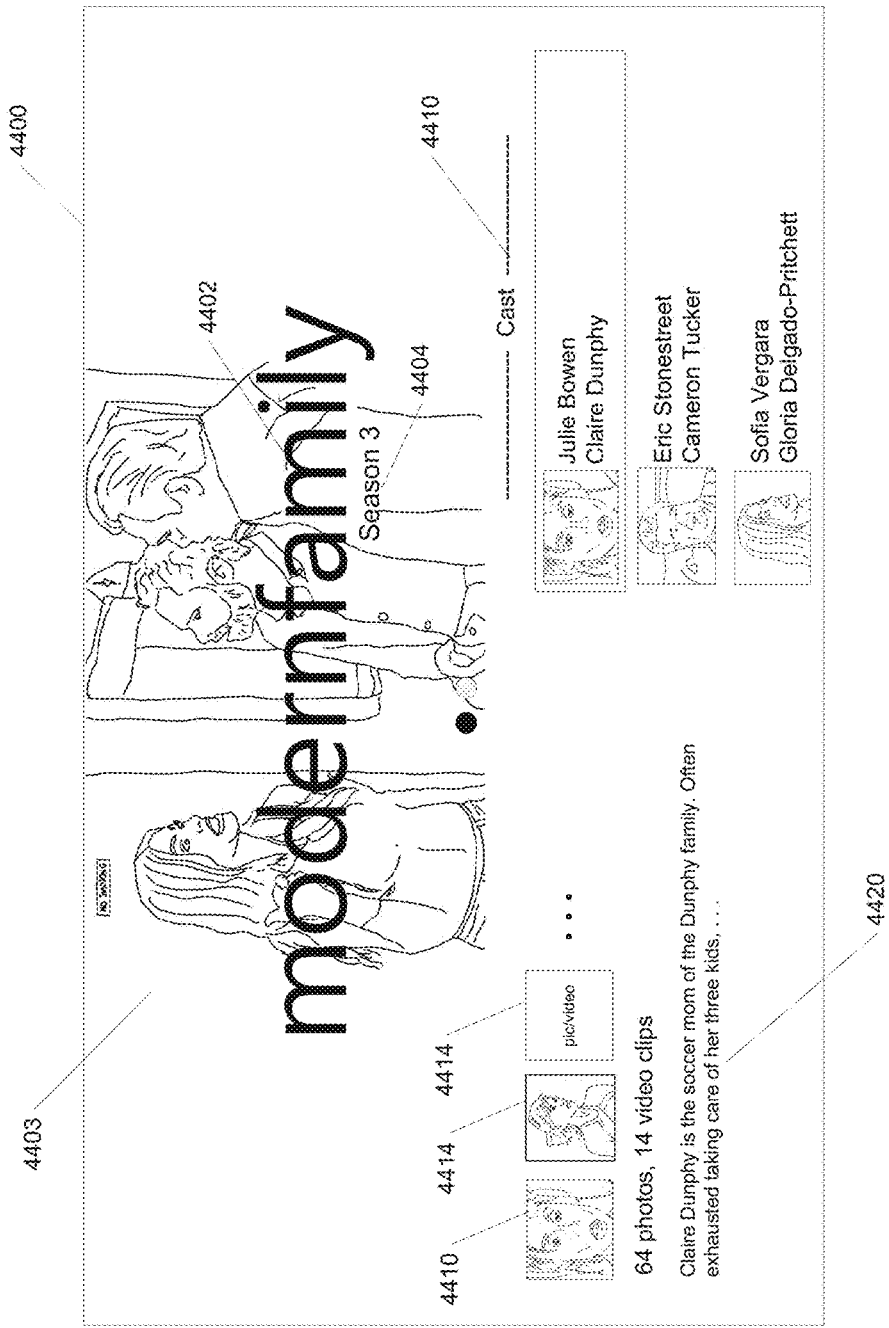
FIG. 44 depicts one embodiment of a video display and user interface.

Turning now to FIG. 44, an embodiment of a landing page is illustrated for the television series Modern Family. FIG. 44 may represent, for example, a second page of information for the landing page depicted in FIG. 41. Here the lower portion of the landing page provides information related to the cast for the television series. In the lower right portion, a listing of cast members 4410 is provided in a manner similar to episodes of FIG. 41. In this example, the first cast member (Julie Bowen) has focus which causes display of related information in the left lower portion of the display. In this example, pictures 4410, 4414, 4414 of the highlighted cast member are provided. Also shown is an indication of a number of media elements available for viewing (64 photos, 14 video clips). A description 4420 of the cast member and/or character is also provided. Further selection of the cast member element 4410 may then cause another page of information related to the selected cast member to be provided. Such additional information may include the additional media elements indicated as being available, and any other suitable content. In various embodiments, the information provided related to cast members, television episodes, movies, series, and so on, may be provided by the primary (subscription) provider, the Internet, proprietary sources, user/viewer provided or generated content, or any combination of the foregoing.

Figure 45:
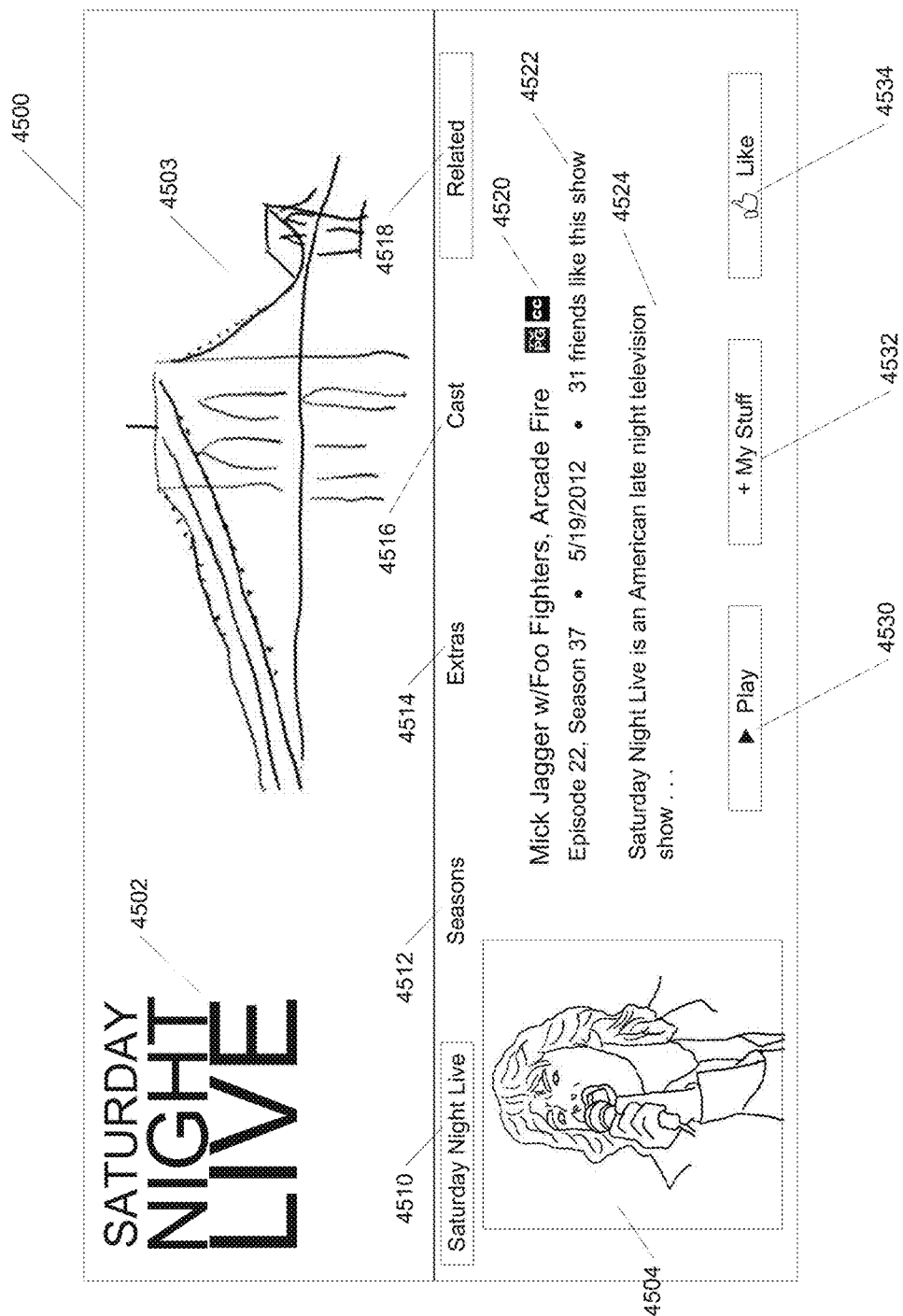
FIG. 45 depicts one embodiment of a video display and user interface.

FIG. 45 illustrates one embodiment if a landing page for a variety television show. Here the display 4500 includes video/picture/artwork 4503 for the show, a title 4502, and selectable categories 4510-4518. As shown the first element 4510 is selected and information regarding a particular episode is presented. A brief title 4520 for the episode is provided, along with descriptive information 4522 (e.g., episode number, season, air date, number of friends that like the show, etc.), and a brief description of the episode 4524. Also included is video/picture/artwork 4504 related to the show or episode. As in the previous examples, selectable elements 4530, 4532, and 4534 are provided which permit a viewer to immediately begin watching the episode, add the episode the their My Stuff collection, or indicate they like the show/episode.

Figure 46:
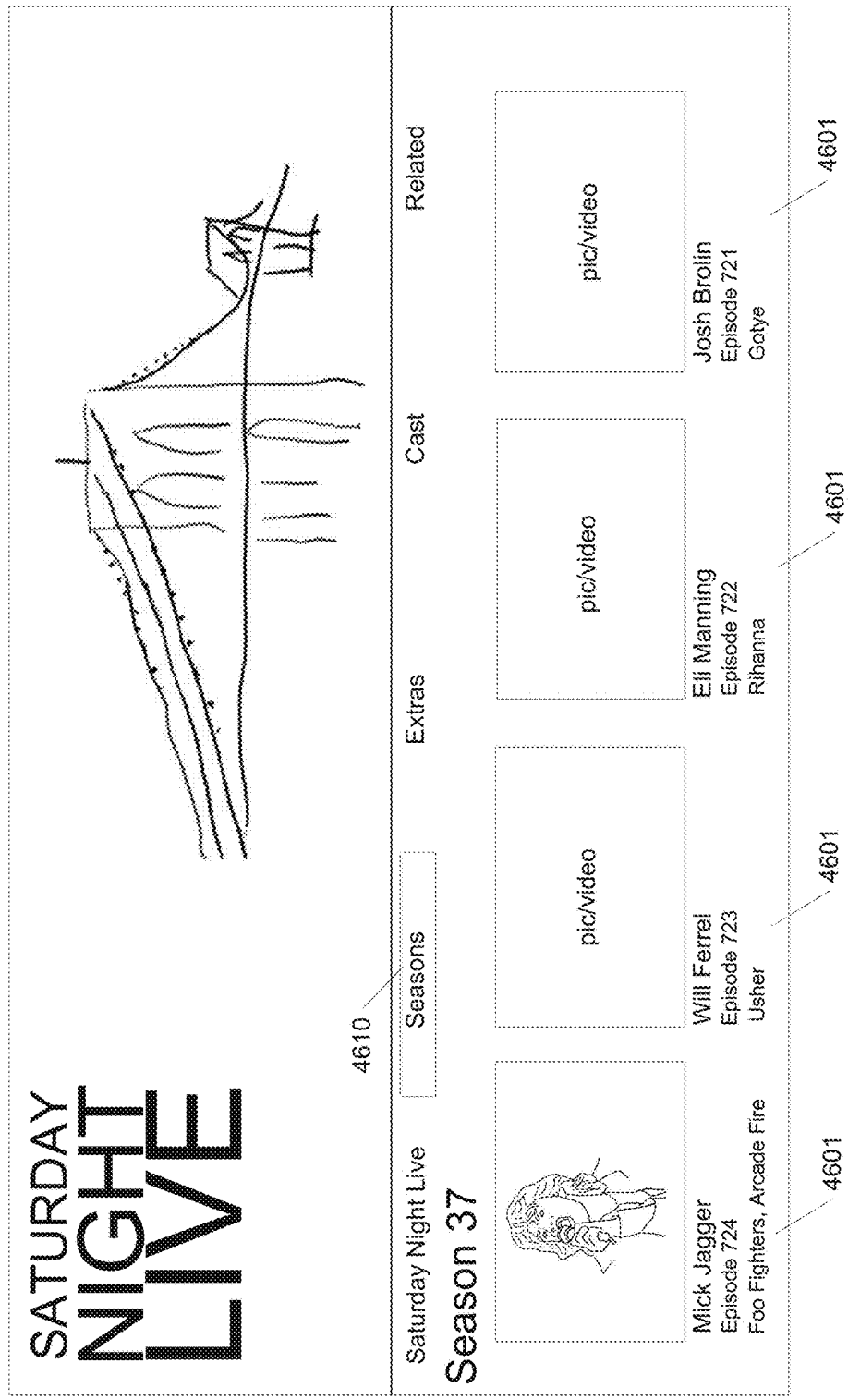
FIG. 46 depicts one embodiment of a video display and user interface.
Figure 47:
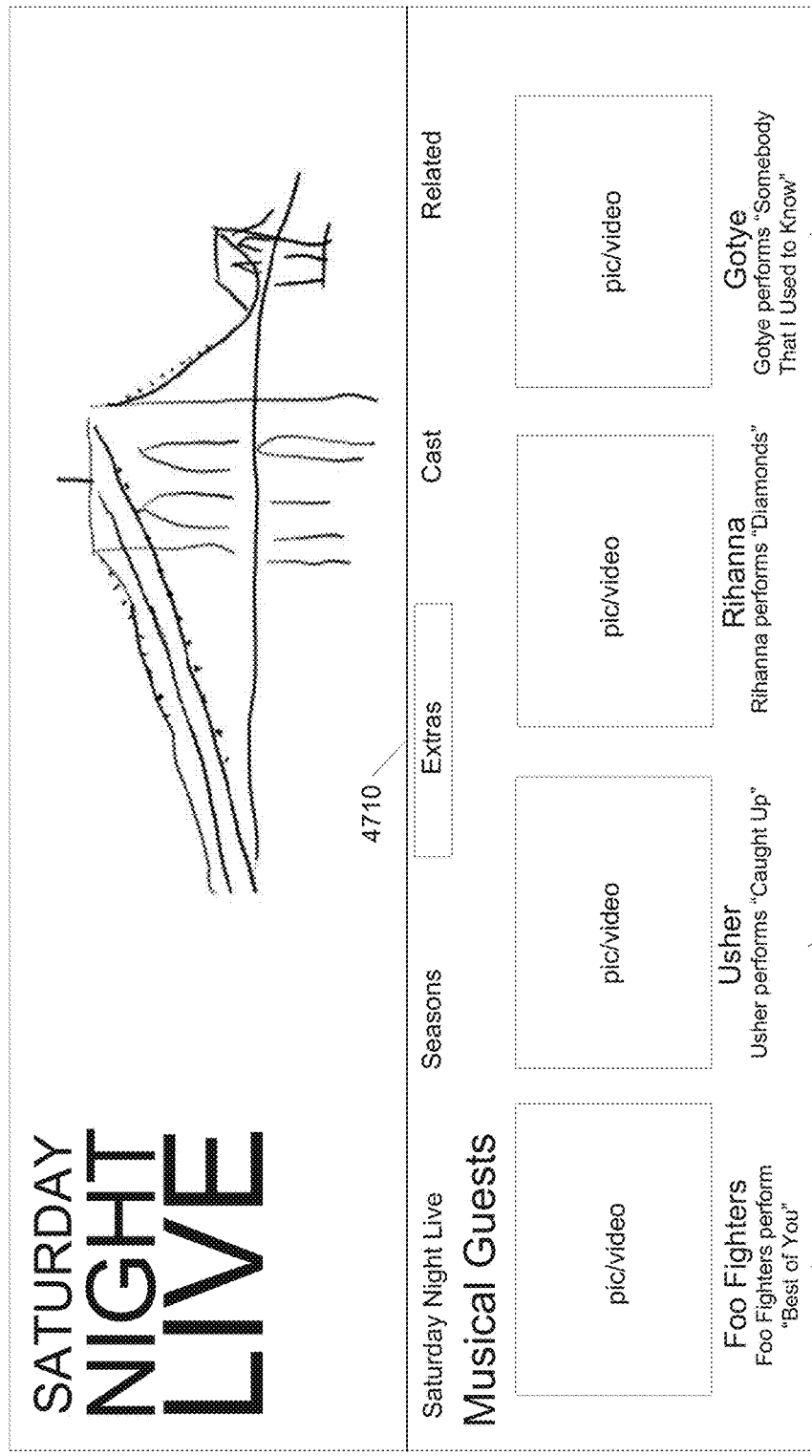
FIG. 47 depicts one embodiment of a video display and user interface.
Figure 48:
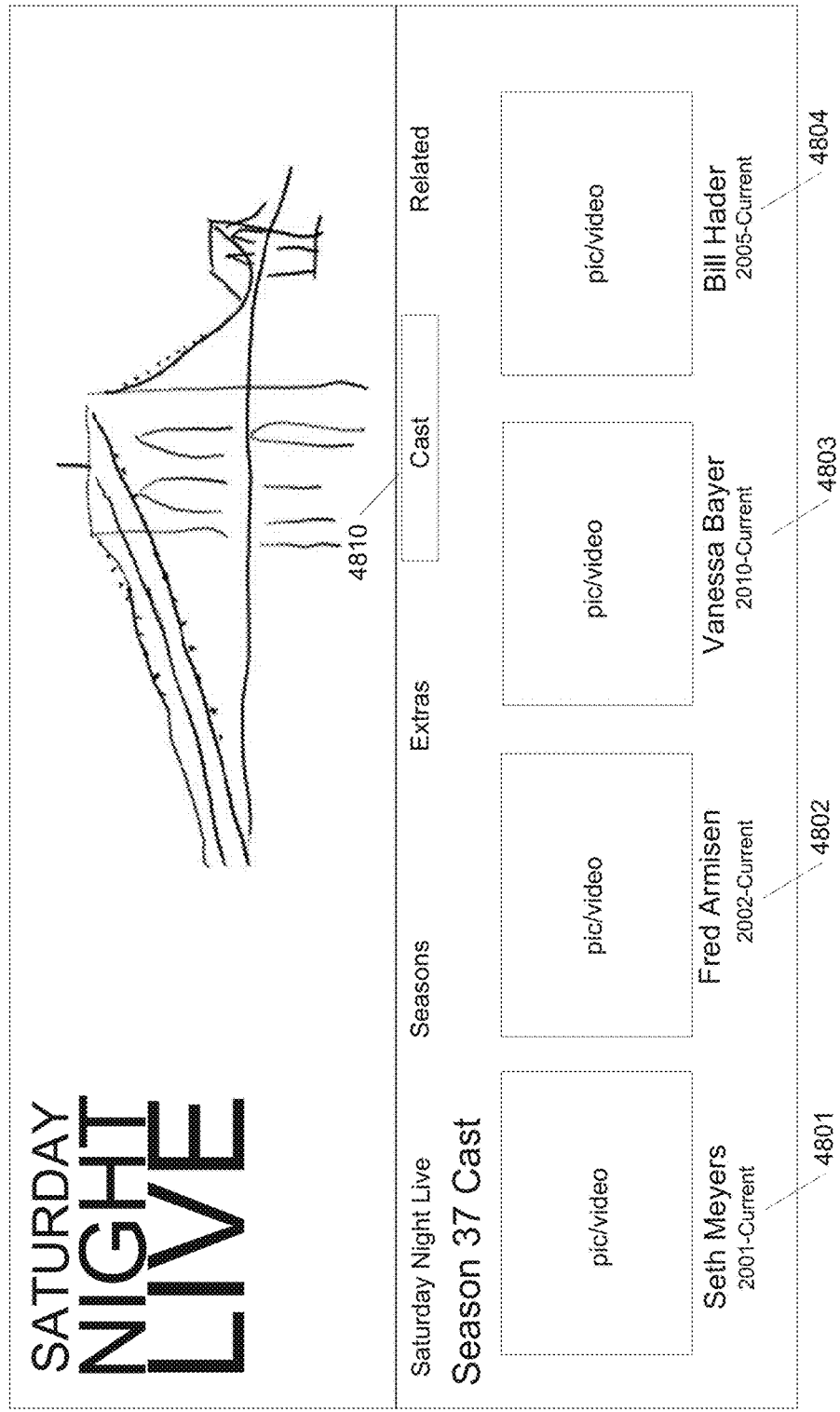
FIG. 48 depicts one embodiment of a video display and user interface.

FIG. 46 depicts the variety show landing page where the Seasons category 4610 is selected. Currently displayed are episodes for Season 37. Each episode element 4601-4604 includes video/picture/artwork for the particular episode along with a brief description which identifies the host of the episode, episode number, and musical guests. FIG. 47 depicts the same landing page with the Extras category 4710 selected. Displayed content in this example includes Musical Guests 4701-4702 which have appeared on the show. Scrolling/paging may permit a viewer to access further information not currently displayed. FIG. 48 provides an example presentation for the Cast category 4810. In this example, various cast members 4801-4804 are presented with information including their name and years as a cast member on the show.

It is noted that while content provided via landing pages such as this may be content deliberately prepared for consumption (e.g., such as extras found on a DVD), in various embodiments content may be provided that has been extracted or otherwise generated and/or compiled by the provider or other sources. For example, by processing the video content and associated metadata, particular elements of video content may be identified which may not already be identifiable via original metadata. Examples include identifying a funny sketch in a television show and generating new metadata that identifies this particular content. Other examples include identifying highlights in sporting events, etc. Other examples for identifying particular content may be based on viewer activity. For example, if it is observed that many viewers are rewinding and repeatedly watching a particular segment of some video content, metadata may be generated which identifies this particular segment. The segment could then be included as available content for viewers generally. In such an embodiment, the particular segment could be said to be identified via crowdsourcing. All such embodiments are contemplated.

Figure 49:
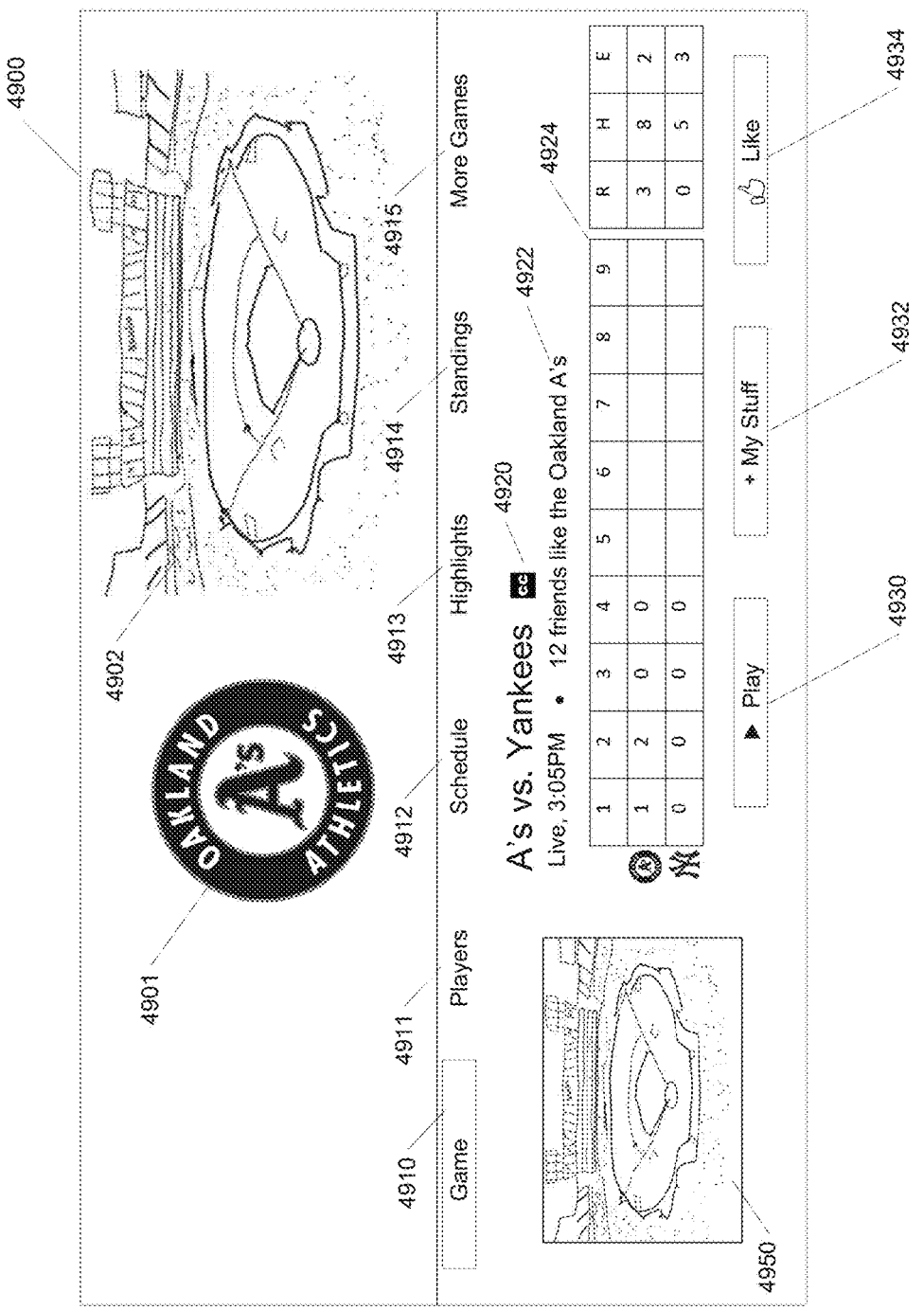
FIG. 49 depicts one embodiment of a video display and user interface.

Turning to FIG. 49, one embodiment of a landing page for a sports team is illustrated. Here the display 4900 includes video/pictures/artwork 4902 related to the sport and/or team, and an identification of the team 4901. A Game category 4910 is currently selected which causes the display of content related to a current game (in this example). An identification of the teams playing 4920 is provided, along with a description 4922 as to air time (Live, 3:05 PM), and a number of friends that like the team that corresponds to the landing page. Also included is a box score 4924 for the game and video/picture/artwork 4950 related to the game.

As previously discussed, there are situations where a viewer does not want to know the current score of a game. Accordingly, in various embodiments the system may be configurable to blackout the box score 4924. In addition, the content 4950 may likewise be prevented from providing video of the game which may include an indication of the score. As shown, an element 4930 is provided to permit the viewer to begin viewing the game. In various embodiments, selecting the element 4930 may immediately "tune to" presentation of the game in progress. Embodiments are also contemplated which permit play from the beginning of the game as well.

Embodiments are further contemplated which permit a viewer to also prevent incoming comments (e.g., in various embodiments the systems described herein may include the ability for friends to provide text messages or other comments to one another, see social media comments, etc.) which might otherwise spoil the outcome of a game. For example, a do not disturb or other setting may be available to control such content. Also shown are elements 4932 which permit the viewer to add the content to their My Stuff collection, and an element 4934 to permit a viewer to indicate they like the content.

Figure 50:
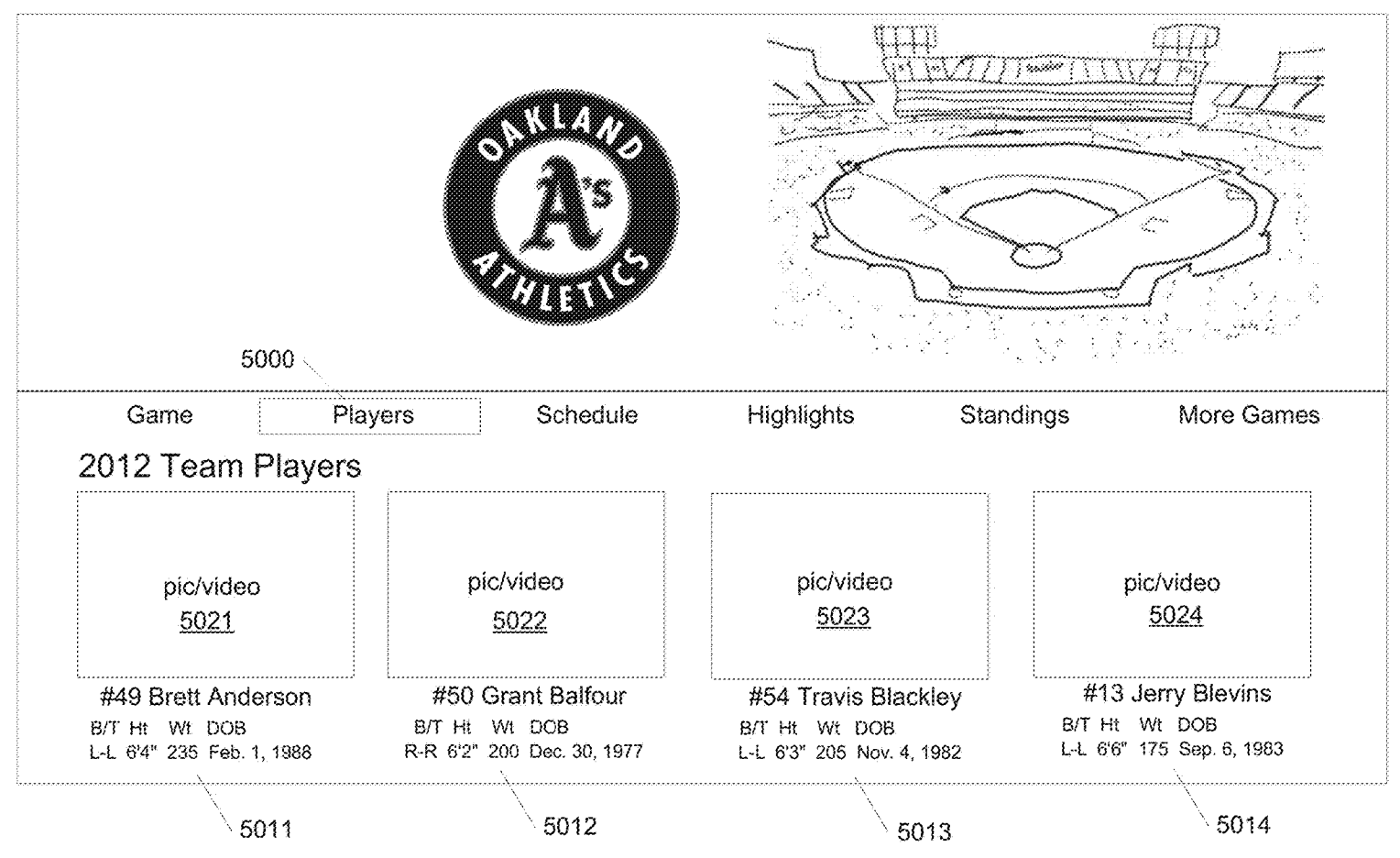

FIG. 50 depicts the landing page with the Players category 5000 selected. Here, the current roster for the 2012 Team is displayed (in part). As shown, four members 5011-5014 are currently displayed with video/picture 5021-5024, player number, name, and various statistics. Selecting one of the players may cause the display of other information related to the player, such as interviews, highlights, history, and so on. A player landing page similar to the actor landing discussed above may be available as well. Additional players may be viewed by scrolling/paging to new content. Additionally, the viewer may zoom in/zoom out to change the number of players displayed at a time. A variety of such embodiments are possible and are contemplated.

FIG. 51 depicts the landing page with the Schedule category 5100 selected. Here an identification of the month and year 5102 are displayed along with a calendar 5110. The calendar includes games played to date and scores for those games. Other games that are scheduled may also be displayed. Additional weeks/months/years of the calendar may be displayed by scrolling/paging as desired. Similar to the above, the number of days displayed at a time may likewise be varied.

Figure 52:
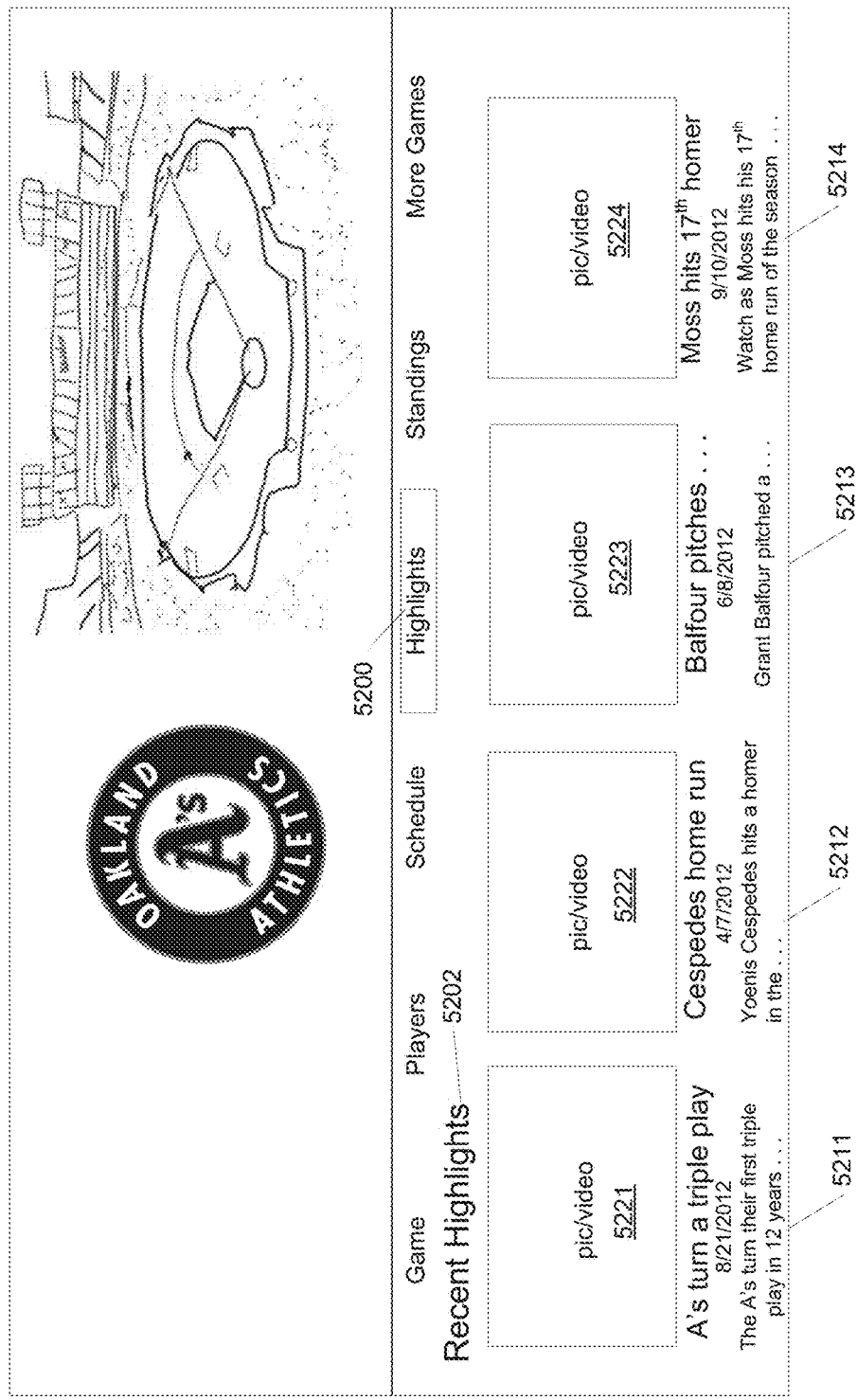
FIG. 52 depicts one embodiment of a video display and user interface.

FIG. 52 depicts the landing page with the Highlights category 5200 selected. In this embodiments, selection of this category causes display of Recent Highlights 5202. In this example, four highlights 5211-5214 are shown. Media content such as video/pictures/artwork, etc., 5221-5224 is provided for each highlighted. Also, a brief description of the highlight is provided with title, date, and so on. Selection of the content 5221-5224 may cause presentation of the corresponding highlights in a larger (e.g., full screen) mode. In various embodiments, the content 5221-5224 itself provides video of the highlight content. In such embodiments, the viewer may move the focus to a particular element to cause presentation of the corresponding audio.

Figure 53:
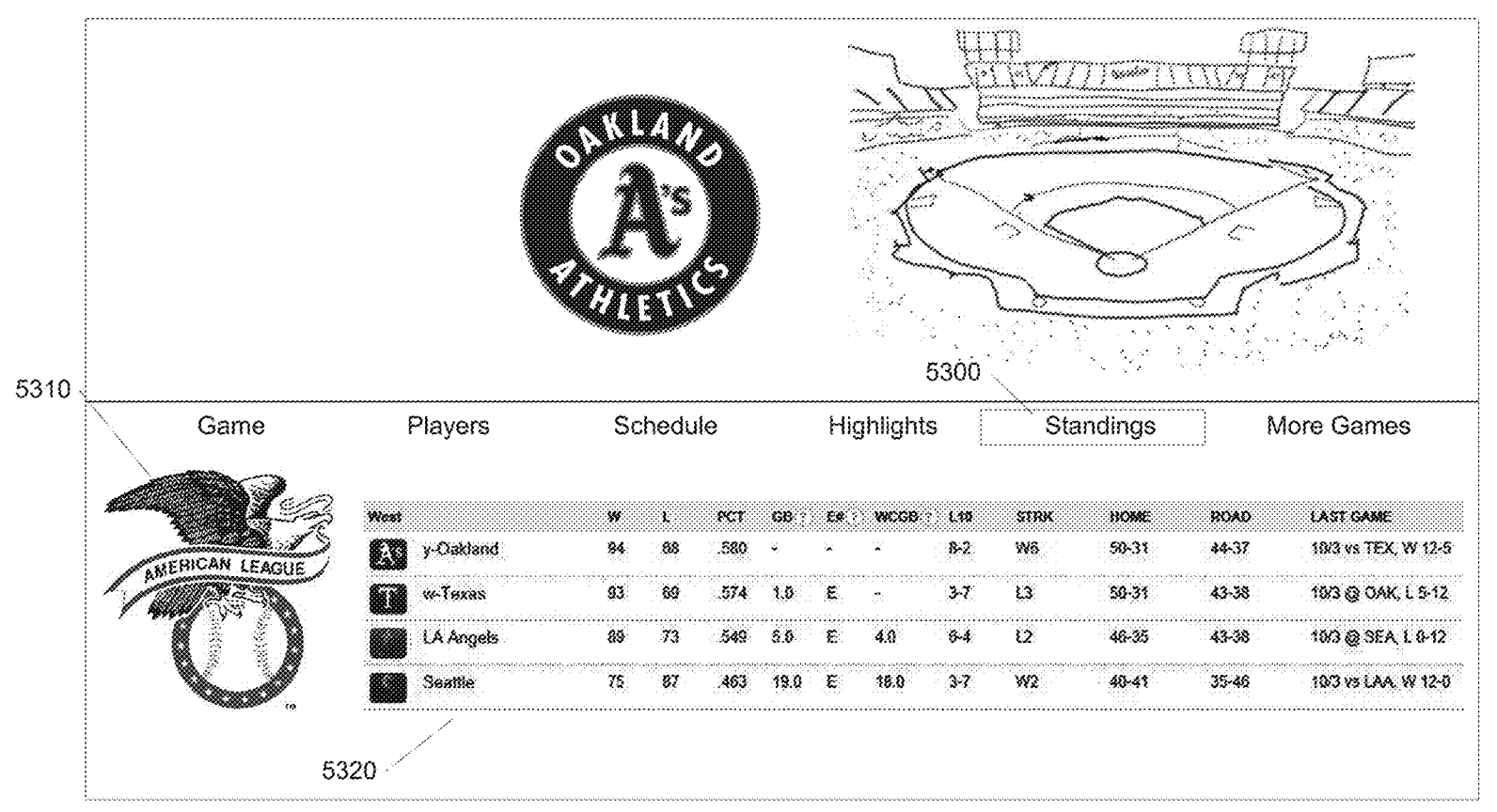

FIG. 53 provides an illustration of one embodiment of content displayed by selection of the Standings category 5300. In this example, a number of teams along with their standings are provided in the box 5320. Also included may be artwork such as the league symbol 5310. Selecting a given row in the box 5320 may lead to a landing page for the selected team. Finally, FIG. 54 illustrates an embodiment in which the More Games category 5400 is selected. Selection of element 5400 in this examples presents other games that are currently on or soon to be on. Scrolling/paging may display further games in the future or the past. Past games may be immediately selectable for viewing. In this example, live video may be displayed for each of the elements 5411-5414 which represent live broadcasts. Alternative content may be highlights or otherwise.

As noted above, in some cases the viewer may restrict such content so that the outcome of a game is not spoiled. In various embodiments, selection of a future event such as a sporting event 5414, television show, movie, or otherwise, may present an option for the viewer to receive a reminder when the content airs. Such reminders could be provided via the television display, smartphone (email, text message), or any other mode desired.

Figure 55:
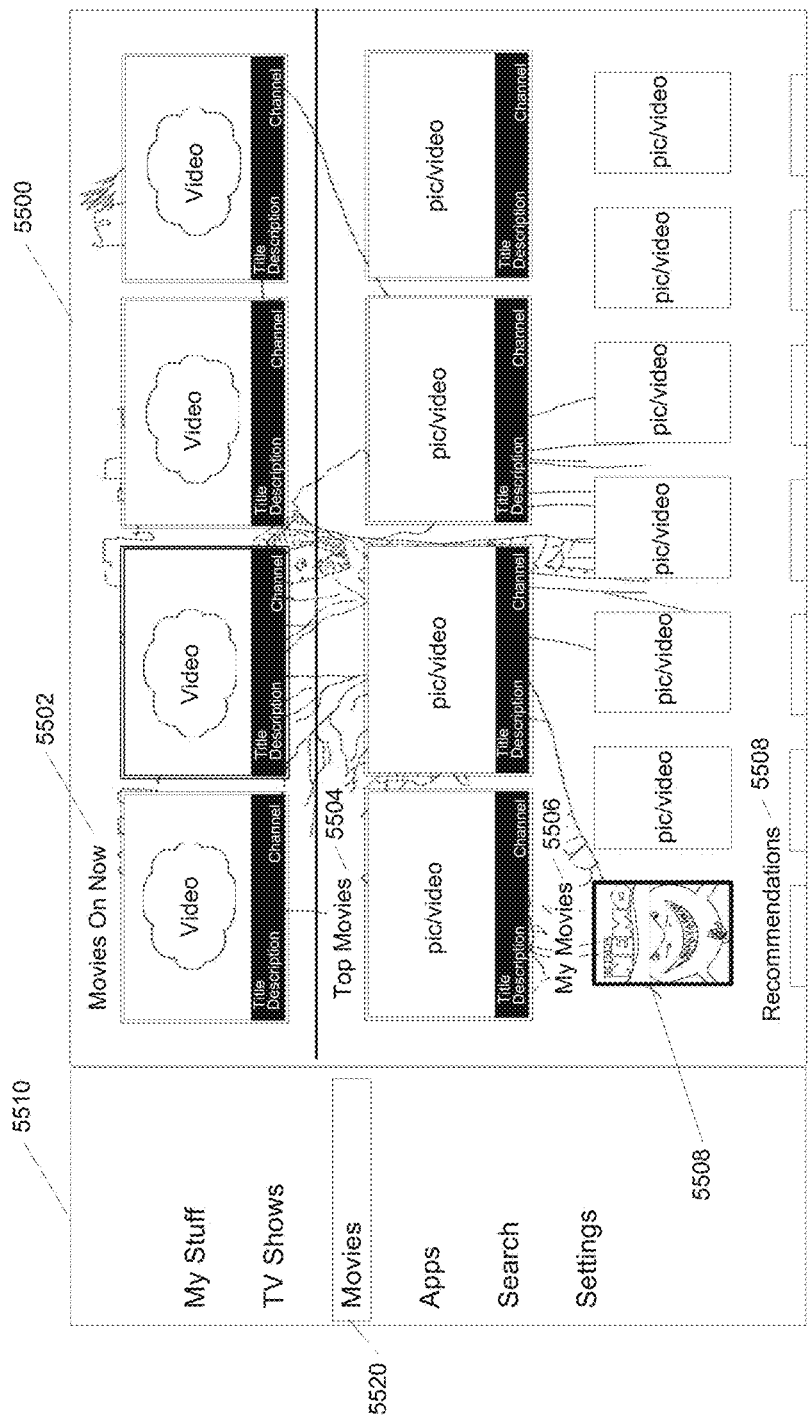
FIG. 55 depicts one embodiment of a video display and user interface.

Turning now to FIG. 55, one embodiment of a display 550 with the side bar 5510 is shown. In this example, the Movies category 5520 is selected which causes display of movie related content. Movies on Now 5502, Top Movies 5504, My Movies 5506, and Recommendations 5508 are shown. As may be appreciated, Movies on Now 5502 includes the display of multiple movies that are currently being broadcast. Video of each may be simultaneously displayed as per the previous examples. Each movie element may also include an indication of title, brief description, and title. Focus, as before, may provide for presentation of the corresponding audio.

The Top Movies 5504 category includes display of movies which are highly rated, being promoted, or otherwise. My Movies 5506 represents a collection of movies which the viewer has added to their My Stuff collection. Finally, the Recommendations category 5508 provides recommended movies to the viewer. Such movies may be recommended based on the viewer's profile, history, friend's likes, or otherwise. As before, each of the elements may be selectable to cause the display of further content. In this example, element 5508 has focus and is selected by the viewer which causes the display shown in FIG. 56.

Figure 56:
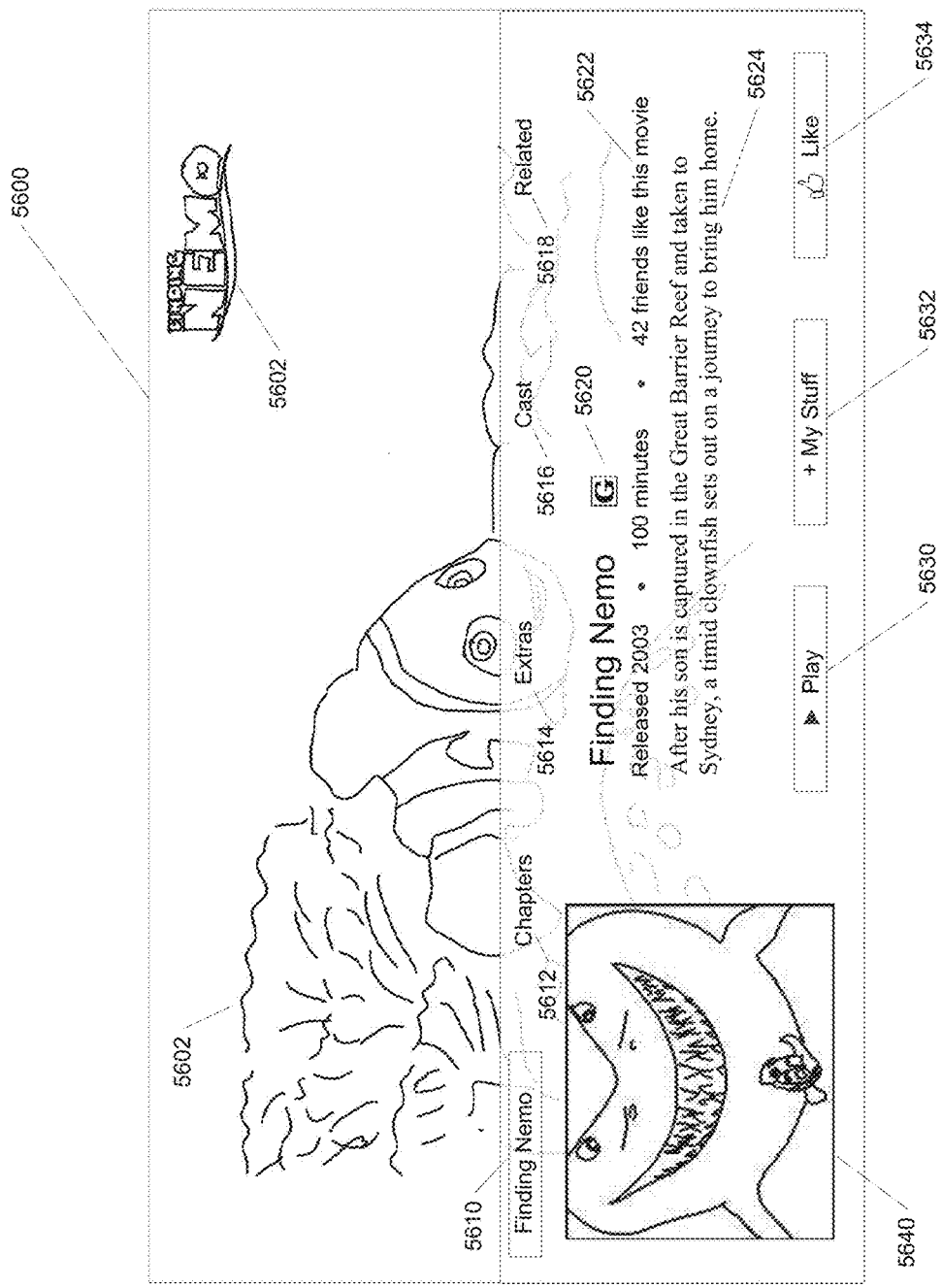
FIG. 56 depicts one embodiment of a video display and user interface.

FIG. 56 represents one embodiment of a landing page for a movie. Similar to the previous examples, artwork 5602, 5602 is provided for the movie. In addition, categories such as Finding Nemo 5610, Chapters 5612, Extras 5614, Cast 5616, and Related 5622 are shown. Selection of each of the categories causes the display of related content. In the example shown, the Finding Nemo category 5610 is selected and general information related to the movie is provided. Provided here is a title with rating 5620, release date, run time, and number of friends that like the movie 5622, and synopsis 5624. Further elements are also provided to begin immediate viewing of the movie 5630, add the movie to the viewer's My Stuff collection (as shown in FIG. 55), and indicate the viewer likes the movie 5634. Similar to a DVD, Chapters 5612 may provide direct access to various chapters of the movie. Extras 5614, Cast, 5616, and Related 5618 may include extra material found on a DVD as well as other content not found on DVDs. For example, provider created content may be provided, Internet based content, content created by other viewers, and so on, may all be available.

Figure 57:
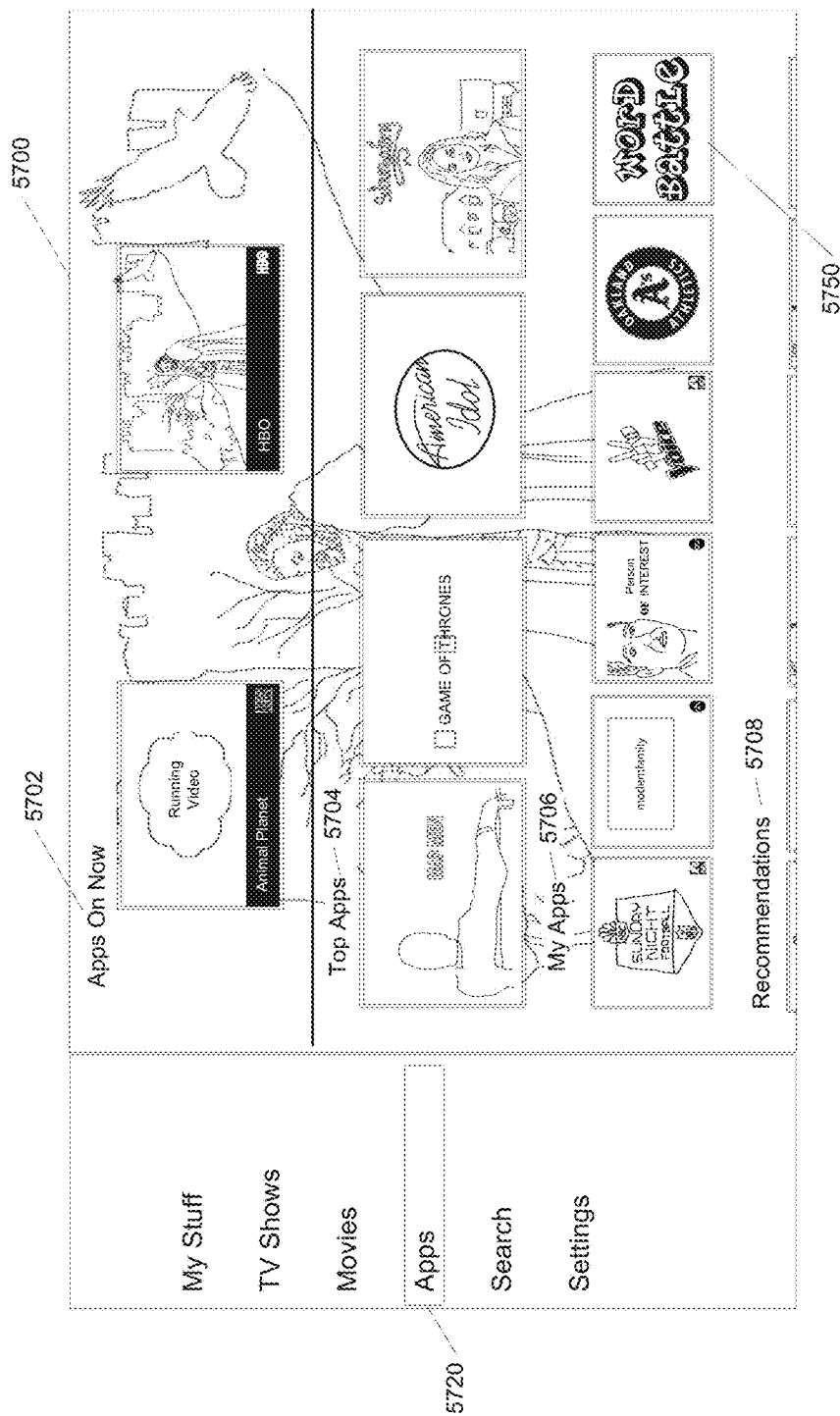
FIG. 57 depicts one embodiment of a video display and user interface.

FIG. 57 depicts the side bar with the APPS category 5720 selected. In various embodiments, various executable applications (similar to the apps available from Apple's iTunes) are available. These apps may provide additional content related to television viewing and/or may otherwise enhance the viewing of television related content. Some apps may be executable by a set-top box. Others may be executable on a smart phone or tablet computer to provide a second screen for use while viewing television content. In the example shown, an Apps On Now category 5702 provides an indication of apps which are currently running or otherwise memory resident (e.g., in the set top box). A Top Apps category 5704 depicts various apps which are popular (for example), highly rated, etc. My Apps 5706 shows a collection of apps which are included as part of the viewer's My Stuff collection. Finally, Recommendations 5708 provides recommended apps to the viewer. It is noted that the apps needn't be strictly television viewing related. For example a game app 5750 is shown in the embodiment. Such game apps may be playable by a single person, may be playable with other viewer's, may be playable with other's via an Internet connection, or otherwise. In some embodiments, particular apps may be promoted to the side bar for easy access. All such embodiments are contemplated.

Figure 58:
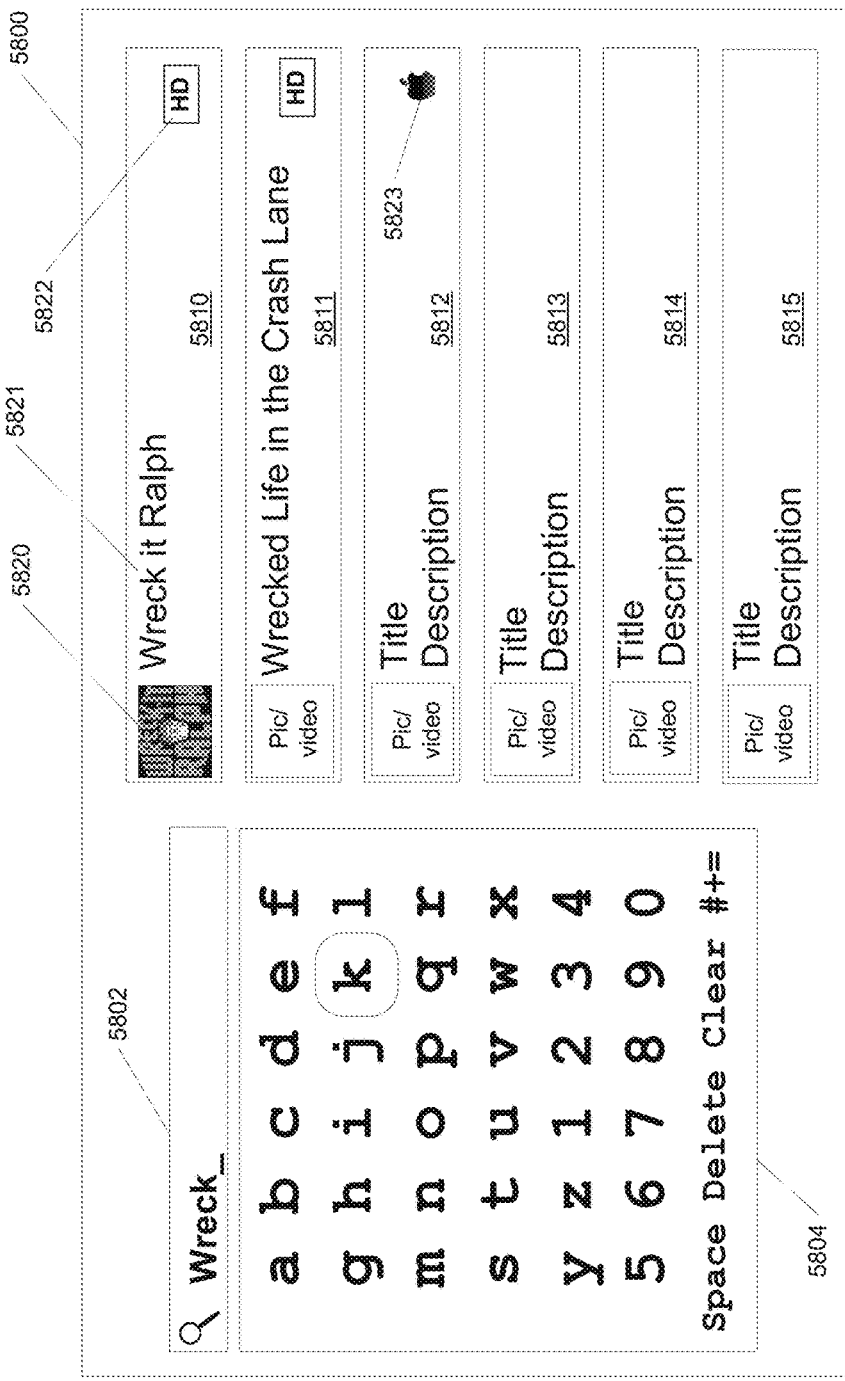
FIG. 58 depicts one embodiment of a video display and user interface.

Finally, FIG. 58 depicts one embodiment of a search screen that may be displayed by selecting the Search category from the side bar. In this example, an input bar 5802 displays characters which have been selected from the selection box 5804. Matching entries 5810-5815 are displayed to the right with video/picture/artwork 5820 and title 5821. Other suitable information may be displayed as desired, such as quality/resolution indicator 5822. Other indications, such as indicator 5823, may be included which identify content available for purchase. Numerous alternative embodiments for presentation of search screen and results are possible and are contemplated.

Figure 59:
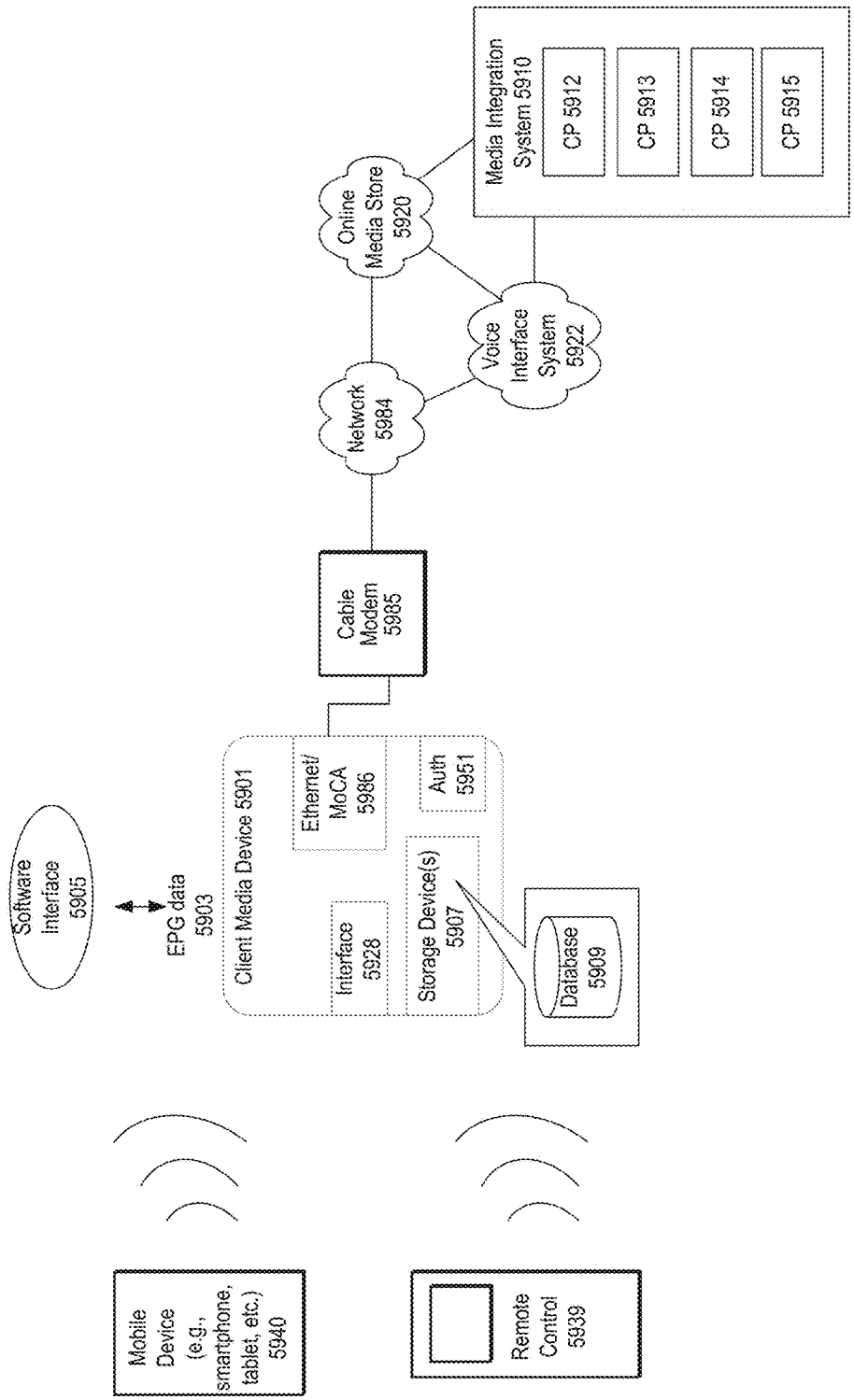
FIG. 59 depicts one embodiment of a media content delivery system.

FIG. 59 illustrates a system including a client media device 5901 configured to receive media content via a network 5984. The client media device may provide the media content to one or more display devices, audio devices, or other devices enabling a user of the client device to view, hear, or otherwise use the media content.

The client media device 5901 may communicate with an online media store 5920 through the network 5984 to receive information for displaying a user interface showing various media content available for delivery to the client media device. Each piece of media content may be referred to as a "media production." Examples of media productions include various kinds of movies and films, television programs, music videos, albums/songs, etc. In general, a given media production may include any kind of content that includes video and/or audio information.

In some embodiments the online media store may be coupled to or may include a media integration system 5910 which integrates media productions from a plurality of third-party content provider systems, such as the content providers CP 5912-5915. Each of the content provider systems may be managed by or affiliated with any kind of company or organization, such as cable or satellite television providers, television networks or channels, movie studios, sporting leagues, news organizations, music labels, online media services, etc. Thus, the user interface displayed by the client media device may aggregate the media productions available from many different content providers or sources, and may provide a convenient way for the user to see the content from different providers in an integrated view.

In various embodiments the client media device may communicate with the online media store 5920 through any kind of network 5984. The network 5984 may include any type of network or combination of networks. For example, the network 5984 may include any type or combination of local area network (LAN), a wide area network (WAN), wireless networks, an Intranet, the Internet, etc. Examples of local area networks include Ethernet networks, Fiber Distributed Data Interface (FDDI) networks, and token ring networks.

In the illustrated embodiment the client media device is coupled to the network 5984 via Ethernet hardware or Multimedia over Coax Alliance (MoCA) hardware 5986, which in turn couples to a cable modem 5985. In other embodiments the client media device may be coupled to the network 5984 via any other type of wired or wireless connection medium or device. For example, wired mediums may include Ethernet, fiber channel, a modem, etc. Wireless connection mediums may include a wireless connection using a wireless communication protocol such as IEEE 802.11 (wireless Ethernet), a modem link through a cellular service, a satellite link, etc.

The client media device may include one or more storage devices 5907 configured to store data. At least one of the storage devices 5907 may include non-volatile memory configured to persistently store data. In various embodiments the storage device(s) may include one or more disk drives, solid state drives, flash memory devices, optical storage devices, or any other kinds of devices for storing data. In some embodiments the storage device(s) may also include various kinds of volatile memory, such as random access memory (RAM), e.g., synchronous dynamic RAM (SDRAM), static RAM (SRAM), etc.

Electronic Programming Guide (EPG) data 5903 may be periodically delivered to the client media device 5901 via a software interface 5905. The software interface 5905 may include any kind of programming interface or messaging interface that enables the client media device to communicate with an external system to receive the EPG data 5903 or other data. As one example, the software interface 5905 may include a JavaScript Object Notation (JSON) interface. As another example, the software interface 5905 may include a URL-based interface that enables the client media device to perform various functions or exchange information by referencing uniform resource locators (URLs) with particular parameters embedded in them.

The client media device may store the EPG data 5903 on the storage device(s) 5907. For example, one or more databases 5909 may be stored on the storage device 5907, and the EPG data 5903 may be stored in one or more of the databases. The EPG data 5903 may include information about television programming, such as the listing of programs, their scheduled times, the channel lineup, images associated with the programs, etc. The EPG data 5903 may be customized for the particular user of the client media device 5901. For example, if the user subscribes to some subscription-based content providers, but not others, then the EPG data 5903 may include information for only the programs or media productions offered by the providers to which the user subscribes.

The database(s) 5909 may also store other information, such as personalization information for the user(s) of the client media device 5901. The personalization information may include the user's favorite programs or channels, list of recently viewed content, stored play positions for various media content, watch lists, bookmarks, etc.

The client media device may be configured to receive user input from a remote control device 5939 via an interface 5928. The remote control device may use infrared communication, Bluetooth communication, or any of various other kinds of wireless or wired communication techniques to transmit signals to the client media device indicating the user input.

In some embodiments the client media device may be configured to communicate with the media integration system 5910 and/or the online media store 5920 through a voice interface system 5922. For example, in some embodiments the remote control device or the client media device may include a microphone device 5924 that receives speech from the user, e.g., where the speech includes commands, requests, questions, etc. The client media device may convert the speech into digital packets for transmission over the network 84 to the voice interface system 5922. The voice interface system may perform speech recognition to recognize the user's commands or questions. The voice interface system may communicate with the online media store 5920 and/or the media integration system 5910 to pass the user's commands or questions on to them via an interface. The online media store 5920 and/or the media integration system 5910 may then generate information in response to the user's commands or questions and return it to the client media device (or return it to the voice interface system, which may then forward it to the client media device). For example, the user may request to lookup a television program having a certain title or actor, and the system may return information that the client media device uses to display a list of programs matching the title or actor.

In various embodiments the information transmitted from the online media store or voice interface system to the client media device may include any kind of information useable by the client media device to display information regarding the media content available for delivery to the client media device. For example, in some embodiments the system may utilize Extensible Markup Language (XML) code or other markup language code which describes the information to be displayed. The client media device may parse the XML code and display a user interface based on the described information. In some embodiments the system may also transmit graphics files or video feeds which the client media device may incorporate into the user interface.

In some embodiments the client media device may also communicate with a mobile computing device 5940, e.g., where the user may hold the mobile device. For example, the mobile device 5940 may be a handheld computing device, wearable computing device, or other portable computing device. Examples of mobile devices include smartphones, tablet computers, personal digital assistants, portable music players, handheld game devices, wearable computers (e.g., glasses watches), etc. In some embodiments the user may control the client media device 5901 using the mobile device 5940, e.g., using the mobile device 5940 as a remote control. In some embodiments the client media device may also forward the media content received from the online media store 5920 or media integration system 5910 to the mobile device 5940, e.g., so that it can be displayed on a display device included in the mobile device 5940. In other embodiments the mobile device 5940 may communicate directly with the online media store 5920 and/or the media integration system 5910, e.g., without going through the client media device 5901 as an intermediate. The client media device may also be included as a component within the mobile device in some embodiments, and/or the mobile device may be configured to perform the functions described with reference to the client media device.

The client media device may be configured to utilize digital rights management (DRM) techniques to ensure that the user is authorized to receive and view selected media content. For example, the client media device may include an authorization module 5951 configured to communicate with one or more remote servers to implement the digital rights management for the media content. In various embodiments the client media device may communicate with servers associated with any of various systems or organizations in order to implement the digital rights management, such as one or more servers in the online media store 5920 or the content provider systems whose media productions are integrated by the media integration system 5910.

In the above discussion, various embodiments have been described. It is noted that these embodiments may be combined in any manner desired. In various embodiments, program instructions of a software application may be used to implement the methods and/or mechanisms previously described. The program instructions may be stored on a computer readable storage medium. Numerous types of storage media are available. The storage medium may be accessible by a computer or other processing device during use to provide the program instructions and accompanying data to the computer or device for program execution.

Therefore, according to the above, this disclosure includes subject matter directed to the following examples:

Example 1

A method comprising: displaying video content on a display device; displaying a side bar that overlays a portion of the video content, the side bar comprising a plurality of selectable elements each of which corresponds to a different category of video content; detecting user input from a viewer selecting a first element of said elements; responsive to detecting said input, overlaying the video content with a plurality of elements corresponding to a category represented by the first element, the plurality of elements including live broadcast video for multiple channels on multiple television networks.

Example 2

The method as recited in preceding example 1, further comprising presenting audio for a particular element of the plurality of elements responsive to the particular element having been selected for focus.

Example 3

The method as recited in preceding example 1, wherein said side bar selectable element categories include television shows, movies, and content the viewer has identified as corresponding to a given collection.

Example 4

The method as recited in preceding example 3, wherein the side bar further includes selectable subcategories for the given collection, and wherein responsive to selecting a given subcategory, content displayed within the given collection is filtered according to the given subcategory.

Example 5

The method as recited in preceding example 1, wherein the display device comprises at least one of a television, a phone, a tablet computer, a portable gaming device, a wearable portable device, a display device in a motor vehicle, or a remote control.

Example 6

The method as recited in preceding example 1, wherein each element of the plurality of elements is accompanied by a description of content being displayed by the corresponding element.

Example 7

The method as recited in preceding example 1, further comprising: detecting selection of one of a given element of said plurality of elements; and responsive to detecting said selection, displaying a landing page dedicated to content associated with the given element.

Example 8

The method as recited in preceding example 7, wherein said landing page provides access to additional content related to the given element, said additional content including access to multiple seasons and episodes of a television series.

Example 9

The method as recited in preceding example 7, wherein said landing page provides access to additional content related to the given element, said additional content including access to multiple games for a sports team.

Example 10

The method as recited in preceding example 7, wherein said landing page provides access to additional content representing selected portions of larger video content, said selected portions having been identified through crowdsourcing.

Example 11

A receiver for use in a television system, the receiver comprising: a first interface configured to receive a signal comprising video content; and circuitry configured to: display video content on a display device; display a side bar that overlays a portion of the video content, the side bar comprising a plurality of selectable elements each of which corresponds to a different category of video content; detect user input from a viewer selecting a first element of said elements; responsive to detecting said input, overlay the video content with a plurality of elements corresponding to a category represented by the first element, the plurality of elements including live broadcast video for multiple channels on multiple television networks.

Example 12

The receiver as recited in preceding example 11, wherein the circuitry if further configured to present audio for a particular element of the plurality of elements responsive to the particular element having been selected for focus.

Example 13

The receiver as recited in preceding example 11, wherein said side bar selectable element categories include television shows, movies, and content the viewer has identified as corresponding to a given collection.

Example 14

The receiver as recited in preceding example 13, wherein the side bar further includes selectable subcategories for the given collection, and wherein responsive to selecting a given subcategory, content displayed within the given collection is filtered according to the given subcategory.

Example 15

The receiver as recited in preceding example 11, wherein the display device comprises at least one of a television, a phone, a tablet computer, a portable gaming device, a wearable portable device, a display device in a motor vehicle, or a remote control.

Example 16

The receiver as recited in preceding example 11, wherein each element of the plurality of elements is accompanied by a description of content being displayed by the corresponding element.

Example 17

The receiver as recited in preceding example 11, wherein the circuitry is further configured to: detect selection of one of a given element of said plurality of elements; and
responsive to detecting said selection, display a landing page dedicated to content associated with the given element.

Example 18

The receiver as recited in preceding example 17, wherein said landing page provides access to additional content related to the given element, said additional content including access to multiple seasons and episodes of a television series.

Example 19

The receiver as recited in preceding example 17, wherein said landing page provides access to additional content related to the given element, said additional content including access to multiple games for a sports team.

Example 20

The receiver as recited in preceding example 17, wherein said landing page provides access to additional content representing selected portions of larger video content, said selected portions having been identified through crowdsourcing.

This disclosure further includes subject matter directed to the following examples:

Example 1

A method comprising: displaying video content on a display device; displaying a side bar that overlays a portion of the video content, the side bar comprising a plurality of selectable elements each of which corresponds to a different category of video content; detecting user input from a viewer selecting a first element of said elements; responsive to detecting said input, overlaying the video content with a plurality of elements corresponding to a category represented by the first element, the plurality of elements including live broadcast video for multiple channels on multiple television networks.

Example 2

The method as recited in preceding example 1, further comprising presenting audio for a particular element of the plurality of elements responsive to the particular element having been selected for focus.

Example 3

The method as recited in preceding example 1, wherein said side bar selectable element categories include television shows, movies, and content the viewer has identified as corresponding to a given collection.

Example 4

The method as recited in preceding example 3, wherein the side bar further includes selectable subcategories for the given collection, and wherein responsive to selecting a given subcategory, content displayed within the given collection is filtered according to the given subcategory.

Example 5

The method as recited in preceding example 1, wherein the display device comprises at least one of a television, a phone, a tablet computer, a portable gaming device, a wearable portable device, a display device in a motor vehicle, or a remote control.

Example 6

The method as recited in preceding example 1, wherein each element of the plurality of elements is accompanied by a description of content being displayed by the corresponding element.

Example 7

The method as recited in preceding example 1, further comprising: detecting selection of one of a given element of said plurality of elements; and responsive to detecting said selection, displaying a landing page dedicated to content associated with the given element.

Example 8

The method as recited in preceding example 7, wherein said landing page provides access to additional content related to the given element, said additional content including access to multiple seasons and episodes of a television series.

Example 9

The method as recited in preceding example 7, wherein said landing page provides access to additional content related to the given element, said additional content including access to multiple games for a sports team.

Example 10

The method as recited in preceding example 7, wherein said landing page provides access to additional content representing selected portions of larger video content, said selected portions having been identified through crowd-sourcing.

Example 11

A receiver for use in a television system, the receiver comprising: a first interface configured to receive a signal comprising video content; and circuitry configured to: display video content on a display device; display a side bar that overlays a portion of the video content, the side bar comprising a plurality of selectable elements each of which corresponds to a different category of video content; detect user input from a viewer selecting a first element of said elements; responsive to detecting said input, overlay the video content with a plurality of elements corresponding to a category represented by the first element, the plurality of elements including live broadcast video for multiple channels on multiple television networks.

Example 12

The receiver as recited in preceding example 11, wherein the circuitry if further configured to present audio for a particular element of the plurality of elements responsive to the particular element having been selected for focus.

Example 13

The receiver as recited in preceding example 11, wherein said side bar selectable element categories include television shows, movies, and content the viewer has identified as corresponding to a given collection.

Example 14

The receiver as recited in preceding example 13, wherein the side bar further includes selectable subcategories for the given collection, and wherein responsive to selecting a given subcategory, content displayed within the given collection is filtered according to the given subcategory.

Example 15

The receiver as recited in preceding example 11, wherein the display device comprises at least one of a television, a phone, a tablet computer, a portable gaming device, a wearable portable device, a display device in a motor vehicle, or a remote control.

Example 16

The receiver as recited in preceding example 11, wherein each element of the plurality of elements is accompanied by a description of content being displayed by the corresponding element.

Example 17

The receiver as recited in preceding example 11, wherein the circuitry is further configured to: detect selection of one of a given element of said plurality of elements; and responsive to detecting said selection, display a landing page dedicated to content associated with the given element.

Example 18

The receiver as recited in preceding example 17, wherein said landing page provides access to additional content related to the given element, said additional content including access to multiple seasons and episodes of a television series.

Example 19

The receiver as recited in preceding example 17, wherein said landing page provides access to additional content related to the given element, said additional content including access to multiple games for a sports team.

Example 20

The receiver as recited in preceding example 17, wherein said landing page provides access to additional content representing selected portions of larger video content, said selected portions having been identified through crowd-sourcing.

This disclosure further includes subject matter directed to the following examples:

Example 1

An apparatus comprising: a first means configured to store data; and a second means configured to generate a user interface on a display, wherein the user interface shows content in a first layout, wherein the first layout comprises a sidebar, and wherein the sidebar includes a plurality of categories of video content.

Example 2

The apparatus as recited in any one or more of the preceding examples, wherein the second means is further configured to filter and show available content on the display responsive to detecting a given category has been selected in the sidebar.

Example 3

The apparatus as recited in any one or more of the preceding examples, wherein a landing page corresponding to a given element is shown responsive to detecting the given element has been selected from the available content.

Example 4

The apparatus as recited in any one or more of the preceding examples, wherein the given element is a television show, and wherein the landing page provides access to multiple shows and multiple seasons of the television show.

Example 5

The apparatus as recited in any one or more of the preceding examples, wherein the landing page provides access to additional content representing selected portions of larger video content, where the selected portions have been identified through crowdsourcing.

Example 6

The apparatus as recited in any one or more of the preceding examples, wherein the given element is a given sports team, and wherein the landing page provides access to multiple games for the given sports team.

Example 7

The apparatus as recited in any one or more of the preceding examples, wherein the sidebar includes a collection category specific to a given viewer.

Example 8

The apparatus as recited in any one or more of the preceding examples, wherein video content within the collection category may be shown responsive to detecting the collection category has been selected.

Example 9

The apparatus as recited in any one or more of the preceding examples, wherein one or more of the categories within the sidebar includes a plurality of subcategories.

Example 10

The apparatus as recited in any one or more of the preceding examples, wherein available content is filtered and shown on the display responsive to detecting a given subcategory has been selected.

Example 11

The apparatus as recited in any one or more of the preceding examples, wherein the first means is configured to store and serve video content to a plurality of subscribers.

Example 12

The apparatus as recited in any one or more of the preceding examples, wherein content which is presented on the display includes live broadcast video for multiple channels on multiple television networks.

Example 13

The apparatus as recited in any one or more of the preceding examples, wherein content which is presented on the display is selectable to cause display of further information related to a given selected element.

Example 14

The apparatus as recited in any one or more of the preceding examples, wherein the sidebar is generated as an overlay on video content underneath.

Example 15

The apparatus as recited in any one or more of the preceding examples, wherein the sidebar is generated and integrated with the video content.

Example 16

The apparatus as recited in any one or more of the preceding examples, wherein the second means is integrated within a television.

Example 17

The apparatus as recited in any one or more of the preceding examples, wherein the sidebar is shown as a vertical bar on a left side of the display.

Example 18

The apparatus as recited in any one or more of the preceding examples, wherein the sidebar is shown as a horizontal bar in a central location within the display.

Example 19

The apparatus as recited in any one or more of the preceding examples, wherein the display is a television.

Example 20

The apparatus as recited in any one or more of the preceding examples, wherein the television comprises a set-top box.

Example 21

An apparatus comprising: a first means configured to receive video content; and a second means configured to show a user interface, wherein the user interface comprises a sidebar, and wherein the sidebar comprises a plurality of elements including a friends element, wherein when the friends element is selected by a main viewer using the second device, the user interface is configured to show other viewers who the main viewer has identified as friends.

Example 22

The apparatus as recited in any one or more of the preceding examples, wherein when the friends element is selected, the second means is further configured to show additional content which the other viewers have recommended.

Example 23

The apparatus as recited in any one or more of the preceding examples, wherein when the friends element is selected, the second means is further configured to show a composite element representative of all of the other viewers who the main viewer has identified as friends.

Example 24

The apparatus as recited in any one or more of the preceding examples, wherein when the friends element is selected, the second means is further configured to show friends who are most recently actively accessing content.

Example 25

The apparatus as recited in any one or more of the preceding examples, wherein each friend has a configurable level of privacy.

Example 26

The apparatus as recited in any one or more of the preceding examples, wherein the second means is further configured to provide for each content element an indication regarding the popularity of the respective content amongst friends for each content element shown.

Example 27

The apparatus as recited in any one or more of the preceding examples, wherein the second means is further configured to show for each content element a number of friends that watch the corresponding content element.

Example 28

The apparatus as recited in any one or more of the preceding examples, wherein responsive to detecting that the main viewer has selected a given element representing a given friend, the second means is configured to show a landing page created by the given friend.

Example 29

The apparatus as recited in any one or more of the preceding examples, wherein responsive to detecting that the main viewer has moved a focus onto a given friend, the second means is configured to show content elements representative of favorite content of the given friend.

Example 30

The apparatus as recited in any one or more of the preceding examples, wherein the second means is further configured to show an indication of a number of friends which are represented by the composite element.

Example 31

An apparatus comprising: a first means configured to receive video content; and a second means; wherein the second means is configured to: display and process video content and associated metadata; and process particular elements of the video content so as to identify the particular elements, wherein the particular elements are not identifiable via original metadata.

Example 32

The apparatus as recited in any one or more of the preceding examples, wherein the second means is further configured to identify a first portion of the video content and generate new metadata that identifies the first portion.

Example 33

The apparatus as recited in any one or more of the preceding examples, wherein the first portion is identified based on viewer activity.

Example 34

The apparatus as recited in any one or more of the preceding examples, wherein the first portion is identified as being replayed a plurality of times by one or more viewers.

Example 35

The apparatus as recited in any one or more of the preceding examples, wherein the second means is further configured to make the first portion available to other viewers.

Example 36

The apparatus as recited in any one or more of the preceding examples, wherein the first portion is identified based on activity of a plurality of viewers in addition to activity of the main viewer.

Example 37

The apparatus as recited in any one or more of the preceding examples, wherein the first means is further configured to upload the first portion to a content server.

Example 38

The apparatus as recited in any one or more of the preceding examples, wherein input is received from a viewer on a first device.

Example 39

The apparatus as recited in any one or more of the preceding examples, wherein the first device is configured to convey received input to the apparatus.

Example 40

The apparatus as recited in any one or more of the preceding examples, wherein the first device is a remote control.

Example 41

An apparatus comprising: a first means configured to receive video content; and a second means configured to show a sidebar on a display, and wherein the sidebar comprises a first category which includes content that a viewer has identified as being reserved for easy access.

Example 42

The apparatus as recited in any one or more of the preceding examples, wherein the first category includes a plurality of television shows identified by the viewer for inclusion as part of the first category, wherein the plurality of television shows are shown within a first subcategory of the first category.

Example 43

The apparatus as recited in any one or more of the preceding examples, wherein the first category includes a plurality of movies identified by the viewer for inclusion as part of the first category, wherein the plurality of movies are shown within a second subcategory of the first category.

Example 44

The apparatus as recited in any one or more of the preceding examples, wherein a plurality of subcategories are available under the first category, and wherein the second means is further configured to show corresponding content elements along side the sidebar responsive to detecting the viewer has focused on a given subcategory.

Example 45

The apparatus as recited in any one or more of the preceding examples, wherein the corresponding content elements extend beyond the bottom of the display, and wherein the second means is further configured to scroll down to view more content elements responsive to detecting the viewer has used a scroll gesture to move to the bottom of the display.

Example 46

The apparatus as recited in any one or more of the preceding examples, wherein recommended content elements are shown within a third subcategory of the first category.

Example 47

The apparatus as recited in any one or more of the preceding examples, wherein the second means is further configured to indicate if a recommended content element requires a subscription.

Example 48

The apparatus as recited in any one or more of the preceding examples, wherein responsive to detecting the viewer has selected to subscribe to a given content element, the first means is configured to initiate transactions between a primary provider and a secondary provider regarding a new subscription selected for purchase by the viewer without need for additional involvement on the part of the viewer.

Example 49

The apparatus as recited in any one or more of the preceding examples, wherein the second means is further configured to show content elements within the first category that are currently being broadcast in a given section of the display.

Example 50

The apparatus as recited in any one or more of the preceding examples, wherein the second means is further configured to cause the content elements in the given section to scroll right or left responsive to detecting a user gesture indicating a desire to scroll right or left within the given section.

Example 51

An apparatus comprising: a first means configured to receive video content; and a second means configured to generate a user interface on a display, wherein the user interface comprises a sidebar, wherein the sidebar comprises multiple elements that may be highlighted or selected by a viewer, and wherein the sidebar is overlaid on top of video content.

Example 52

The apparatus as recited in any one or more of the preceding examples, wherein the sidebar comprises a first category, wherein the second means is configured to receive voice input from the viewer responsive to detecting the first category has been selected using the second device.

Example 53

The apparatus as recited in any one or more of the preceding examples, wherein responsive to detecting the viewer has selected a given element from the sidebar using the second device, the second means is further configured to generate a plurality of related elements and to display a plurality of video content elements associated with the related elements, wherein the plurality of video content elements are shown simultaneously.

Example 54

The apparatus as recited in any one or more of the preceding examples, wherein the sidebar comprises a second category, and wherein the second means is further configured to show a plurality of elements defined by the viewer responsive to detecting the viewer has second category from the sidebar.

Example 55

The apparatus as recited in any one or more of the preceding examples, wherein the second means is further configured to stop displaying the sidebar responsive to detecting the viewer has dismissed the sidebar.

Example 56

The apparatus as recited in any one or more of the preceding examples, wherein the second means is further configured to stop displaying the sidebar responsive to detecting a timeout condition.

Example 57

The apparatus as recited in any one or more of the preceding examples, wherein the second means is further configured to zoom in on a given element to enlarge a depiction of the given element responsive to the viewer focusing on the given element.

Example 58

The apparatus as recited in any one or more of the preceding examples, wherein the second means is further configured to prevent content from being displayed which includes spoiler elements.

Example 59

The apparatus as recited in any one or more of the preceding examples, wherein the second means is further configured to prevent a current score or a winning team from being displayed for a given sports event prior to the viewer watching the given sports event.

Example 60

The apparatus as recited in any one or more of the preceding examples, wherein the second means is further configured to zoom out to increase a number of content elements depicted responsive to detecting the viewer has provided a scroll gesture indicating a desire to zoom out.

Example 61

An apparatus comprising: a first means configured to receive video content; a second means configured to show a program guide on a display, and wherein a watch-now indicator is shown for programs in future time slots which are currently available to be viewed prior to a future time in which they are scheduled to be broadcast.

Example 62

The apparatus as recited in any one or more of the preceding examples, wherein the second means is configured to allow a viewer to access programs from future time slots prior to the future time in which they are scheduled to be broadcast.

Example 63

The apparatus as recited in any one or more of the preceding examples, wherein the second means is configured to start playing a given program immediately ahead of a scheduled time slot for broadcast responsive to detecting the given program has been selected by the viewer using the second device.

Example 64

The apparatus as recited in any one or more of the preceding examples, wherein the second means is configured to show an indicator for programs for which a viewer does not have a valid subscription.

Example 65

The apparatus as recited in any one or more of the preceding examples, wherein the second means is configured to show a programming schedule of various networks, wherein the programming schedule by itself does not indicate the availability of the video content.

Example 66

The apparatus as recited in any one or more of the preceding examples, wherein the program guide is provided by a primary provider.

Example 67

The apparatus as recited in any one or more of the preceding examples, wherein the second means is configured to access a given program from the primary provider responsive to detecting the viewer has selected the given program.

Example 68

The apparatus as recited in any one or more of the preceding examples, wherein the given program is stored in a data store of the primary provider.

Example 69

The apparatus as recited in any one or more of the preceding examples, wherein the given program is stored in a data store of a secondary provider, and wherein the primary provider is configured to provide access to the data store of the secondary provider.

Example 70

The apparatus as recited in any one or more of the preceding examples, wherein the given program is available from a plurality of secondary providers.

This disclosure further includes subject matter directed to the following examples:

Example 1

A device comprising a display wherein the display is configured to show a user interface, wherein the user interface comprises a sidebar, and wherein the sidebar comprises a plurality of elements including a friends element, wherein when the friends element is selected, the user interface is configured to show other viewers who a main viewer has identified as friends.

Example 2

The device as recited in any one or more of the preceding examples, wherein when the friends element is selected, the user interface is further configured to show additional content which the other viewers have recommended.

Example 3

The device as recited in any one or more of the preceding examples, wherein when the friends element is selected, the user interface is further configured to show a composite element representative of all of the other viewers who the main viewer has identified as friends.

Example 4

The device as recited in any one or more of the preceding examples, wherein when the friends element is selected, the user interface is further configured to show friends who are most recently actively accessing content.

Example 5

The device as recited in any one or more of the preceding examples, wherein the device is configured to associate each friend with a configurable level of privacy.

Example 6

The device as recited in any one or more of the preceding examples, wherein the user interface is configured provide for each content element an indication regarding the popularity of the respective content amongst friends for each content element shown.

Example 7

The device as recited in any one or more of the preceding examples, wherein the user interface is configured to show for each content element a number of friends that watch the corresponding content element.

Example 8

The device as recited in any one or more of the preceding examples, wherein responsive to detecting that the main viewer has selected a given element representing a given friend, the user interface is configured to show a landing page created by the given friend.

Example 9

The device as recited in any one or more of the preceding examples, wherein responsive to detecting that the main viewer has moved a focus onto a given friend, the user interface is configured to show content elements representative of favorite content of the given friend.

Example 10

The device as recited in any one or more of the preceding examples, wherein the user interface is further configured to show an indication of a number of friends which are represented by the composite element.

Example 11

A system comprising: a first device comprising a display; and a second device; wherein the display is configured to show a user interface, wherein the user interface comprises a sidebar, and wherein the sidebar comprises a plurality of elements including a friends element, wherein when the friends element is selected by a main viewer using the second device, the user interface is configured to show other viewers who the main viewer has identified as friends.

Example 12

The system as recited in any one or more of the preceding examples, wherein when the friends element is selected, the user interface is further configured to show additional content which the other viewers have recommended.

Example 13

The system as recited in any one or more of the preceding examples, wherein when the friends element is selected, the user interface is further configured to show a composite element representative of all of the other viewers who the main viewer has identified as friends.

Example 14

The system as recited in any one or more of the preceding examples, wherein when the friends element is selected, the user interface is further configured to show friends who are most recently actively accessing content.

Example 15

The system as recited in any one or more of the preceding examples, wherein the first device is configured to associate each friend with a configurable level of privacy.

Example 16

The system as recited in any one or more of the preceding examples, wherein the user interface is configured provide for each content element an indication regarding the popularity of the respective content amongst friends for each content element shown.

Example 17

The system as recited in any one or more of the preceding examples, wherein the user interface is configured to show for each content element a number of friends that watch the corresponding content element.

Example 18

The system as recited in any one or more of the preceding examples, wherein responsive to detecting that the main viewer has selected a given element representing a given friend, the user interface is configured to show a landing page created by the given friend.

Example 19

The system as recited in any one or more of the preceding examples, wherein responsive to detecting that the main viewer has moved a focus onto a given friend, the user interface is configured to show content elements representative of favorite content of the given friend.

Example 20

The system as recited in any one or more of the preceding examples, wherein the user interface is further configured to show an indication of a number of friends which are represented by the composite element.

Example 21

A method comprising generating a user interface on a device, wherein the user interface comprises a sidebar, and wherein the sidebar comprises a plurality of elements including a friends element, wherein when the friends element is selected, the user interface is configured to show other viewers who a main viewer has identified as friends.

Example 22

The method as recited in any one or more of the preceding examples, wherein when the friends element is selected, the method further comprising showing additional content which the other viewers have recommended.

Example 23

The method as recited in any one or more of the preceding examples, wherein when the friends element is selected, the method further comprising showing a composite element representative of all of the other viewers who the main viewer has identified as friends.

Example 24

The method as recited in any one or more of the preceding examples, wherein when the friends element is selected, the method further comprising showing friends who are most recently actively accessing content.

Example 25

The method as recited in any one or more of the preceding examples, further comprising associating each friend with a configurable level of privacy.

Example 26

The method as recited in any one or more of the preceding examples, further comprising providing for each content element an indication regarding the popularity of the respective content amongst friends for each content element shown.

Example 27

The method as recited in any one or more of the preceding examples, further comprising showing for each content element a number of friends that watch the corresponding content element.

Example 28

The method as recited in any one or more of the preceding examples, wherein responsive to detecting that the main viewer has selected a given element representing a given friend, the user interface is configured to show a landing page created by the given friend.

Example 29

The method as recited in any one or more of the preceding examples, wherein responsive to detecting that the main viewer has moved a focus onto a given friend, the user interface is configured to show content elements representative of favorite content of the given friend.

Example 30

The method as recited in any one or more of the preceding examples, further comprising showing an indication of a number of friends which are represented by the composite element.

Example 31

A non-transitory computer readable storage medium comprising program instructions, wherein when executed by a processor the program instructions are executable to show a user interface, wherein the user interface comprises a sidebar, and wherein the sidebar comprises a plurality of elements including a friends element, wherein when the friends element is selected, the user interface is configured to show other viewers who a main viewer has identified as friends.

Example 32

The non-transitory computer readable storage medium as recited in any one or more of the preceding examples, wherein when the friends element is selected, the program instructions are further executable to show additional content which the other viewers have recommended.

Example 33

The non-transitory computer readable storage medium as recited in any one or more of the preceding examples, wherein when the friends element is selected, the program instructions are further executable to show a composite element representative of all of the other viewers who the main viewer has identified as friends.

Example 34

The non-transitory computer readable storage medium as recited in any one or more of the preceding examples, wherein when the friends element is selected, the program instructions are further executable to show friends who are most recently actively accessing content.

Example 35

The non-transitory computer readable storage medium as recited in any one or more of the preceding examples, wherein the program instructions are further executable to associate each friend with a configurable level of privacy.

Example 36

The non-transitory computer readable storage medium as recited in any one or more of the preceding examples, wherein the program instructions are further executable to provide for each content element an indication regarding the popularity of the respective content amongst friends for each content element shown.

Example 37

The non-transitory computer readable storage medium as recited in any one or more of the preceding examples, wherein the program instructions are further executable to show for each content element a number of friends that watch the corresponding content element.

Example 38

The non-transitory computer readable storage medium as recited in any one or more of the preceding examples, wherein responsive to detecting that the main viewer has selected a given element representing a given friend, the program instructions are further executable to show a landing page created by the given friend.

Example 39

The non-transitory computer readable storage medium as recited in any one or more of the preceding examples, wherein responsive to detecting that the main viewer has moved a focus onto a given friend, the program instructions are further executable to show content elements representative of favorite content of the given friend.

Example 40

The non-transitory computer readable storage medium as recited in any one or more of the preceding examples, wherein the program instructions are further executable to show an indication of a number of friends which are represented by the composite element.

This disclosure further includes subject matter directed to the following examples:

Example 1

A device configured to: display and process video content and associated metadata; and process particular elements of the video content so as to identify the particular elements, wherein the particular elements are not identifiable via original metadata.

Example 2

The device as recited in any one or more of the preceding examples, wherein the device is further configured to identify a first portion of the video content and generate new metadata that identifies the first portion.

Example 3

The device as recited in any one or more of the preceding examples, wherein the first portion is identified based on viewer activity.

Example 4

The device as recited in any one or more of the preceding examples, wherein the first portion is identified as being replayed a plurality of times by one or more viewers.

Example 5

The device as recited in any one or more of the preceding examples, wherein the device is further configured to make the first portion available to other viewers.

Example 6

The device as recited in any one or more of the preceding examples, wherein the first portion is identified based on activity of a plurality of viewers in addition to activity of the main viewer.

Example 7

The device as recited in any one or more of the preceding examples, wherein the device is further configured to upload the first portion to a content server.

Example 8

A system comprising: a first device; and a second device; wherein the first device is configured to: display and process video content and associated metadata; and process particular elements of the video content so as to identify the particular elements, wherein the particular elements are not identifiable via original metadata.

Example 9

The system as recited in any one or more of the preceding examples, wherein the first device is further configured to identify a first portion of the video content and generate new metadata that identifies the first portion.

Example 10

The system as recited in any one or more of the preceding examples, wherein the first portion is identified based on viewer activity.

Example 11

The system as recited in any one or more of the preceding examples, wherein the first portion is identified as being replayed a plurality of times by one or more viewers.

Example 12

The system as recited in any one or more of the preceding examples, wherein the first device is further configured to make the first portion available to other viewers.

Example 13

The system as recited in any one or more of the preceding examples, wherein the first portion is identified based on activity of a plurality of viewers in addition to activity of the main viewer.

Example 14

The system as recited in any one or more of the preceding examples, wherein the first device is further configured to upload the first portion to a content server.

Example 15

A method comprising: displaying and processing video content and associated metadata; and processing particular elements of the video content so as to identify the particular elements, wherein the particular elements are not identifiable via original metadata.

Example 16

The method as recited in any one or more of the preceding examples, further comprising identifying a first portion of the video content and generate new metadata that identifies the first portion.

Example 17

The method as recited in any one or more of the preceding examples, wherein the first portion is identified based on viewer activity.

Example 18

The method as recited in any one or more of the preceding examples, wherein the first portion is identified as being replayed a plurality of times by one or more viewers.

Example 19

The method as recited in any one or more of the preceding examples, further comprising making the first portion available to other viewers.

Example 20

The method as recited in any one or more of the preceding examples, wherein the first portion is identified based on activity of a plurality of viewers in addition to activity of the main viewer.

Example 21

The method as recited in any one or more of the preceding examples, further comprising uploading the first portion to a content server.

Example 22

A non-transitory computer readable storage medium comprising program instructions, wherein when executed by a processor the program instructions are executable to: display and process video content and associated metadata; and process particular elements of the video content so as to identify the particular elements, wherein the particular elements are not identifiable via original metadata.

Example 23

The non-transitory computer readable storage medium as recited in any one or more of the preceding examples, wherein the program instructions are further executable to identify a first portion of the video content and generate new metadata that identifies the first portion.

Example 24

The non-transitory computer readable storage medium as recited in any one or more of the preceding examples, wherein the first portion is identified based on viewer activity.

Example 25

The non-transitory computer readable storage medium as recited in any one or more of the preceding examples, wherein the first portion is identified as being replayed a plurality of times by one or more viewers.

Example 26

The non-transitory computer readable storage medium as recited in any one or more of the preceding examples, wherein the program instructions are further executable to make the first portion available to other viewers.

Example 27

The non-transitory computer readable storage medium as recited in any one or more of the preceding examples, wherein the first portion is identified based on activity of a plurality of viewers in addition to activity of the main viewer.

Example 28

The non-transitory computer readable storage medium as recited in any one or more of the preceding examples, wherein the program instructions are further executable to upload the first portion to a content server.

This disclosure further includes subject matter directed to the following examples:

Example 1

A device comprising a display, wherein the display is configured to show a sidebar, and wherein the sidebar comprises a first category which includes content that a viewer has identified as being reserved for easy access.

Example 2

The device as recited in any one or more of the preceding examples, wherein the first category includes a plurality of television shows identified by the viewer for inclusion as part of the first category, wherein the plurality of television shows are shown within a first subcategory of the first category.

Example 3

The device as recited in any one or more of the preceding examples, wherein the first category includes a plurality of movies identified by the viewer for inclusion as part of the first category, wherein the plurality of movies are shown within a second subcategory of the first category.

Example 4

The device as recited in any one or more of the preceding examples, wherein a plurality of subcategories are available under the first category, and wherein the display is configured to show corresponding content elements along side the sidebar responsive to detecting the viewer has focused on a given subcategory.

Example 5

The device as recited in any one or more of the preceding examples, wherein the corresponding content elements extend beyond the bottom of the display, and wherein the display is configured to scroll down to view more content elements responsive to detecting the viewer has used a scroll gesture to move to the bottom of the display.

Example 6

The device as recited in any one or more of the preceding examples, wherein recommended content elements are shown within a third subcategory of the first category.

Example 7

The device as recited in any one or more of the preceding examples, wherein the display is configured to indicate if a recommended content element requires a subscription.

Example 8

The device as recited in any one or more of the preceding examples, wherein responsive to detecting the viewer has selected to subscribe to a given content element, the device is configured to handle transactions between a primary provider and a secondary provider regarding a new subscription selected for purchase by the viewer without need for additional involvement on the part of the viewer.

Example 9

The device as recited in any one or more of the preceding examples, wherein the display is configured to show content elements within the first category that are currently being broadcast is shown in a given section of the display.

Example 10

The device as recited in any one or more of the preceding examples, wherein the display is configured to cause the content elements in the given section to scroll right or left responsive to detecting a user gesture indicating a desire to scroll right or left within the given section.

Example 11

A system comprising: a first device comprising a display; and a second device; wherein the display is configured to show a sidebar, and wherein the sidebar comprises a first category which includes content that a viewer has identified as being reserved for easy access.

Example 12

The system as recited in any one or more of the preceding examples, wherein the first category includes a plurality of television shows identified by the viewer for inclusion as part of the first category, wherein the plurality of television shows are shown within a first subcategory of the first category.

Example 13

The system as recited in any one or more of the preceding examples, wherein the first category includes a plurality of movies identified by the viewer for inclusion as part of the first category, wherein the plurality of movies are shown within a second subcategory of the first category.

Example 14

The system as recited in any one or more of the preceding examples, wherein a plurality of subcategories are available under the first category, and wherein the display is configured to show corresponding content elements along side the sidebar responsive to detecting the viewer has focused on a given subcategory.

Example 15

The system as recited in any one or more of the preceding examples, wherein the corresponding content elements extend beyond the bottom of the display, and wherein the display is configured to scroll down to view more content elements responsive to detecting the viewer has used a scroll gesture to move to the bottom of the display.

Example 16

The system as recited in any one or more of the preceding examples, wherein recommended content elements are shown within a third subcategory of the first category.

Example 17

The system as recited in any one or more of the preceding examples, wherein the display is configured to indicate if a recommended content element requires a subscription.

Example 18

The system as recited in any one or more of the preceding examples, wherein responsive to detecting the viewer has selected to subscribe to a given content element, the first device is configured to handle transactions between a primary provider and a secondary provider regarding a new subscription selected for purchase by the viewer without need for additional involvement on the part of the viewer.

Example 19

The system as recited in any one or more of the preceding examples, wherein the display is configured to show content elements within the first category that are currently being broadcast is shown in a given section of the display.

Example 20

The system as recited in any one or more of the preceding examples, wherein the display is configured to cause the content elements in the given section to scroll right or left responsive to detecting a user gesture indicating a desire to scroll right or left within the given section.

Example 21

A method comprising generating a sidebar on a display, wherein the sidebar comprises a first category which includes content that a viewer has identified as being reserved for easy access.

Example 22

The method as recited in any one or more of the preceding examples, wherein the first category includes a plurality of television shows identified by the viewer for inclusion as part of the first category, and wherein the plurality of television shows are shown within a first subcategory of the first category.

Example 23

The method as recited in any one or more of the preceding examples, wherein the first category includes a plurality of movies identified by the viewer for inclusion as part of the first category, and wherein the plurality of movies are shown within a second subcategory of the first category.

Example 24

The method as recited in any one or more of the preceding examples, wherein a plurality of subcategories are available under the first category, further comprising showing corresponding content elements along side the sidebar responsive to detecting the viewer has focused on a given subcategory.

Example 25

The method as recited in any one or more of the preceding examples, wherein the corresponding content elements extend beyond the bottom of the display, the method further comprising scrolling down to view more content elements responsive to detecting the viewer has used a scroll gesture to move to the bottom of the display.

Example 26

The method as recited in any one or more of the preceding examples, wherein recommended content elements are shown within a third subcategory of the first category.

Example 27

The method as recited in any one or more of the preceding examples, further comprising indicating if a recommended content element requires a subscription.

Example 28

The method as recited in any one or more of the preceding examples, wherein responsive to detecting the viewer has selected to subscribe to a given content element, the method further comprising handling transactions between a primary provider and a secondary provider regarding a new subscription selected for purchase by the viewer without need for additional involvement on the part of the viewer.

Example 29

The method as recited in any one or more of the preceding examples, further comprising showing content elements within the first category that are currently being broadcast is shown in a given section of the display.

Example 30

The method as recited in any one or more of the preceding examples, further comprising causing the content elements in the given section to scroll right or left responsive to detecting a user gesture indicating a desire to scroll right or left within the given section.

Example 31

A non-transitory computer readable storage medium comprising program instructions, wherein when executed by a processor the program instructions are executable to generating a sidebar on a display, wherein the sidebar comprises a first category which includes content that a viewer has identified as being reserved for easy access.

Example 32

The non-transitory computer readable storage medium as recited in any one or more of the preceding examples, wherein the first category includes a plurality of television shows identified by the viewer for inclusion as part of the first category, and wherein the plurality of television shows are shown within a first subcategory of the first category.

Example 33

The non-transitory computer readable storage medium as recited in any one or more of the preceding examples, wherein the first category includes a plurality of movies identified by the viewer for inclusion as part of the first category, and wherein the plurality of movies are shown within a second subcategory of the first category.

Example 34

The non-transitory computer readable storage medium as recited in any one or more of the preceding examples, wherein a plurality of subcategories are available under the first category, wherein the program instructions are further executable to show corresponding content elements along side the sidebar responsive to detecting the viewer has focused on a given subcategory.

Example 35

The non-transitory computer readable storage medium as recited in any one or more of the preceding examples, wherein the corresponding content elements extend beyond the bottom of the display, and wherein the program instructions are further executable to scroll down to view more content elements responsive to detecting the viewer has used a scroll gesture to move to the bottom of the display.

Example 36

The non-transitory computer readable storage medium as recited in any one or more of the preceding examples, wherein recommended content elements are shown within a third subcategory of the first category.

Example 37

The non-transitory computer readable storage medium as recited in any one or more of the preceding examples, wherein the program instructions are further executable to indicate if a recommended content element requires a subscription.

Example 38

The non-transitory computer readable storage medium as recited in any one or more of the preceding examples, wherein responsive to detecting the viewer has selected to subscribe to a given content element, and wherein the program instructions are further executable to handle transactions between a primary provider and a secondary provider regarding a new subscription selected for purchase by the viewer without need for additional involvement on the part of the viewer.

Example 39

The non-transitory computer readable storage medium as recited in any one or more of the preceding examples, wherein the program instructions are further executable to show content elements within the first category that are currently being broadcast is shown in a given section of the display.

Example 40

The non-transitory computer readable storage medium as recited in any one or more of the preceding examples, wherein the program instructions are further executable to cause the content elements in the given section to scroll right or left responsive to detecting a user gesture indicating a desire to scroll right or left within the given section.

This disclosure further includes subject matter directed to the following examples:

Example 1

A system comprising: a server farm; and a display, wherein the display is coupled to the server farm; wherein the display is configured to generate a user interface, wherein the user interface shows content in a first layout, wherein the first layout comprises a sidebar, and wherein the sidebar includes a plurality of categories of video content.

Example 2

The system as recited in any one or more of the preceding examples, wherein available content is filtered and shown on the display responsive to detecting a given category has been selected in the sidebar.

Example 3

The system as recited in any one or more of the preceding examples, wherein a landing page corresponding to a given element is shown responsive to detecting the given element has been selected from the available content.

Example 4

The system as recited in any one or more of the preceding examples, wherein the given element is a television show, and wherein the landing page provides access to multiple shows and multiple seasons of the television show.

Example 5

The system as recited in any one or more of the preceding examples, wherein the landing page provides access to additional content representing selected portions of larger video content, where the selected portions have been identified through crowdsourcing.

Example 6

The system as recited in any one or more of the preceding examples, wherein the given element is a given sports team, and wherein the landing page provides access to multiple games for the given sports team.

Example 7

The system as recited in any one or more of the preceding examples, wherein the sidebar includes a collection category specific to a given viewer.

Example 8

The system as recited in any one or more of the preceding examples, wherein video content within the collection category may be shown responsive to detecting the collection category has been selected.

Example 9

The system as recited in any one or more of the preceding examples, wherein one or more of the categories within the sidebar includes a plurality of subcategories.

Example 10

The system as recited in any one or more of the preceding examples, wherein available content is filtered and shown on the display responsive to detecting a given subcategory has been selected.

Example 11

The system as recited in any one or more of the preceding examples, wherein the server farm is configured to store and serve video content to a plurality of subscribers.

Example 12

The system as recited in any one or more of the preceding examples, wherein content which is presented on the display includes live broadcast video for multiple channels on multiple television networks.

Example 13

The system as recited in any one or more of the preceding examples, wherein content which is presented on the display is selectable to cause display of further information related to a given selected element.

Example 14

The system as recited in any one or more of the preceding examples, wherein the sidebar is generated as an overlay on video content underneath.

Example 15

The system as recited in any one or more of the preceding examples, further comprising a set-top box, and wherein the set-top box is configured to generate the sidebar.

Example 16

The system as recited in any one or more of the preceding examples, wherein the display comprises a set-top box, and wherein the set-top box is configured to generate the sidebar.

Example 17

The system as recited in any one or more of the preceding examples, wherein the sidebar is shown as a vertical bar on a left side of the display.

Example 18

The system as recited in any one or more of the preceding examples, wherein the sidebar is shown as a horizontal bar in a central location within the display.

Example 19

The system as recited in any one or more of the preceding examples, wherein the display is a television.

Example 20

The system as recited in any one or more of the preceding examples, wherein the television comprises a set-top box.

Example 21

A method comprising: generating a user interface on a display, wherein the user interface shows content in a first layout, wherein the first layout comprises a sidebar, and wherein the sidebar includes a plurality of categories of video content.

Example 22

The method as recited in any one or more of the preceding examples, wherein available content is filtered and shown on the display responsive to detecting a given category has been selected in the sidebar.

Example 23

The method as recited in any one or more of the preceding examples, wherein a landing page corresponding to a given element is shown responsive to detecting the given element has been selected from the available content.

Example 24

The method as recited in any one or more of the preceding examples, wherein the given element is a television show, and wherein the landing page provides access to multiple shows and multiple seasons of the television show.

Example 25

The method as recited in any one or more of the preceding examples, wherein the landing page provides access to additional content representing selected portions of larger video content, where the selected portions have been identified through crowdsourcing.

Example 26

The method as recited in any one or more of the preceding examples, wherein the given element is a given sports team, and wherein the landing page provides access to multiple games for the given sports team.

Example 27

The method as recited in any one or more of the preceding examples, wherein the sidebar includes a collection category specific to a given viewer.

Example 28

The method as recited in any one or more of the preceding examples, wherein video content within the collection category may be shown responsive to detecting the collection category has been selected.

Example 29

The method as recited in any one or more of the preceding examples, wherein one or more of the categories within the sidebar includes a plurality of subcategories.

Example 30

The method as recited in any one or more of the preceding examples, wherein available content is filtered and shown on the display responsive to detecting a given subcategory has been selected.

Example 31

The method as recited in any one or more of the preceding examples, wherein the server farm is configured to store and serve video content to a plurality of subscribers.

Example 32

The method as recited in any one or more of the preceding examples, wherein content which is presented on the display includes live broadcast video for multiple channels on multiple television networks.

Example 33

The method as recited in any one or more of the preceding examples, wherein content which is presented on the display is selectable to cause display of further information related to a given selected element.

Example 34

The method as recited in any one or more of the preceding examples, wherein the sidebar is generated as an overlay on video content underneath.

Example 35

The method as recited in any one or more of the preceding examples, further comprising generating the sidebar with a set-top box.

Example 36

The method as recited in any one or more of the preceding examples, wherein the display comprises a set-top box, further comprising generating the sidebar with the set-top box.

Example 37

The method as recited in any one or more of the preceding examples, wherein the sidebar is shown as a vertical bar on a left side of the display.

Example 38

The method as recited in any one or more of the preceding examples, wherein the sidebar is shown as a horizontal bar in a central location within the display.

Example 39

The method as recited in any one or more of the preceding examples, wherein the display is a television.

Example 40

The method as recited in any one or more of the preceding examples, wherein the television comprises a set-top box.

Example 41

A device comprising a display, wherein the display is coupled to a server farm, wherein the display is configured to generate a user interface, wherein the user interface shows content in a first layout, wherein the first layout comprises a sidebar, and wherein the sidebar includes a plurality of categories of video content.

Example 42

The device as recited in any one or more of the preceding examples, wherein available content is filtered and shown on the display responsive to detecting a given category has been selected in the sidebar.

Example 43

The device as recited in any one or more of the preceding examples, wherein a landing page corresponding to a given element is shown responsive to detecting the given element has been selected from the available content.

Example 44

The device as recited in any one or more of the preceding examples, wherein the given element is a television show, and wherein the landing page provides access to multiple shows and multiple seasons of the television show.

Example 45

The device as recited in any one or more of the preceding examples, wherein the landing page provides access to additional content representing selected portions of larger video content, where the selected portions have been identified through crowdsourcing.

Example 46

The device as recited in any one or more of the preceding examples, wherein the given element is a given sports team, and wherein the landing page provides access to multiple games for the given sports team.

Example 47

The device as recited in any one or more of the preceding examples, wherein the sidebar includes a collection category specific to a given viewer.

Example 48

The device as recited in any one or more of the preceding examples, wherein video content within the collection category may be shown responsive to detecting the collection category has been selected.

Example 49

The device as recited in any one or more of the preceding examples, wherein one or more of the categories within the sidebar includes a plurality of subcategories.

Example 50

The device as recited in any one or more of the preceding examples, wherein available content is filtered and shown on the display responsive to detecting a given subcategory has been selected.

Example 51

The device as recited in any one or more of the preceding examples, wherein the server farm is configured to store and serve video content to a plurality of subscribers.

Example 52

The device as recited in any one or more of the preceding examples, wherein content which is presented on the display includes live broadcast video for multiple channels on multiple television networks.

Example 53

The device as recited in any one or more of the preceding examples, wherein content which is presented on the display is selectable to cause display of further information related to a given selected element.

Example 54

The device as recited in any one or more of the preceding examples, wherein the sidebar is generated as an overlay on video content underneath.

Example 55

The device as recited in any one or more of the preceding examples, further comprising a set-top box, and wherein the set-top box is configured to generate the sidebar.

Example 56

The device as recited in any one or more of the preceding examples, wherein the display comprises a set-top box, and wherein the set-top box is configured to generate the sidebar.

Example 57

The device as recited in any one or more of the preceding examples, wherein the sidebar is shown as a vertical bar on a left side of the display.

Example 58

The device as recited in any one or more of the preceding examples, wherein the sidebar is shown as a horizontal bar in a central location within the display.

Example 59

The device as recited in any one or more of the preceding examples, wherein the display is a television.

Example 60

The device as recited in any one or more of the preceding examples, wherein the television comprises a set-top box.

Example 61

A non-transitory computer readable storage medium comprising program instructions, wherein when executed the program instructions are operable to: generate a user interface on a display, wherein the user interface shows content in a first layout, wherein the first layout comprises a sidebar, and wherein the sidebar includes a plurality of categories of video content.

Example 62

The non-transitory computer readable storage medium as recited in any one or more of the preceding examples, wherein available content is filtered and shown on the display responsive to detecting a given category has been selected in the sidebar.

Example 63

The non-transitory computer readable storage medium as recited in any one or more of the preceding examples, wherein a landing page corresponding to a given element is shown responsive to detecting the given element has been selected from the available content.

Example 64

The non-transitory computer readable storage medium as recited in any one or more of the preceding examples, wherein the given element is a television show, and wherein the landing page provides access to multiple shows and multiple seasons of the television show.

Example 65

The non-transitory computer readable storage medium as recited in any one or more of the preceding examples, wherein the landing page provides access to additional content representing selected portions of larger video content, where the selected portions have been identified through crowdsourcing.

Example 66

The non-transitory computer readable storage medium as recited in any one or more of the preceding examples, wherein the given element is a given sports team, and wherein the landing page provides access to multiple games for the given sports team.

Example 67

The non-transitory computer readable storage medium as recited in any one or more of the preceding examples, wherein the sidebar includes a collection category specific to a given viewer.

Example 68

The non-transitory computer readable storage medium as recited in any one or more of the preceding examples, wherein video content within the collection category may be shown responsive to detecting the collection category has been selected.

Example 69

The non-transitory computer readable storage medium as recited in any one or more of the preceding examples, wherein one or more of the categories within the sidebar includes a plurality of subcategories.

Example 70

The non-transitory computer readable storage medium as recited in any one or more of the preceding examples, wherein available content is filtered and shown on the display responsive to detecting a given subcategory has been selected.

Example 71

The non-transitory computer readable storage medium as recited in any one or more of the preceding examples, wherein the server farm is configured to store and serve video content to a plurality of subscribers.

Example 72

The non-transitory computer readable storage medium as recited in any one or more of the preceding examples, wherein content which is presented on the display includes live broadcast video for multiple channels on multiple television networks.

Example 73

The non-transitory computer readable storage medium as recited in any one or more of the preceding examples, wherein content which is presented on the display is selectable to cause display of further information related to a given selected element.

Example 74

The non-transitory computer readable storage medium as recited in any one or more of the preceding examples, wherein the sidebar is generated as an overlay on video content underneath.

Example 75

The non-transitory computer readable storage medium as recited in any one or more of the preceding examples, further comprising generating the sidebar with a set-top box.

Example 76

The non-transitory computer readable storage medium as recited in any one or more of the preceding examples, wherein the display comprises a set-top box, further comprising generating the sidebar with the set-top box.

Example 77

The non-transitory computer readable storage medium as recited in any one or more of the preceding examples, wherein the sidebar is shown as a vertical bar on a left side of the display.

Example 78

The non-transitory computer readable storage medium as recited in any one or more of the preceding examples, wherein the sidebar is shown as a horizontal bar in a central location within the display.

Example 79

The non-transitory computer readable storage medium as recited in any one or more of the preceding examples, wherein the display is a television.

Example 80

The non-transitory computer readable storage medium as recited in any one or more of the preceding examples, wherein the television comprises a set-top box.

This disclosure further includes subject matter directed to the following examples:

Example 1

A method comprising generating a side bar to be displayed with video content, wherein the side bar comprises a plurality of elements, wherein each element can be selected by a viewer.

Example 2

The method as recited in any one or more of the preceding examples, wherein the side bar is overlaid on top of a portion of the video content.

Example 3

The method as recited in any one or more of the preceding examples, wherein the side bar is integrated into the video content.

Example 4

The method as recited in any one or more of the preceding examples, wherein a first element of the plurality of elements provides recommendations based on other video content watched by the viewer.

Example 5

The method as recited in any one or more of the preceding examples, wherein a second element of the plurality of elements allows the viewer to provide a voice input.

Example 6

The method as recited in any one or more of the preceding examples, wherein a third element of the plurality of elements corresponds to content that the viewer has indicated is their favorite content.

Example 7

The method as recited in any one or more of the preceding examples, further comprising generating a plurality of content elements for display in a main portion of a display responsive to detecting the viewer has selected the third element within the side bar, wherein the plurality of content elements represent content that the viewer has indicated is their favorite content.

Example 8

The method as recited in any one or more of the preceding examples, wherein each content element of the plurality of content elements can be selected by a viewer via a remote control device.

Example 9

The method as recited in any one or more of the preceding examples, wherein the plurality of content elements are overlaid on the video content.

Example 10

The method as recited in any one or more of the preceding examples, wherein each content element of the plurality of content elements is generated as a miniature display with an aspect ratio that corresponds to a typical television.

Example 11

A computer readable storage medium comprising program instructions, wherein when executed by a processor the program instructions are executable to generate a side bar to be displayed with video content, wherein the side bar comprises a plurality of elements, wherein each element can be selected by a viewer.

Example 12

The computer readable storage medium as recited in any one or more of the preceding examples, wherein the side bar is overlaid on top of a portion of the video content.

Example 13

The computer readable storage medium as recited in any one or more of the preceding examples, wherein the side bar is integrated into the video content.

Example 14

The computer readable storage medium as recited in any one or more of the preceding examples, wherein a first element of the plurality of elements provides recommendations based on other video content watched by the viewer.

Example 15

The computer readable storage medium as recited in any one or more of the preceding examples, wherein a second element of the plurality of elements allows the viewer to provide a voice input.

Example 16

The computer readable storage medium as recited in any one or more of the preceding examples, wherein a third element of the plurality of elements corresponds to content that the viewer has indicated is their favorite content.

Example 17

The computer readable storage medium as recited in any one or more of the preceding examples, wherein when executed by a processor the program instructions are further executable to generate a plurality of content elements for display in a main portion of a display responsive to detecting the viewer has selected the third element within the side bar, wherein the plurality of content elements represent content that the viewer has indicated is their favorite content.

Example 18

The computer readable storage medium as recited in any one or more of the preceding examples, wherein each content element of the plurality of content elements can be selected by a viewer via a remote control device.

Example 19

The computer readable storage medium as recited in any one or more of the preceding examples, wherein the plurality of content elements are overlaid on the video content.

Example 20

The computer readable storage medium as recited in any one or more of the preceding examples, wherein each content element of the plurality of content elements is generated as a miniature display with an aspect ratio that corresponds to a typical television.

Example 21

An apparatus comprising: an interface configured to receive video content; and circuitry configured to generate a side bar to be displayed with video content, wherein the side bar comprises a plurality of elements, wherein each element can be selected by a viewer.

Example 22

The apparatus as recited in any one or more of the preceding examples, wherein the side bar is overlaid on top of a portion of the video content.

Example 23

The apparatus as recited in any one or more of the preceding examples, wherein the side bar is integrated into the video content.

Example 24

The apparatus as recited in any one or more of the preceding examples, wherein a first element of the plurality of elements provides recommendations based on other video content watched by the viewer.

Example 25

The apparatus as recited in any one or more of the preceding examples, wherein a second element of the plurality of elements allows the viewer to provide a voice input.

Example 26

The apparatus as recited in any one or more of the preceding examples, wherein a third element of the plurality of elements corresponds to content that the viewer has indicated is their favorite content.

Example 27

The apparatus as recited in any one or more of the preceding examples, wherein the circuitry is further configured to generate a plurality of content elements for display in a main portion of a display responsive to detecting the viewer has selected the third element within the side bar, wherein the plurality of content elements represent content that the viewer has indicated is their favorite content.

Example 28

The apparatus as recited in any one or more of the preceding examples, wherein each content element of the plurality of content elements can be selected by a viewer via a remote control device.

Example 29

The apparatus as recited in any one or more of the preceding examples, wherein the plurality of content elements are overlaid on the video content.

Example 30

The apparatus as recited in any one or more of the preceding examples, wherein each content element of the plurality of content elements is generated as a miniature display with an aspect ratio that corresponds to a typical television.

Example 31

An apparatus comprising: a first means configured to receive video content; and a second means configured to generate a side bar to be displayed with video content, wherein the side bar comprises a plurality of elements, wherein each element can be selected by a viewer.

Example 32

The apparatus as recited in any one or more of the preceding examples, wherein the side bar is overlaid on top of a portion of the video content.

Example 33

The apparatus as recited in any one or more of the preceding examples, wherein the side bar is integrated into the video content.

Example 34

The apparatus as recited in any one or more of the preceding examples, wherein a first element of the plurality of elements provides recommendations based on other video content watched by the viewer.

Example 35

The apparatus as recited in any one or more of the preceding examples, wherein a second element of the plurality of elements allows the viewer to provide a voice input.

Example 36

The apparatus as recited in any one or more of the preceding examples, wherein a third element of the plurality of elements corresponds to content that the viewer has indicated is their favorite content.

Example 37

The apparatus as recited in any one or more of the preceding examples, wherein the second means is further configured to generate a plurality of content elements for display in a main portion of a display responsive to detecting the viewer has selected the third element within the side bar, wherein the plurality of content elements represent content that the viewer has indicated is their favorite content.

Example 38

The apparatus as recited in any one or more of the preceding examples, wherein each content element of the plurality of content elements can be selected by a viewer via a remote control device.

Example 39

The apparatus as recited in any one or more of the preceding examples, wherein the plurality of content elements are overlaid on the video content.

Example 40

The apparatus as recited in any one or more of the preceding examples, wherein each content element of the plurality of content elements is generated as a miniature display with an aspect ratio that corresponds to a typical television.

This disclosure further includes subject matter directed to the following examples:

Example 1

A method comprising: generating a user interface comprising a side bar in a first portion of the user interface; generating a channel guide in a second portion of the user interface responsive to detecting a viewer has selected a channel guide category in the side bar; and
conveying the user interface to a display.

Example 2

The method as recited in any one or more of the preceding examples, wherein the channel guide displays information regarding available channels, and wherein the channel guide includes a scrubber bar showing a current progress in a current time bar for the available channels.

Example 3

The method as recited in any one or more of the preceding examples, further comprising sending a request for a given show to a primary provider responsive to detecting the viewer has selected the given show from the channel guide.

Example 4

The method as recited in any one or more of the preceding examples, wherein the given show is shown in a future time slot within the channel guide.

Example 5

The method as recited in any one or more of the preceding examples, wherein the given show is shown with a watch now indicator in the channel guide, wherein the watch now indicator indicates the given show is available to watch immediately.

Example 6

The method as recited in any one or more of the preceding examples, further comprising sending a request to subscribe to a given show to a primary provider responsive to detecting the viewer has selected the given show from the channel guide, wherein the given show has a subscribe indicator displayed in the channel guide.

Example 7

The method as recited in any one or more of the preceding examples, further comprising receiving information from the primary provider regarding one or more options for the viewer to subscribe to the given show.

Example 8

The method as recited in any one or more of the preceding examples, further comprising generating one or more options within the user interface for the viewer to subscribe to the given show.

Example 9

The method as recited in any one or more of the preceding examples, wherein the user interface is automatically shown on the display responsive to a viewer turning on the display.

Example 10

The method as recited in any one or more of the preceding examples, wherein the display is a television.

Example 11

A computer readable storage medium comprising program instructions, wherein when executed the program instructions are operable to: generate a user interface comprising a side bar in a first portion of the user interface; generate a channel guide in a second portion of the user interface responsive to detecting a viewer has selected a channel guide category in the side bar; and convey the user interface to a display.

Example 12

The computer readable storage medium as recited in any one or more of the preceding examples, wherein the channel guide displays information regarding available channels, and wherein the channel guide includes a scrubber bar showing a current progress in a current time bar for the available channels.

Example 13

The computer readable storage medium as recited in any one or more of the preceding examples, wherein when executed the program instructions are further operable to send a request for a given show to a primary provider responsive to detecting the viewer has selected the given show from the channel guide.

Example 14

The computer readable storage medium as recited in any one or more of the preceding examples, wherein the given show is shown in a future time slot within the channel guide.

Example 15

The computer readable storage medium as recited in any one or more of the preceding examples, wherein the given show is shown with a watch now indicator in the channel guide, wherein the watch now indicator indicates the given show is available to watch immediately.

Example 16

The computer readable storage medium as recited in any one or more of the preceding examples, wherein when executed the program instructions are further operable to send a request to subscribe to a given show to a primary provider responsive to detecting the viewer has selected the given show from the channel guide, wherein the given show has a subscribe indicator displayed in the channel guide.

Example 17

The computer readable storage medium as recited in any one or more of the preceding examples, wherein when executed the program instructions are further operable to receive information from the primary provider regarding one or more options for the viewer to subscribe to the given show.

Example 18

The computer readable storage medium as recited in any one or more of the preceding examples, wherein when executed the program instructions are further operable to generate one or more options within the user interface for the viewer to subscribe to the given show.

Example 19

The computer readable storage medium as recited in any one or more of the preceding examples, wherein the user interface is automatically shown on the display responsive to a viewer turning on the display.

Example 20

The computer readable storage medium as recited in any one or more of the preceding examples, wherein the display is a television.

Example 21

An apparatus comprising: an interface configured to receive video content; and circuitry configured to: generate a user interface comprising a side bar in a first portion of the user interface; generate a channel guide in a second portion of the user interface responsive to detecting a viewer has selected a channel guide category in the side bar; and convey the user interface to a display.

Example 22

The apparatus as recited in any one or more of the preceding examples, wherein the channel guide displays information regarding available channels, and wherein the channel guide includes a scrubber bar showing a current progress in a current time bar for the available channels.

Example 23

The apparatus as recited in any one or more of the preceding examples, wherein the circuitry is further configured to send a request for a given show to a primary provider responsive to detecting the viewer has selected the given show from the channel guide.

Example 24

The apparatus as recited in any one or more of the preceding examples, wherein the given show is shown in a future time slot within the channel guide.

Example 25

The apparatus as recited in any one or more of the preceding examples, wherein the given show is shown with a watch now indicator in the channel guide, wherein the watch now indicator indicates the given show is available to watch immediately.

Example 26

The apparatus as recited in any one or more of the preceding examples, wherein the circuitry is further configured to send a request to subscribe to a given show to a primary provider responsive to detecting the viewer has selected the given show from the channel guide, wherein the given show has a subscribe indicator displayed in the channel guide.

Example 27

The apparatus as recited in any one or more of the preceding examples, wherein the circuitry is further configured to receive information from the primary provider regarding one or more options for the viewer to subscribe to the given show.

Example 28

The apparatus as recited in any one or more of the preceding examples, wherein the circuitry is further configured to generate one or more options within the user interface for the viewer to subscribe to the given show.

Example 29

The apparatus as recited in any one or more of the preceding examples, wherein the user interface is automatically shown on the display responsive to a viewer turning on the display.

Example 30

The apparatus as recited in any one or more of the preceding examples, wherein the display is a television.

Example 31

An apparatus comprising: a first means configured to receive video content; and a second means configured to: generate a user interface comprising a side bar in a first portion of the user interface; generate a channel guide in a second portion of the user interface responsive to detecting a viewer has selected a channel guide category in the side bar; and convey the user interface to a display.

Example 32

The apparatus as recited in any one or more of the preceding examples, wherein the channel guide displays information regarding available channels, and wherein the channel guide includes a scrubber bar showing a current progress in a current time bar for the available channels.

Example 33

The apparatus as recited in any one or more of the preceding examples, wherein the second means is further configured to send a request for a given show to a primary provider responsive to detecting the viewer has selected the given show from the channel guide.

Example 34

The apparatus as recited in any one or more of the preceding examples, wherein the given show is shown in a future time slot within the channel guide.

Example 35

The apparatus as recited in any one or more of the preceding examples, wherein the given show is shown with a watch now indicator in the channel guide, wherein the watch now indicator indicates the given show is available to watch immediately.

Example 36

The apparatus as recited in any one or more of the preceding examples, wherein the second means is further configured to send a request to subscribe to a given show to a primary provider responsive to detecting the viewer has selected the given show from the channel guide, wherein the given show has a subscribe indicator displayed in the channel guide.

Example 37

The apparatus as recited in any one or more of the preceding examples, wherein the second means is further configured to receive information from the primary provider regarding one or more options for the viewer to subscribe to the given show.

Example 38

The apparatus as recited in any one or more of the preceding examples, wherein the second means is further configured to generate one or more options within the user interface for the viewer to subscribe to the given show.

Example 39

The apparatus as recited in any one or more of the preceding examples, wherein the user interface is automatically shown on the display responsive to a viewer turning on the display.

Example 40

The apparatus as recited in any one or more of the preceding examples, wherein the display is a television.

This disclosure further includes subject matter directed to the following examples:

Example 1

A method comprising: generating a user interface comprising a side bar; and
conveying the user interface to a display.

Example 2

The method as recited in any one or more of the preceding examples, wherein the side bar comprises a plurality of elements representing a plurality of categories, wherein the method further comprising generating a plurality of corresponding content elements responsive to detecting a viewer has selecting a given element from the side bar.

Example 3

The method as recited in any one or more of the preceding examples, wherein each content element of the plurality of corresponding content elements comprises corresponding video content and a description of the respective content element.

Example 4

The method as recited in any one or more of the preceding examples, wherein each content element is a television series, and wherein the description comprises an identification of the television series and an episode number of a television show.

Example 5

The method as recited in any one or more of the preceding examples, wherein the description comprises an indication of a number of available shows for the telephone series.

Example 6

The method as recited in any one or more of the preceding examples, wherein the corresponding video content does not include spoiler content.

Example 7

The method as recited in any one or more of the preceding examples, wherein a first element in the side bar represents favorite video content of the viewer.

Example 8

The method as recited in any one or more of the preceding examples, wherein a number of corresponding content elements generated is configurable by the viewer.

Example 9

The method as recited in any one or more of the preceding examples, wherein the number of corresponding content elements generated is increased responsive to detecting a zoom out gesture by the viewer.

Example 10

The method as recited in any one or more of the preceding examples, wherein the number of corresponding content elements generated is decreased responsive to detecting a zoom in gesture by the viewer.

Example 11

A computer readable storage medium comprising program instructions, wherein when executed the program instructions are operable to: generate a user interface comprising a side bar; and convey the user interface to a display.

Example 12

The computer readable storage medium as recited in any one or more of the preceding examples, wherein the side bar comprises a plurality of elements representing a plurality of categories, wherein when executed the program instructions are further operable to generate a plurality of corresponding content elements responsive to detecting a viewer has selecting a given element from the side bar.

Example 13

The computer readable storage medium as recited in any one or more of the preceding examples, wherein each content element of the plurality of corresponding content elements comprises corresponding video content and a description of the respective content element.

Example 14

The computer readable storage medium as recited in any one or more of the preceding examples, wherein each content element is a television series, and wherein the description comprises an identification of the television series and an episode number of a television show.

Example 15

The computer readable storage medium as recited in any one or more of the preceding examples, wherein the description comprises an indication of a number of available shows for the telephone series.

Example 16

The computer readable storage medium as recited in any one or more of the preceding examples, wherein the corresponding video content does not include spoiler content.

Example 17

The computer readable storage medium as recited in any one or more of the preceding examples, wherein a first element in the side bar represents favorite video content of the viewer.

Example 18

The computer readable storage medium as recited in any one or more of the preceding examples, wherein a number of corresponding content elements generated is configurable by the viewer.

Example 19

The computer readable storage medium as recited in any one or more of the preceding examples, wherein the number of corresponding content elements generated is increased responsive to detecting a zoom out gesture by the viewer.

Example 20

The computer readable storage medium as recited in any one or more of the preceding examples, wherein the number of corresponding content elements generated is decreased responsive to detecting a zoom in gesture by the viewer.

Example 21

An apparatus comprising: an interface configured to receive video content; and circuitry configured to: generate a user interface comprising a side bar; and convey the user interface to a display.

Example 22

The apparatus as recited in any one or more of the preceding examples, wherein the side bar comprises a plurality of elements representing a plurality of categories, wherein the circuitry is further configured to generate a plurality of corresponding content elements responsive to detecting a viewer has selecting a given element from the side bar.

Example 23

The apparatus as recited in any one or more of the preceding examples, wherein each content element of the plurality of corresponding content elements comprises corresponding video content and a description of the respective content element.

Example 24

The apparatus as recited in any one or more of the preceding examples, wherein each content element is a television series, and wherein the description comprises an identification of the television series and an episode number of a television show.

Example 25

The apparatus as recited in any one or more of the preceding examples, wherein the description comprises an indication of a number of available shows for the telephone series.

Example 26

The apparatus as recited in any one or more of the preceding examples, wherein the corresponding video content does not include spoiler content.

Example 27

The apparatus as recited in any one or more of the preceding examples, wherein a first element in the side bar represents favorite video content of the viewer.

Example 28

The apparatus as recited in any one or more of the preceding examples, wherein a number of corresponding content elements generated is configurable by the viewer.

Example 29

The apparatus as recited in any one or more of the preceding examples, wherein the number of corresponding content elements generated is increased responsive to detecting a zoom out gesture by the viewer.

Example 30

The apparatus as recited in any one or more of the preceding examples, wherein the number of corresponding content elements generated is decreased responsive to detecting a zoom in gesture by the viewer.

Example 31

An apparatus comprising: a first means configured to receive video content; and a second means configured to: generate a user interface comprising a side bar; and
   convey the user interface to a display.

Example 32

The apparatus as recited in any one or more of the preceding examples, wherein the side bar comprises a plurality of elements representing a plurality of categories, wherein the second means is further configured to generate a plurality of corresponding content elements responsive to detecting a viewer has selecting a given element from the side bar.

Example 33

The apparatus as recited in any one or more of the preceding examples, wherein each content element of the plurality of corresponding content elements comprises corresponding video content and a description of the respective content element.

Example 34

The apparatus as recited in any one or more of the preceding examples, wherein each content element is a television series, and wherein the description comprises an identification of the television series and an episode number of a television show.

Example 35

The apparatus as recited in any one or more of the preceding examples, wherein the description comprises an indication of a number of available shows for the telephone series.

Example 36

The apparatus as recited in any one or more of the preceding examples, wherein the corresponding video content does not include spoiler content.

Example 37

The apparatus as recited in any one or more of the preceding examples, wherein a first element in the side bar represents favorite video content of the viewer.

Example 38

The apparatus as recited in any one or more of the preceding examples, wherein a number of corresponding content elements generated is configurable by the viewer.

Example 39

The apparatus as recited in any one or more of the preceding examples, wherein the number of corresponding content elements generated is increased responsive to detecting a zoom out gesture by the viewer.

Example 40

The apparatus as recited in any one or more of the preceding examples, wherein the number of corresponding content elements generated is decreased responsive to detecting a zoom in gesture by the viewer.

This disclosure further includes subject matter directed to the following examples:

Example 1

A method comprising: generating a user interface, wherein the user interface comprises a side bar in a first portion of the user interface, wherein the side bar comprising a plurality of elements, and wherein a first element is a friend element to show information regarding other viewers who a viewer has identified as friends; and conveying the user interface to a display.

Example 2

The method as recited in any one or more of the preceding examples, further comprising generating a plurality of elements in a second portion of the user interface responsive to detecting the viewer has selected the friend element within the side bar.

Example 3

The method as recited in any one or more of the preceding examples, wherein the plurality of elements comprise images representing a plurality of other viewers who the viewer has identified as friends.

Example 4

The method as recited in any one or more of the preceding examples, wherein a first element of the plurality of elements is a composite element representative of all other viewers who the viewer has identified as friends.

Example 5

The method as recited in any one or more of the preceding examples, further comprising generating a plurality of content elements in a third portion of the user interface responsive to detecting the viewer has selected a given friend in the second portion of the user interface.

Example 6

The method as recited in any one or more of the preceding examples, wherein the plurality of content elements in a third portion of the user interface comprise artwork representing various favorite shows of the given friend.

Example 7

The method as recited in any one or more of the preceding examples, wherein an amount of viewing information shared by the viewer with other viewers is configurable.

Example 8

The method as recited in any one or more of the preceding examples, wherein a number of friends generated in the second portion of the user interface is configurable by the viewer.

Example 9

The method as recited in any one or more of the preceding examples, wherein the number of friends generated is increased responsive to detecting a zoom out gesture by the viewer.

Example 10

The method as recited in any one or more of the preceding examples, wherein the zoom out gesture is performed on a remote control device.

Example 11

A computer readable storage medium comprising program instructions, wherein when executed the program instructions are operable to: generate a user interface, wherein the user interface comprises a side bar in a first portion of the user interface, wherein the side bar comprising a plurality of elements, and wherein a first element is a friend element to show information regarding other viewers who a viewer has identified as friends; and convey the user interface to a display.

Example 12

The computer readable storage medium as recited in any one or more of the preceding examples, wherein when executed the program instructions are further operable to generate a plurality of elements in a second portion of the user interface responsive to detecting the viewer has selected the friend element within the side bar.

Example 13

The computer readable storage medium as recited in any one or more of the preceding examples, wherein the plurality of elements comprise images representing a plurality of other viewers who the viewer has identified as friends.

Example 14

The computer readable storage medium as recited in any one or more of the preceding examples, wherein a first element of the plurality of elements is a composite element representative of all other viewers who the viewer has identified as friends.

Example 15

The computer readable storage medium as recited in any one or more of the preceding examples, wherein when executed the program instructions are further operable to generate a plurality of content elements in a third portion of the user interface responsive to detecting the viewer has selected a given friend in the second portion of the user interface.

Example 16

The computer readable storage medium as recited in any one or more of the preceding examples, wherein the plurality of content elements in a third portion of the user interface comprise artwork representing various favorite shows of the given friend.

Example 17

The computer readable storage medium as recited in any one or more of the preceding examples, wherein an amount of viewing information shared by the viewer with other viewers is configurable.

Example 18

The computer readable storage medium as recited in any one or more of the preceding examples, wherein a number of friends generated in the second portion of the user interface is configurable by the viewer.

Example 19

The computer readable storage medium as recited in any one or more of the preceding examples, wherein the number of friends generated is increased responsive to detecting a zoom out gesture by the viewer.

Example 20

The computer readable storage medium as recited in any one or more of the preceding examples, wherein the zoom out gesture is performed on a remote control device.

Example 21

An apparatus comprising: an interface configured to receive video content; and circuitry configured to: generate a user interface, wherein the user interface comprises a side bar in a first portion of the user interface, wherein the side bar comprising a plurality of elements, and wherein a first element is a friend element to show information regarding other viewers who a viewer has identified as friends; and convey the user interface to a display.

Example 22

The apparatus as recited in any one or more of the preceding examples, wherein the circuitry is further configurable to generate a plurality of elements in a second portion of the user interface responsive to detecting the viewer has selected the friend element within the side bar.

Example 23

The apparatus as recited in any one or more of the preceding examples, wherein the plurality of elements comprise images representing a plurality of other viewers who the viewer has identified as friends.

Example 24

The apparatus as recited in any one or more of the preceding examples, wherein a first element of the plurality of elements is a composite element representative of all other viewers who the viewer has identified as friends.

Example 25

The apparatus as recited in any one or more of the preceding examples, wherein the circuitry is further configurable to generate a plurality of content elements in a third portion of the user interface responsive to detecting the viewer has selected a given friend in the second portion of the user interface.

Example 26

The apparatus as recited in any one or more of the preceding examples, wherein the plurality of content elements in a third portion of the user interface comprise artwork representing various favorite shows of the given friend.

Example 27

The apparatus as recited in any one or more of the preceding examples, wherein an amount of viewing information shared by the viewer with other viewers is configurable.

Example 28

The apparatus as recited in any one or more of the preceding examples, wherein a number of friends generated in the second portion of the user interface is configurable by the viewer.

Example 29

The apparatus as recited in any one or more of the preceding examples, wherein the number of friends generated is increased responsive to detecting a zoom out gesture by the viewer.

Example 30

The apparatus as recited in any one or more of the preceding examples, wherein the zoom out gesture is performed on a remote control device.

Example 31

An apparatus comprising: a first means configured to receive video content; and a second means configured to: generate a user interface, wherein the user interface comprises a side bar in a first portion of the user interface, wherein the side bar comprising a plurality of elements, and wherein a first element is a friend element to show information regarding other viewers who a viewer has identified as friends; and convey the user interface to a display.

Example 32

The apparatus as recited in any one or more of the preceding examples, wherein the second means is further configurable to generate a plurality of elements in a second portion of the user interface responsive to detecting the viewer has selected the friend element within the side bar.

Example 33

The apparatus as recited in any one or more of the preceding examples, wherein the plurality of elements comprise images representing a plurality of other viewers who the viewer has identified as friends.

Example 34

The apparatus as recited in any one or more of the preceding examples, wherein a first element of the plurality of elements is a composite element representative of all other viewers who the viewer has identified as friends.

Example 35

The apparatus as recited in any one or more of the preceding examples, wherein the second means is further configurable to generate a plurality of content elements in a third portion of the user interface responsive to detecting the viewer has selected a given friend in the second portion of the user interface.

Example 36

The apparatus as recited in any one or more of the preceding examples, wherein the plurality of content elements in a third portion of the user interface comprise artwork representing various favorite shows of the given friend.

Example 37

The apparatus as recited in any one or more of the preceding examples, wherein an amount of viewing information shared by the viewer with other viewers is configurable.

Example 38

The apparatus as recited in any one or more of the preceding examples, wherein a number of friends generated in the second portion of the user interface is configurable by the viewer.

Example 39

The apparatus as recited in any one or more of the preceding examples, wherein the number of friends generated is increased responsive to detecting a zoom out gesture by the viewer.

Example 40

The apparatus as recited in any one or more of the preceding examples, wherein the zoom out gesture is performed on a remote control device.

This disclosure further includes subject matter directed to the following examples:

Example 1

A device comprising a user interface, wherein the user interface comprises a sidebar, wherein the sidebar comprises multiple elements that may be highlighted or selected by a viewer, wherein the sidebar is overlayed on top of video content.

Example 2

The device as recited in any one or more of the preceding examples, wherein the sidebar comprises a first category, wherein the device is configured to receive voice input from the viewer responsive to detecting the first category has been selected.

Example 3

The device as recited in any one or more of the preceding examples, wherein responsive to detecting the viewer has selected a given element from the sidebar, the user interface is configured to generate a plurality of related elements and to display a plurality of video content elements associated with the related elements, wherein the plurality of video content elements are shown simultaneously.

Example 4

The device as recited in any one or more of the preceding examples, wherein the sidebar comprises a second category, wherein the user interface is configured to show a plurality of elements defined by the viewer responsive to detecting the viewer has second category from the sidebar.

Example 5

The device as recited in any one or more of the preceding examples, wherein the user interface is configured to stop displaying the sidebar responsive to detecting the viewer has dismissed the sidebar.

Example 6

The device as recited in any one or more of the preceding examples, wherein the user interface is configured to stop displaying the sidebar responsive to detecting a timeout condition.

Example 7

The device as recited in any one or more of the preceding examples, wherein the user interface is configured to zoom in on a given element to enlarge a depiction of the given element responsive to the viewer focusing on the given element.

Example 8

The device as recited in any one or more of the preceding examples, wherein the user interface is configured to prevent content from being displayed which includes spoiler elements.

Example 9

The device as recited in any one or more of the preceding examples, wherein the user interface is configured to prevent a current score or a winning team from being displayed for a given sports event prior to the viewer watching the given sports event.

Example 10

The device as recited in any one or more of the preceding examples, wherein the user interface is configured to zoom out to increase a number of content elements depicted responsive to detecting the viewer has provided a scroll gesture indicating a desire to zoom out.

Example 11

A system comprising: a first device comprising a user interface; a second device; wherein the user interface comprises a sidebar, wherein the sidebar comprises multiple elements that may be highlighted or selected by a viewer, wherein the sidebar is overlayed on top of video content.

Example 12

The system as recited in any one or more of the preceding examples, wherein the sidebar comprises a first category, wherein the first device is configured to receive voice input from the viewer responsive to detecting the first category has been selected using the second device.

Example 13

The system as recited in any one or more of the preceding examples, wherein responsive to detecting the viewer has selected a given element from the sidebar using the second device, the user interface is configured to generate a plurality of related elements and to display a plurality of video content elements associated with the related elements, wherein the plurality of video content elements are shown simultaneously.

Example 14

The system as recited in any one or more of the preceding examples, wherein the sidebar comprises a second category, wherein the user interface is configured to show a plurality of elements defined by the viewer responsive to detecting the viewer has second category from the sidebar.

Example 15

The system as recited in any one or more of the preceding examples, wherein the user interface is configured to stop displaying the sidebar responsive to detecting the viewer has dismissed the sidebar.

Example 16

The system as recited in any one or more of the preceding examples, wherein the user interface is configured to stop displaying the sidebar responsive to detecting a timeout condition.

Example 17

The system as recited in any one or more of the preceding examples, wherein the user interface is configured to zoom in on a given element to enlarge a depiction of the given element responsive to the viewer focusing on the given element.

Example 18

The system as recited in any one or more of the preceding examples, wherein the user interface is configured to prevent content from being displayed which includes spoiler elements.

Example 19

The system as recited in any one or more of the preceding examples, wherein the user interface is configured to prevent a current score or a winning team from being displayed for a given sports event prior to the viewer watching the given sports event.

Example 20

The system as recited in any one or more of the preceding examples, wherein the user interface is configured to zoom out to increase a number of content elements depicted responsive to detecting the viewer has provided a scroll gesture indicating a desire to zoom out.

Example 21

A method comprising generating a user interface with a sidebar, wherein the sidebar comprises multiple elements that may be highlighted or selected by a viewer, wherein the sidebar is overlayed on top of video content.

Example 22

The method as recited in any one or more of the preceding examples, wherein the sidebar comprises a first category, wherein the first device is configured to receive voice input from the viewer responsive to detecting the first category has been selected using the second device.

Example 23

The method as recited in any one or more of the preceding examples, wherein responsive to detecting the viewer has selected a given element from the sidebar using the second device, the method further comprising generating a plurality of related elements and displaying a plurality of video content elements associated with the related elements, wherein the plurality of video content elements are shown simultaneously.

Example 24

The method as recited in any one or more of the preceding examples, wherein the sidebar comprises a second category, the method further comprising showing a plurality of elements defined by the viewer responsive to detecting the viewer has second category from the sidebar.

Example 25

The method as recited in any one or more of the preceding examples, wherein the method further comprising stopping displaying the sidebar responsive to detecting the viewer has dismissed the sidebar.

Example 26

The method as recited in any one or more of the preceding examples, wherein the method further comprising stopping displaying the sidebar responsive to detecting a timeout condition.

Example 27

The method as recited in any one or more of the preceding examples, wherein the method further comprising zooming in on a given element to enlarge a depiction of the given element responsive to the viewer focusing on the given element.

Example 28

The method as recited in any one or more of the preceding examples, wherein the method further comprising preventing content from being displayed which includes spoiler elements.

Example 29

The method as recited in any one or more of the preceding examples, wherein the method further comprising preventing a current score or a winning team from being displayed for a given sports event prior to the viewer watching the given sports event.

Example 30

The method as recited in any one or more of the preceding examples, wherein the method further comprising zooming out to increase a number of content elements depicted responsive to detecting the viewer has provided a scroll gesture indicating a desire to zoom out.

Example 31

A non-transitory computer readable storage medium comprising program instructions, wherein when executed by a processor the program instructions are executable to generate a user interface with a sidebar, wherein the sidebar comprises multiple elements that may be highlighted or selected by a viewer, wherein the sidebar is overlayed on top of video content.

Example 32

The non-transitory computer readable storage medium as recited in any one or more of the preceding examples, wherein the sidebar comprises a first category, wherein the program instructions are further executable to receive voice input from the viewer responsive to detecting the first category has been selected using the second device.

Example 33

The non-transitory computer readable storage medium as recited in any one or more of the preceding examples, wherein responsive to detecting the viewer has selected a given element from the sidebar using the second device, the program instructions are further executable to generate a plurality of related elements and to display a plurality of video content elements associated with the related elements, wherein the plurality of video content elements are shown simultaneously.

Example 34

The non-transitory computer readable storage medium as recited in any one or more of the preceding examples, wherein the sidebar comprises a second category, wherein the program instructions are further executable to show a plurality of elements defined by the viewer responsive to detecting the viewer has second category from the sidebar.

Example 35

The non-transitory computer readable storage medium as recited in any one or more of the preceding examples, wherein the program instructions are further executable to stop displaying the sidebar responsive to detecting the viewer has dismissed the sidebar.

Example 36

The non-transitory computer readable storage medium as recited in any one or more of the preceding examples, wherein the program instructions are further executable to stop displaying the sidebar responsive to detecting a timeout condition.

Example 37

The non-transitory computer readable storage medium as recited in any one or more of the preceding examples, wherein the program instructions are further executable to zoom in on a given element to enlarge a depiction of the given element responsive to the viewer focusing on the given element.

Example 38

The non-transitory computer readable storage medium as recited in any one or more of the preceding examples, wherein the program instructions are further executable to prevent content from being displayed which includes spoiler elements.

Example 39

The non-transitory computer readable storage medium as recited in any one or more of the preceding examples, wherein the program instructions are further executable to prevent a current score or a winning team from being displayed for a given sports event prior to the viewer watching the given sports event.

Example 40

The non-transitory computer readable storage medium as recited in any one or more of the preceding examples, wherein the program instructions are further executable to zoom out to increase a number of content elements depicted responsive to detecting the viewer has provided a scroll gesture indicating a desire to zoom out.

This disclosure further includes subject matter directed to the following examples:

Example 1

A device comprising a display, wherein the display is configured to show a program guide, and wherein a watch-now indicator is shown for programs in future time slots which are currently available to be viewed prior to a future time in which they are scheduled to be broadcast.

Example 2

The device as recited in any one or more of the preceding examples, wherein the device is configured to allow a viewer to access programs from future time slots prior to the future time in which they are scheduled to be broadcast.

Example 3

The device as recited in any one or more of the preceding examples, wherein the device is configured to start playing a given program immediately ahead of a scheduled time slot for broadcast responsive to detecting the given program has been selected by the viewer.

Example 4

The device as recited in any one or more of the preceding examples, wherein the display is configured to show an indicator for programs for which a viewer does not have a valid subscription.

Example 5

The device as recited in any one or more of the preceding examples, wherein the device is configured to show a programming schedule of various networks, wherein the programming schedule by itself does not indicate the availability of the video content.

Example 6

The device as recited in any one or more of the preceding examples, wherein the program guide is provided by a primary provider.

Example 7

The device as recited in any one or more of the preceding examples, wherein the device is configured to access a given program from the primary provider responsive to detecting the viewer has selected the given program.

Example 8

The device as recited in any one or more of the preceding examples, wherein the given program is stored in a data store of the primary provider.

Example 9

The device as recited in any one or more of the preceding examples, wherein the given program is stored in a data store of a secondary provider, and wherein the primary provider is configured to provide access to the data store of the secondary provider.

Example 10

The device as recited in any one or more of the preceding examples, wherein the given program is available from a plurality of secondary providers.

Example 11

A system comprising: a first device comprising a display; a second device; wherein the display is configured to show a program guide, and wherein a watch-now indicator is shown for programs in future time slots which are currently available to be viewed prior to a future time in which they are scheduled to be broadcast.

Example 12

The system as recited in any one or more of the preceding examples, wherein the first device is configured to allow a viewer to access programs from future time slots prior to the future time in which they are scheduled to be broadcast.

Example 13

The system as recited in any one or more of the preceding examples, wherein the first device is configured to start playing a given program immediately ahead of a scheduled time slot for broadcast responsive to detecting the given program has been selected by the viewer using the second device.

Example 14

The system as recited in any one or more of the preceding examples, wherein the display is configured to show an indicator for programs for which a viewer does not have a valid subscription.

Example 15

The system as recited in any one or more of the preceding examples, wherein the first device is configured to show a programming schedule of various networks, wherein the programming schedule by itself does not indicate the availability of the video content.

Example 16

The system as recited in any one or more of the preceding examples, wherein the program guide is provided by a primary provider.

Example 17

The system as recited in any one or more of the preceding examples, wherein the first device is configured to access a given program from the primary provider responsive to detecting the viewer has selected the given program.

Example 18

The system as recited in any one or more of the preceding examples, wherein the given program is stored in a data store of the primary provider.

Example 19

The system as recited in any one or more of the preceding examples, wherein the given program is stored in a data store of a secondary provider, and wherein the primary provider is configured to provide access to the data store of the secondary provider.

Example 20

The system as recited in any one or more of the preceding examples, wherein the given program is available from a plurality of secondary providers.

Example 21

A method comprising showing a program guide, wherein a watch-now indicator is shown for programs in future time slots which are currently available to be viewed prior to a future time in which they are scheduled to be broadcast.

Example 22

The method as recited in any one or more of the preceding examples, further comprising allowing a viewer to access programs from future time slots prior to the future time in which they are scheduled to be broadcast.

Example 23

The method as recited in any one or more of the preceding examples, further comprising playing a given program immediately ahead of a scheduled time slot for broadcast responsive to detecting the given program has been selected by the viewer.

Example 24

The method as recited in any one or more of the preceding examples, further comprising showing an indicator for programs for which a viewer does not have a valid subscription.

Example 25

The method as recited in any one or more of the preceding examples, further comprising showing a programming schedule of various networks, wherein the programming schedule by itself does not indicate the availability of the video content.

Example 26

The method as recited in any one or more of the preceding examples, wherein the program guide is provided by a primary provider.

Example 27

The method as recited in any one or more of the preceding examples, further comprising accessing a given program from the primary provider responsive to detecting the viewer has selected the given program.

Example 28

The method as recited in any one or more of the preceding examples, wherein the given program is stored in a data store of the primary provider.

Example 29

The method as recited in any one or more of the preceding examples, wherein the given program is stored in a data store of a secondary provider, and wherein the primary provider is configured to provide access to the data store of the secondary provider.

Example 30

The method as recited in any one or more of the preceding examples, wherein the given program is available from a plurality of secondary providers.

Example 31

A non-transitory computer readable storage medium comprising program instructions, wherein when executed by a processor the program instructions are executable to show a program guide, wherein a watch-now indicator is shown for programs in future time slots which are currently available to be viewed prior to a future time in which they are scheduled to be broadcast.

Example 32

The non-transitory computer readable storage medium as recited in any one or more of the preceding examples, wherein the program instructions are further executable to allow a viewer to access programs from future time slots prior to the future time in which they are scheduled to be broadcast.

Example 33

The non-transitory computer readable storage medium as recited in any one or more of the preceding examples, wherein the program instructions are further executable to start playing a given program immediately ahead of a scheduled time slot for broadcast responsive to detecting the given program has been selected by the viewer.

Example 34

The non-transitory computer readable storage medium as recited in any one or more of the preceding examples, wherein the program instructions are further executable to show an indicator for programs for which a viewer does not have a valid subscription.

Example 35

The non-transitory computer readable storage medium as recited in any one or more of the preceding examples, wherein the program instructions are further executable to show a programming schedule of various networks, wherein the programming schedule by itself does not indicate the availability of the video content.

Example 36

The non-transitory computer readable storage medium as recited in any one or more of the preceding examples, wherein the program guide is provided by a primary provider.

Example 37

The non-transitory computer readable storage medium as recited in any one or more of the preceding examples, wherein the program instructions are further executable to access a given program from the primary provider responsive to detecting the viewer has selected the given program.

Example 38

The non-transitory computer readable storage medium as recited in any one or more of the preceding examples, wherein the given program is stored in a data store of the primary provider.

Example 39

The non-transitory computer readable storage medium as recited in any one or more of the preceding examples, wherein the given program is stored in a data store of a secondary provider, and wherein the primary provider is configured to provide access to the data store of the secondary provider.

Example 40

The non-transitory computer readable storage medium as recited in any one or more of the preceding examples, wherein the given program is available from a plurality of secondary providers.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A non-transitory computer readable storage medium comprising program instructions executable to:
   display video content on a display device;
   display a sidebar that overlays a portion of the video content, the sidebar comprising a plurality of selectable elements each of which corresponds to a different category of video content;
   detect user input from a viewer selecting a first element of said elements; and responsive to detecting said input, display a plurality of representations corresponding to a category represented by the first element, the plurality of representations corresponding to content from multiple channels on multiple television networks;
wherein:
a first plurality of representations of the plurality of representations corresponds to live broadcast content currently accessible on the electronic device from a first set of channels on a first set of television networks;
a second plurality of representations of the plurality of representations corresponds to on-demand content currently accessible on the electronic device from a second set of channels on a second set of television networks; and
the first plurality of representations corresponding to live broadcast content is arranged in a first row in a region of the display device separate from the second plurality of representations corresponding to on-demand content.

2. The non-transitory computer readable storage medium as recited in claim 1, wherein the program instructions are further executable to present audio for a particular content item responsive to a representation corresponding to the particular content item having a current focus.

3. The non-transitory computer readable storage medium as recited in claim 1, wherein said sidebar selectable element categories include sports content, recommended content, and content the viewer has identified as corresponding to a given collection, including purchased or rented content.

4. The non-transitory computer readable storage medium as recited in claim 3, wherein the sidebar further includes selectable subcategories for the given collection, and wherein responsive to selecting a given subcategory, content displayed within the given collection is filtered according to the given subcategory.

5. The non-transitory computer readable storage medium as recited in claim 1, wherein the display device comprises at least one of a television, a phone, a tablet computer, a portable gaming device, a wearable portable device, a display device in a motor vehicle, or a remote control.

6. The non-transitory computer readable storage medium as recited in claim 1, wherein each representation of the plurality of representations is accompanied by a description of content being displayed by the corresponding representation.

7. The non-transitory computer readable storage medium as recited in claim 1, wherein the program instructions are further executable to:
detect selection of one of a given representation of said plurality of representations; and
responsive to detecting said selection, display a landing page dedicated to content associated with the given content item corresponding to the given representation.

8. The non-transitory computer readable storage medium as recited in claim 7, wherein said landing page provides access to additional content related to the content item corresponding to the given representation, said additional content including access to multiple seasons and episodes of a television series.

9. The non-transitory computer readable storage medium as recited in claim 7, wherein said landing page provides access to additional content related to the content item corresponding to the given representation, said additional content including access to multiple games for a sports team.

10. The non-transitory computer readable storage medium as recited in claim 7, wherein said landing page provides access to additional content representing selected portions of larger video content related to the content item corresponding to the given representation, said selected portions having been identified through crowdsourcing.

11. The non-transitory computer readable storage medium as recited in claim 1, wherein one or more of the plurality of representations correspond to recommended content items.

12. The non-transitory computer readable storage medium as recited in claim 11, wherein each of the corresponding recommended content items includes an indication if the recommended content item requires a subscription.

13. The non-transitory computer readable storage medium as recited in claim 1, wherein the program instructions are further executable to:
responsive to detecting the viewer has selected to subscribe to a given content item, initiate a transaction between a primary provider and a secondary provider regarding a new subscription selected for purchase by the viewer without need for additional involvement on the part of the viewer.

14. The non-transitory computer readable storage medium as recited in claim 1, wherein one or more of the plurality of representations are associated with programs for which the viewer does not have a valid subscription, and the program instructions are further executable to display an indicator that the viewer does not have a valid subscription to view the programs.

15. The non-transitory computer readable storage medium as recited in claim 1, wherein the program instructions are further executable to stop displaying the sidebar responsive to detecting a timeout condition.

16. The non-transitory computer readable storage medium as recited in claim 1, wherein the program instructions are further executable to:
determine that video content corresponding to the category represented by the first element includes spoiler elements; and
prevent the display of the video content responsive to the determination.

17. The non-transitory computer readable storage medium as recited in claim 16, wherein determining that video content includes spoiler elements includes determining that the viewer has yet to watch a given sports event, and preventing the display of the video content includes preventing the display of a score of the given sports event.

18. The non-transitory computer readable storage medium as recited in claim 1, wherein the plurality of elements includes a friends element, and the program instructions are further executable to, responsive to selection of the friends element, display elements corresponding to other viewers the viewer has identified as friends.

19. The non-transitory computer readable storage medium as recited in claim 1, wherein the on-demand content comprises movies.

20. The non-transitory computer readable storage medium as recited in claim 1, wherein the on-demand content comprises television shows.

21. The non-transitory computer readable storage medium as recited in claim 1, wherein the first plurality of representations and the second plurality of representations correspond to a plurality of content items including:
a first content item accessible on the electronic device via a first subscription with a first content provider, the first content item included in the category represented by the first element due to a prior user input of a first type with respect to the first content item; and a second content item accessible on the electronic device via a second subscription with a second content provider, the second content item included in the category represented by the first element due to a prior user input of a second type, different from the first type, with respect to the second content item.

22. The non-transitory computer readable storage medium as recited in claim 1, wherein the program instructions are further executable to:
while displaying the plurality of representations, wherein a first representation of the plurality of representations corresponding to a first content item has a current focus, display the plurality of representations overlaid over first representative content of the first content item;
while displaying the plurality of representations overlaid over the first representative content, detect a user input moving the current focus from the first representation to a second representation of the plurality of representations corresponding to a second content item; and
responsive to detecting the user input moving the current focus from the first representation to the second representation, replace the first representative content with second representative content of the second content item such that the plurality of representations are overlaid over the second representative content.

23. The non-transitory computer readable storage medium as recited in claim 1, wherein the second plurality of representations corresponding to on-demand content is displayed in a second row, different than the first row.

24. A receiver for use in a television system, the receiver comprising:
a first interface configured to receive a signal comprising video content; and
circuitry configured to:
display video content on a display device;
display a sidebar that overlays a portion of the video content, the sidebar comprising a plurality of selectable elements each of which corresponds to a different category of video content;
detect user input from a viewer selecting a first element of said elements; and
responsive to detecting said input, display a plurality of representations corresponding to a category represented by the first element, the plurality of representations corresponding to content from multiple channels on multiple television networks;
wherein:
a first plurality of representations of the plurality of representations corresponds to live broadcast content currently accessible on the electronic device from a first set of channels on a first set of television networks;
a second plurality of representations of the plurality of representations corresponds to on-demand content currently accessible on the electronic device from a second set of channels on a second set of television networks; and
the first plurality of representations corresponding to live broadcast content is arranged in a row in a region of the display device separate from the second plurality of representations corresponding to on-demand content.

25. The receiver of claim 24, wherein the first plurality of representations and the second plurality of representations correspond to a plurality of content items including:
a first content item accessible on the electronic device via a first subscription with a first content provider, the first content item included in the category represented by the first element due to a prior user input of a first type with respect to the first content item; and
a second content item accessible on the electronic device via a second subscription with a second content provider, the second content item included in the category represented by the first element due to a prior user input of a second type, different from the first type, with respect to the second content item.

26. The receiver of claim 24, wherein the circuitry is further configured to:
while displaying the plurality of representations, wherein a first representation of the plurality of representations corresponding to a first content item has a current focus, display the plurality of representations overlaid over first representative content of the first content item;
while displaying the plurality of representations overlaid over the first representative content, detect a user input moving the current focus from the first representation to a second representation of the plurality of representations corresponding to a second content item; and
responsive to detecting the user input moving the current focus from the first representation to the second representation, replace the first representative content with second representative content of the second content item such that the plurality of representations are overlaid over the second representative content.

27. The receiver of claim 24, wherein the second plurality of representations corresponding to on-demand content is displayed in a second row, different than the first row.

28. The receiver of claim 24, wherein the circuitry is further configured to present audio for a particular content item responsive to a representation corresponding to the particular content item having a current focus.

29. The receiver of claim 24, wherein said sidebar selectable element categories include sports content, recommended content, and content the viewer has identified as corresponding to a given collection, including purchased or rented content.

30. The receiver of claim 29, wherein the sidebar further includes selectable subcategories for the given collection, and wherein responsive to selecting a given subcategory, content displayed within the given collection is filtered according to the given subcategory.

31. The receiver of claim 24, wherein the display device comprises at least one of a television, a phone, a tablet computer, a portable gaming device, a wearable portable device, a display device in a motor vehicle, or a remote control.

32. The receiver of claim 24, wherein each representation of the plurality of representations is accompanied by a description of content being displayed by the corresponding representation.

33. The receiver of claim 24, wherein the circuitry is further configured to:
detect selection of one of a given representation of said plurality of representations; and
responsive to detecting said selection, display a landing page dedicated to content associated with the given content item corresponding to the given representation.

34. The receiver of claim 33, wherein said landing page provides access to additional content related to the content item corresponding to the given representation, said additional content including access to multiple seasons and episodes of a television series.

35. The receiver of claim 33, wherein said landing page provides access to additional content related to the content item corresponding to the given representation, said additional content including access to multiple games for a sports team.

36. The receiver of claim 33, wherein said landing page provides access to additional content representing selected portions of larger video content related to the content item corresponding to the given representation, said selected portions having been identified through crowdsourcing.

37. The receiver of claim 24, wherein one or more of the plurality of representations correspond to recommended content items.

38. The receiver of claim 37, wherein each of the corresponding recommended content items includes an indication if the recommended content item requires a subscription.

39. The receiver of claim 24, wherein the circuitry is further configured to:
responsive to detecting the viewer has selected to subscribe to a given content item, initiate a transaction between a primary provider and a secondary provider regarding a new subscription selected for purchase by the viewer without need for additional involvement on the part of the viewer.

40. The receiver of claim 24, wherein one or more of the plurality of representations are associated with programs for which the viewer does not have a valid subscription, and the program instructions are further executable to display an indicator that the viewer does not have a valid subscription to view the programs.

41. The receiver of claim 24, wherein the circuitry is further configured to stop displaying the sidebar responsive to detecting a timeout condition.

42. The receiver of claim 24, wherein the circuitry is further configured to:
determine that video content corresponding to the category represented by the first element includes spoiler elements; and
prevent the display of the video content responsive to the determination.

43. The receiver of claim 42, wherein determining that video content includes spoiler elements includes determining that the viewer has yet to watch a given sports event, and preventing the display of the video content includes preventing the display of a score of the given sports event.

44. The receiver of claim 24, wherein the plurality of elements includes a friends element, and the program instructions are further executable to, responsive to selection of the friends element, display elements corresponding to other viewers the viewer has identified as friends.

45. A method comprising:
displaying video content on a display device;
displaying a sidebar that overlays a portion of the video content, the sidebar comprising a plurality of selectable elements each of which corresponds to a different category of video content;
detecting user input from a viewer selecting a first element of said elements; and
responsive to detecting said input, displaying a plurality of representations corresponding to a category represented by the first element, the plurality of representations corresponding to content from multiple channels on multiple television networks;
wherein:
a first plurality of representations of the plurality of representations corresponds to live broadcast content currently accessible on the electronic device from a first set of channels on a first set of television networks;
a second plurality of representations of the plurality of representations of the plurality of representations corresponds to on-demand content currently accessible on the electronic device from a second set of channels on a second set of television networks; and
the first plurality of representations corresponding to live broadcast content is arranged in a row in a region of the display device separate from the second plurality of representations corresponding to on-demand content.

46. The method of claim 45, wherein the first plurality of representations and the second plurality of representations correspond to a plurality of content items including:
a first content item accessible on the electronic device via a first subscription with a first content provider, the first content item included in the category represented by the first element due to a prior user input of a first type with respect to the first content item; and
a second content item accessible on the electronic device via a second subscription with a second content provider, the second content item included in the category represented by the first element due to a prior user input of a second type, different from the first type, with respect to the second content item.

47. The method of claim 45, further comprising:
while displaying the plurality of representations, wherein a first representation of the plurality of representations corresponding to a first content item has a current focus, display the plurality of representations overlaid over first representative content of the first content item;
while displaying the plurality of representations overlaid over the first representative content, detect a user input moving the current focus from the first representation to a second representation of the plurality of representations corresponding to a second content item; and
responsive to detecting the user input moving the current focus from the first representation to the second representation, replace the first representative content with second representative content of the second content item such that the plurality of representations are overlaid over the second representative content.

48. The method of claim 45, wherein the second plurality of representations corresponding to on-demand content is displayed in a second row, different than the first row.

49. The method of claim 45, further comprising presenting audio for a particular content item responsive to a representation corresponding to the particular content item having a current focus.

50. The method of claim 45, wherein said sidebar selectable element categories include sports content, recommended content, and content the viewer has identified as corresponding to a given collection, including purchased or rented content.

51. The method of claim 50, wherein the sidebar further includes selectable subcategories for the given collection, and wherein responsive to selecting a given subcategory, content displayed within the given collection is filtered according to the given subcategory.

52. The method of claim 45, wherein the display device comprises at least one of a television, a phone, a tablet computer, a portable gaming device, a wearable portable device, a display device in a motor vehicle, or a remote control.

53. The method of claim 45, wherein each representation of the plurality of representations is accompanied by a description of content being displayed by the corresponding representation.

54. The method of claim 45, further comprising:
detecting selection of one of a given representation of said plurality of representations; and
responsive to detecting said selection, displaying a landing page dedicated to content associated with the given content item corresponding to the given representation.

55. The method of claim 54, wherein said landing page provides access to additional content related to the content item corresponding to the given representation, said additional content including access to multiple seasons and episodes of a television series.

56. The method of claim 54, wherein said landing page provides access to additional content related to the content item corresponding to the given representation, said additional content including access to multiple games for a sports team.

57. The method of claim 54, wherein said landing page provides access to additional content representing selected portions of larger video content related to the content item corresponding to the given representation, said selected portions having been identified through crowdsourcing.

58. The method of claim 45, wherein one or more of the plurality of representations correspond to recommended content items.

59. The method of claim 58, wherein each of the corresponding recommended content items includes an indication if the recommended content item requires a subscription.

60. The method of claim 45, further comprising:
responsive to detecting the viewer has selected to subscribe to a given content item, initiating a transaction between a primary provider and a secondary provider regarding a new subscription selected for purchase by the viewer without need for additional involvement on the part of the viewer.

61. The method of claim 45, wherein one or more of the plurality of representations are associated with programs for which the viewer does not have a valid subscription, and the program instructions are further executable to display an indicator that the viewer does not have a valid subscription to view the programs.

62. The method of claim 45, further comprising stopping display of the sidebar responsive to detecting a timeout condition.

63. The method of claim 45, further comprising:
determining that video content corresponding to the category represented by the first element includes spoiler elements; and
preventing the display of the video content responsive to the determination.

64. The method of claim 63, wherein determining that video content includes spoiler elements includes determining that the viewer has yet to watch a given sports event, and preventing the display of the video content includes preventing the display of a score of the given sports event.

65. The method of claim 45, wherein the plurality of elements includes a friends element, and the program instructions are further executable to, responsive to selection of the friends element, display elements corresponding to other viewers the viewer has identified as friends.

* * * * *